US007640298B2

(12) United States Patent
Berg

(10) Patent No.: US 7,640,298 B2
(45) Date of Patent: Dec. 29, 2009

(54) METHOD AND SYSTEM FOR COMMUNICATING AN INFORMATION PACKET THROUGH MULTIPLE ROUTER DEVICES

(76) Inventor: Mitchell T. Berg, 435 10th Ave., Kirkland, WA (US) 98033

( * ) Notice: Subject to any disclaimer, the term of this patent is extended or adjusted under 35 U.S.C. 154(b) by 535 days.

(21) Appl. No.: 11/265,558

(22) Filed: Nov. 1, 2005

(65) Prior Publication Data

US 2006/0098630 A1  May 11, 2006

Related U.S. Application Data

(63) Continuation of application No. 09/872,376, filed on Jun. 1, 2001, now abandoned.

(60) Provisional application No. 60/257,456, filed on Dec. 21, 2000.

(51) Int. Cl.
*G06F 15/16* (2006.01)
(52) U.S. Cl. ................ 709/203; 709/217; 709/227; 709/238; 709/248
(58) Field of Classification Search .......... 709/203, 709/238, 239, 243, 250, 253, 217, 227, 248
See application file for complete search history.

(56) References Cited

U.S. PATENT DOCUMENTS

| 3,622,707 A | | 11/1971 | Golembeski | ........... 179/15 BP |
| 4,383,280 A | | 5/1983 | Copeland | ........... 360/18 |
| 5,214,646 A | * | 5/1993 | Yacoby | ........... 370/402 |
| 5,251,205 A | | 10/1993 | Callon | |
| 5,323,394 A | * | 6/1994 | Perlman | ........... 370/238 |
| 5,408,469 A | * | 4/1995 | Opher et al. | ........... 370/399 |
| 5,432,907 A | * | 7/1995 | Picazo et al. | ........... 709/249 |
| 5,600,637 A | * | 2/1997 | Kikuta | ........... 370/389 |
| 5,619,650 A | | 4/1997 | Bach | |
| 5,642,352 A | * | 6/1997 | Ishida et al. | ........... 370/401 |
| 5,692,126 A | * | 11/1997 | Templeton et al. | ........... 709/249 |
| 5,708,832 A | | 1/1998 | Inniss | |
| 5,745,703 A | | 4/1998 | Cejtin | |
| 5,748,897 A | | 5/1998 | Katiyar | |
| 5,764,914 A | | 6/1998 | Goto | |
| 5,774,660 A | | 6/1998 | Brendel et al. | ........... 395/200.31 |
| 5,781,726 A | * | 7/1998 | Pereira | ........... 709/200 |
| 5,828,569 A | | 10/1998 | Fisher | |

(Continued)

FOREIGN PATENT DOCUMENTS

EP  1041496 A2  10/2000

OTHER PUBLICATIONS

Aversa et al., "Load Balancing a Cluster of Web Servers Using Distributed Packet Rewriting." Technical Report BUCS-TR-1999-001, Boston University, Computer Science Department, Jan. 1999.

(Continued)

*Primary Examiner*—Michael Won
(74) *Attorney, Agent, or Firm*—Christensen O'Connor Johnson Kindness PLLC

(57) ABSTRACT

According to one embodiment, a first computing device receives a first information packet from a second computing device. The second computing device receives the first information packet from a global computer network through a first router device. The first computing device outputs a second information packet to the global computer network through a second router device, such that the second information packet bypasses the first router device.

19 Claims, 28 Drawing Sheets

U.S. PATENT DOCUMENTS

| | | | |
|---|---|---|---|
| 5,889,776 A | 3/1999 | Liang | |
| 5,918,017 A | 6/1999 | Attanasio et al. | 395/200.54 |
| 5,920,705 A | 7/1999 | Lyon | |
| 5,937,169 A | 8/1999 | Connery et al. | 395/200.8 |
| 5,987,432 A * | 11/1999 | Zusman et al. | 705/35 |
| 6,006,259 A | 12/1999 | Adelman | |
| 6,006,264 A | 12/1999 | Colby et al. | 709/226 |
| 6,023,563 A | 2/2000 | Shani | 395/200.79 |
| 6,047,325 A * | 4/2000 | Jain et al. | 709/227 |
| 6,052,733 A | 4/2000 | Mahalingam | |
| 6,061,349 A | 5/2000 | Coile et al. | 370/389 |
| 6,070,191 A | 5/2000 | Narendran | |
| 6,078,943 A | 6/2000 | Yu | |
| 6,081,836 A * | 6/2000 | Karapetkov et al. | 709/218 |
| 6,085,238 A | 7/2000 | Yuasa | |
| 6,092,178 A | 7/2000 | Jindal | |
| 6,104,717 A | 8/2000 | Coile et al. | 370/401 |
| 6,105,119 A | 8/2000 | Kerr et al. | 711/219 |
| 6,137,799 A | 10/2000 | Karapetkov | |
| 6,141,705 A | 10/2000 | Anand | |
| 6,157,955 A | 12/2000 | Narad | |
| 6,179,489 B1 | 1/2001 | So et al. | 395/672 |
| 6,182,139 B1 | 1/2001 | Brendel | 709/226 |
| 6,185,619 B1 | 2/2001 | Joffe et al. | 709/229 |
| 6,195,705 B1 * | 2/2001 | Leung | 709/245 |
| 6,226,678 B1 | 5/2001 | Mattaway et al. | 709/230 |
| 6,226,680 B1 | 5/2001 | Boucher | |
| 6,246,683 B1 | 6/2001 | Connery et al. | 370/392 |
| 6,247,060 B1 | 6/2001 | Boucher et al. | 709/238 |
| 6,252,878 B1 | 6/2001 | Locklear, Jr. et al. | 370/401 |
| 6,253,230 B1 | 6/2001 | Couland | |
| 6,256,322 B1 | 7/2001 | Wilson, Jr. | 370/469 |
| 6,295,276 B1 * | 9/2001 | Datta et al. | 370/218 |
| 6,298,370 B1 | 10/2001 | Tang et al. | 709/102 |
| 6,330,231 B1 | 12/2001 | Bi | |
| 6,330,602 B1 | 12/2001 | Law et al. | 709/224 |
| 6,334,153 B2 | 12/2001 | Boucher et al. | 709/230 |
| 6,338,089 B1 | 1/2002 | Quinlan | |
| 6,363,477 B1 | 3/2002 | Fletcher et al. | 713/151 |
| 6,370,584 B1 | 4/2002 | Bestavros et al. | 709/238 |
| 6,374,300 B2 | 4/2002 | Masters | 709/229 |
| 6,389,462 B1 | 5/2002 | Cohen et al. | 709/218 |
| 6,389,479 B1 | 5/2002 | Boucher | |
| 6,393,487 B2 | 5/2002 | Boucher et al. | 709/238 |
| 6,400,730 B1 | 6/2002 | Latif et al. | 370/466 |
| 6,415,329 B1 | 7/2002 | Gelman | |
| 6,427,171 B1 | 7/2002 | Craft et al. | 709/230 |
| 6,427,173 B1 | 7/2002 | Boucher | |
| 6,434,620 B1 | 8/2002 | Boucher et al. | 709/230 |
| 6,442,612 B1 | 8/2002 | Hugosson et al. | 709/230 |
| 6,452,922 B1 | 9/2002 | Ho | |
| 6,453,360 B1 | 9/2002 | Muller et al. | 709/250 |
| 6,457,050 B1 | 9/2002 | Cowan | |
| 6,473,425 B1 | 10/2002 | Bellaton et al. | 370/392 |
| 6,490,632 B1 | 12/2002 | Vepa | |
| 6,512,774 B1 | 1/2003 | Vepa | |
| 6,523,068 B1 | 2/2003 | Beser et al. | 709/238 |
| 6,539,494 B1 | 3/2003 | Abramson et al. | 714/4 |
| 6,546,425 B1 | 4/2003 | Hanson | |
| 6,549,522 B1 * | 4/2003 | Flynn | 370/313 |
| 6,567,377 B1 | 5/2003 | Vepa | |
| 6,578,066 B1 | 6/2003 | Logan et al. | 709/105 |
| 6,587,438 B1 | 7/2003 | Brendel | 370/238 |
| 6,590,861 B1 | 7/2003 | Vepa | |
| 6,591,302 B2 | 7/2003 | Boucher | |
| 6,591,306 B1 | 7/2003 | Redlich | |
| 6,598,077 B2 | 7/2003 | Primak et al. | 709/219 |
| 6,603,769 B1 * | 8/2003 | Thubert et al. | 370/401 |
| 6,606,301 B1 | 8/2003 | Muller et al. | 370/230 |
| 6,628,615 B1 | 9/2003 | Joseph | |
| 6,650,640 B1 | 11/2003 | Muller et al. | 370/392 |
| 6,665,304 B2 | 12/2003 | Beck | |
| 6,671,273 B1 | 12/2003 | Beck | 370/389 |
| 6,683,882 B1 | 1/2004 | Maufer | |
| 6,691,165 B1 | 2/2004 | Bruck et al. | 709/227 |
| 6,697,868 B2 | 2/2004 | Craft | |
| 6,718,361 B1 | 4/2004 | Basani | |
| 6,725,253 B1 | 4/2004 | Okano | |
| 6,725,272 B1 | 4/2004 | Susai et al. | 709/229 |
| 6,735,169 B1 | 5/2004 | Albert et al. | 370/229 |
| 6,748,420 B1 | 6/2004 | Quatrano et al. | 709/205 |
| 6,754,713 B1 | 6/2004 | Dascalu | 709/229 |
| 6,757,746 B2 | 6/2004 | Boucher | |
| 6,772,333 B1 | 8/2004 | Brendel | 713/153 |
| 6,778,540 B1 | 8/2004 | Ratcliff et al. | 370/401 |
| 6,779,016 B1 * | 8/2004 | Aziz et al. | 709/201 |
| 6,785,226 B1 | 8/2004 | Oltman et al. | 370/228 |
| 6,788,649 B1 | 9/2004 | Dugan et al. | 370/254 |
| 6,788,692 B1 | 9/2004 | Boudreau et al. | |
| 6,788,980 B1 | 9/2004 | Johnson | 700/1 |
| 6,799,202 B1 | 9/2004 | Hankinson et al. | 709/219 |
| 6,801,949 B1 | 10/2004 | Bruck et al. | 709/232 |
| 6,807,176 B1 | 10/2004 | Egbert et al. | 370/392 |
| 6,807,183 B1 | 10/2004 | Chow et al. | 370/401 |
| 6,823,373 B1 | 11/2004 | Pancha et al. | 709/219 |
| 6,826,615 B2 | 11/2004 | Barrall | |
| 6,850,531 B1 | 2/2005 | Rao et al. | 370/401 |
| 6,874,147 B1 | 3/2005 | Diamant | |
| 6,879,559 B1 | 4/2005 | Blackmon | |
| 6,891,839 B2 | 5/2005 | Albert et al. | 370/401 |
| 6,904,519 B2 | 6/2005 | Anand | |
| 6,941,386 B2 | 9/2005 | Craft | |
| 6,961,346 B1 | 11/2005 | Michalewicz et al. | 370/465 |
| 6,975,624 B1 | 12/2005 | Oda | |
| 6,996,617 B1 | 2/2006 | Aiken, Jr. | |
| 7,003,574 B1 | 2/2006 | Bahl | |
| 7,017,049 B2 | 3/2006 | Hand | |
| 7,099,322 B1 | 8/2006 | Frouin | |
| 7,103,626 B1 * | 9/2006 | Recio et al. | 709/201 |
| 7,165,120 B1 | 1/2007 | Giles | |
| 7,197,547 B1 | 3/2007 | Miller | |
| 7,222,188 B1 | 5/2007 | Ames | |
| 7,287,090 B1 * | 10/2007 | Berg | 709/238 |
| 7,299,294 B1 * | 11/2007 | Bruck et al. | 709/235 |
| 7,308,509 B2 * | 12/2007 | Warschko et al. | 709/250 |
| 7,353,277 B1 | 4/2008 | Carney | |
| 7,418,522 B2 * | 8/2008 | Berg | 709/250 |
| 7,475,157 B1 | 1/2009 | Tormasov | |
| 7,480,705 B2 | 1/2009 | DeLima | |
| 2001/0007555 A1 | 7/2001 | Sasagawa | |
| 2001/0017847 A1 | 8/2001 | Hojo | |
| 2001/0023460 A1 | 9/2001 | Boucher | |
| 2001/0027496 A1 | 10/2001 | Boucher | |
| 2001/0037406 A1 | 11/2001 | Philbrick et al. | 709/250 |
| 2001/0039586 A1 | 11/2001 | Primak | |
| 2002/0059170 A1 | 5/2002 | Vange | |
| 2002/0062388 A1 * | 5/2002 | Ogier et al. | 709/238 |
| 2002/0095519 A1 | 7/2002 | Philbrick et al. | 709/250 |
| 2002/0133529 A1 | 9/2002 | Schmidt | 709/102 |
| 2002/0143954 A1 | 10/2002 | Aiken, Jr. | |
| 2002/0152286 A1 | 10/2002 | Peddu | |
| 2002/0152403 A1 | 10/2002 | Hand et al. | 713/201 |
| 2002/0161839 A1 | 10/2002 | Colasurdo | |
| 2003/0135666 A1 | 7/2003 | Kim | 710/1 |
| 2003/0140153 A1 | 7/2003 | Lawrence | 709/230 |
| 2004/0017812 A1 | 1/2004 | Kamo | |
| 2004/0143662 A1 | 7/2004 | Poyhonen | |
| 2005/0007998 A1 | 1/2005 | Van Der Wal | |
| 2007/0061437 A1 | 3/2007 | Berg | |

OTHER PUBLICATIONS

Aversa et al., "Load Balancing a Cluster of Web Servers Using Distributed Packet Rewriting." In *Proceedings of IPCCC'2000: The*

*IEEE International Performance, Computing, and Communications Conference*, Phoenix, AZ, Feb. 2000.

Beestermöller, H., et al., "An online and offline programmable Multi-Loop Controller for Distributed Systems," *IEEE*, 1994, pp. 15-20.

Bestavros et al. "Distributed Packet Rewriting and its Application to Scalable Server Architectures" Conference on Network Protocols, Oct. 1998, pp. 290-297.

Dias et al. "A Scalable and Highly Available Web Server" COMPCON '96, 1996, IEEE pp. 85-92.

Information Sciences Institute, "Transmission Control Protocol," *RFC 793*, 91 pages, Sep. 1981. Retrieved Apr. 15, 2005, from http://rfc.sunsite.dk/rfc/rfc793.html.

Perkins, C., "IP Encapsulation within IP," *RFC* 2003, IBM, Oct. 1996, retrieved Jun. 20, 2005, from http://www.ietf.org/rfc/rfc2003.txt?number=2003, pp. 1-14.

Postel, J., "User Datagram Protocol," *RFC 768*, pp. 1-5, Aug. 28, 1980. Retrieved Jun. 2, 2005, from http://rfc.sunsite.dk/rfc/rfc768.html.

"Protocol Stack," Jun. 13, 2006, <http://webopedia.com/TERM/p/protocol_stack.html> [retrieved Jun. 5, 2007], pp. 1-2.

Snoeren, A.C., and H. Balakrishnan, et al., "TCP Connection Migration," Internet Draft of the Internet Engineering Task Force (IETF), Nov. 2000, 13 pages.

Stevens, W. R., "TCP/IP Illustrated, vol. 1, The Protocols," Addison-Wesley, © 1994, 12,254 pages.

"The 7 Layers of the OSI Model," © 2007 Jupitermedia Corporation, <http://webopedia.com/quick_ref/OSI_Layers.asp> [retrieved Jun. 6, 2007], pp. 1-4.

Dias, D.M. et al., "A Scalable and Highly Available Web Server," Proceedings of the 41st IEEE Int'l Computer Conf. (COMPCON '96), Feb. 25-28, 1996, San Francisco, pp. 85-92.

* cited by examiner

Ethernet Encapsulation Header

| MAC Destination Address | MAC Source Address | Type 0x007 |
|---|---|---|
| 6 | 6 | 2 |

Figure 11a (Prior Art)

ipOS Encapsulation Header

| Source IP | Source Port | Dest. IP | Dest. Port | Type | Protocol | Checksum |
|---|---|---|---|---|---|---|
| 4 | 2 | 4 | 2 | 1 | 1 | 2 |

Figure 11b ipOS Connection Information (UDP)

| Server IP | Server Port |
|---|---|
| 4 | 2 |

Figure 11c ipOS Connection Information (TCP)

| Server IP | Server Port | TCP Control Block Information |
|---|---|---|
| 4 | 2 | 140 |

Figure 11d ipOS TCP Connection Packet (Type=0x01; Protocol=0x01)

| Ethernet Encap. Type =0x007 | ipOS Encap. Header | TCP ipOS Connection Information |
|---|---|---|
| 14 | 16 | 146 |

Figure 11e ipOS UDP Connection Packet (Type=0x01; Protocol=0x02)

| Ethernet Encap. Type =0x007 | ipOS Encap. Header | UDP ipOS Connection Information |
|---|---|---|
| 14 | 16 | 6 |

Figure 11f ipOS TCP Packet (Type=0x02; Protocol=0x01)

| Ethernet Encap. Type =0x007 | ipOS Encap. Header | IP/TCP Packet |
|---|---|---|
| 14 | 16 | 40 + Data |

Figure 11g ipOS UDP Packet (Type=0x02; Protocol=0x02)

| Ethernet Encap. Type =0x007 | ipOS Encap. Header | IP/UDP Packet |
|---|---|---|
| 14 | 16 | 28 + Data |

Figure 11h ipOS Endpoint Migration Acknowledgement Packet (Type=0x03)

| Ethernet Encap. Type =0x007 | ipOS Encap. Header |
|---|---|
| 14 | 16 |

Figure 11i

Forward Table

| Key | Field | Description |
|---|---|---|
| Yes | Source IP Address | IP address of Client |
| Yes | Source TCP Port | TCP Port of Client |
| No | Destination IP Address | IP Address to Forward |
| No | Destination TCP Port | TCP Port to Forward |

Local/Forward-Connect/Temporary Table

| KEY | Field | Description |
|---|---|---|
| Yes | Source IP Address | Client IP address |
| Yes | Source Port | Client TCP Port |
| Yes | Destination IP Address | Endpoint IP Address |
| Yes | Destination Port | Endpoint TCP Port |
| No | Endpoint Reference | Reference to Connection Endpoint |

Server State Table

| Key | Field | Description |
|---|---|---|
| Yes | Server IP Address | Server |
| No | Number TCP Connections | TCP Established Connections |
| No | CPU utilization | Main board CPU utilization |
| No | Available memory | Unused memory on Main Board |
| No | Available Bandwidth | Unused Bandwidth Capacity |

Listening Sockets Table

| Key | Field | Description |
|---|---|---|
| Yes | Server IP Address | Server |
| Yes | TCP Port | Advertised TCP Port |
| No | Process | Application process advertising IP/Port |

Application Information Table

| Key | Field | Description |
|---|---|---|
| Yes | Process ID | Application identification |
| No | Process memory requirements | Memory required to run application |
| No | Process CPU Utilization | Measure of application CPU utilization |

URL Map Table

| Key | Field | Description |
|---|---|---|
| Yes | URL | Universal Resource Locator |
| Yes | Server IP Address | IP address of associated server |

Cookie Map Table

| Key | Field | Description |
|---|---|---|
| Yes | Cookie ID | Cookie Identification tag |
| No | Server IP Address | IP address of associated server |

Figure 12

METHOD AND SYSTEM FOR COMMUNICATING AN INFORMATION PACKET THROUGH MULTIPLE ROUTER DEVICES

CLAIM TO EARLIER APPLICATION

This application claims priority to U.S. Provisional Patent Application No. 60/257,456, filed Dec. 21, 2000, entitled SYSTEM AND METHOD FOR COMMUNICATING BETWEEN CLIENT AND SERVER COMPUTING DEVICE APPLICATIONS AND ENHANCING SERVER FARM RESOURCE UTILIZATION, naming Mitchell T. Berg as inventor.

CROSS-REFERENCE TO RELATED APPLICATIONS

This application relates to co-pending U.S. patent applications (a) Ser. No. 09/873,018, entitled METHOD AND SYSTEM FOR COMMUNICATING AN INFORMATION PACKET THROUGH MULTIPLE NETWORKS, (b) Ser. No. 09/872,329, entitled METHOD AND SYSTEM FOR COMMUNICATING A REQUEST PACKET IN RESPONSE TO A STATE, (c) Ser. No. 09/872,539, entitled METHOD AND SYSTEM FOR COMMUNICATING AN INFORMATION PACKET AND IDENTIFYING A DATA STRUCTURE, (d) Ser. No. 09/873,019, entitled METHOD AND SYSTEM FOR INITIATING EXECUTION OF SOFTWARE IN RESPONSE TO A STATE, (e) Ser. No. 09/872,372, entitled METHOD AND SYSTEM FOR ESTABLISHING A DATA STRUCTURE OF A CONNECTION WITH A CLIENT, (f) Ser. No. 09/872,332, entitled METHOD AND SYSTEM FOR IDENTIFYING A COMPUTING DEVICE IN RESPONSE TO A REQUEST PACKET, and (g) Ser. No. 09/872,081, entitled METHOD AND SYSTEM FOR EXECUTING PROTOCOL STACK INSTRUCTIONS TO FORM A PACKET FOR CAUSING A COMPUTING DEVICE TO PERFORM AN OPERATION. Each of these co-pending applications is filed concurrently herewith, names Mitchell T. Berg as inventor, is incorporated herein by reference in its entirety, and is assigned to the assignee of this application.

BACKGROUND

This description relates in general to information processing systems, and in particular to a server farm information processing system and method of operation.

A software application can be deployed through a global computer network, such as an Internet Protocol ("IP") global computer network (e.g. the Internet or an intranet). Such applications include IP socket-based software applications (e.g. web site application or Internet gaming site application). For deploying an application through a global computer network, a client computer system ("client") communicates with at least one server computer system ("server) through the global computer network.

Accordingly, the server stores and executes the deployed application, which is used by the client through the global computer network. In such a manner, one or more applications can be deployed by the server through the global computer network. If the application (or group of applications) is large, or is used by a large number of clients, then a group of servers ("server farm") stores and executes the application.

A conventional server farm is coupled through a flow switch to the global computer network (and, accordingly, to clients that are coupled to the global computer network). Through the flow switch, a client and the server farm communicate packets of information ("information packets") to one another. As a conduit between clients and the server farm, the flow switch has various shortcomings which reduce the overall performance and efficiency of deploying software applications with the server farm through the global computer network.

Accordingly, a need has arisen for a server farm information processing system and method of operation, in which overall performance and efficiency are enhanced of deploying software applications with a server farm through a global computer network.

SUMMARY

According to one embodiment, a first computing device receives a first information packet from a second computing device. The second computing device receives the first information packet from a global computer network through a first router device. The first computing device outputs a second information packet to the global computer network through a second router device, such that the second information packet bypasses the first router device.

A principal advantage of these embodiments is that various shortcomings of previous techniques are overcome. For example, a principal advantage of these embodiments is that overall performance and efficiency are enhanced of deploying software applications with a server farm through a global computer network.

BRIEF DESCRIPTION OF THE DRAWING

FIG. 11a is a conceptual illustration of a conventional Ethernet encapsulation header.

FIG. 11b is a conceptual illustration of an ipOS encapsulation header, according to the illustrative embodiments.

FIG. 11c is a conceptual illustration of ipOS connection information for migration of a UDP connection endpoint, according to the illustrative embodiments.

FIG. 11d is a conceptual illustration of ipOS connection information for migration of a TCP connection endpoint, according to the illustrative embodiments.

FIG. 11e is a conceptual illustration of an ipOS TCP connection endpoint packet, according to the illustrative embodiments.

FIG. 11f is a conceptual illustration of an ipOS UDP connection endpoint packet, according to the illustrative embodiments.

FIG. 11g is a conceptual illustration of a packet having a TCP/IP payload, according to the illustrative embodiments.

FIG. 11h is a conceptual illustration of a packet having a UDP/IP payload, according to the illustrative embodiments.

FIG. 11i is a conceptual illustration of a connection endpoint migration acknowledgement packet, according to the illustrative embodiments.

FIG. 12 is a conceptual illustration of tables stored by a server's iNIC memory, according to the illustrative embodiments.

DETAILED DESCRIPTION

Figure 1A:
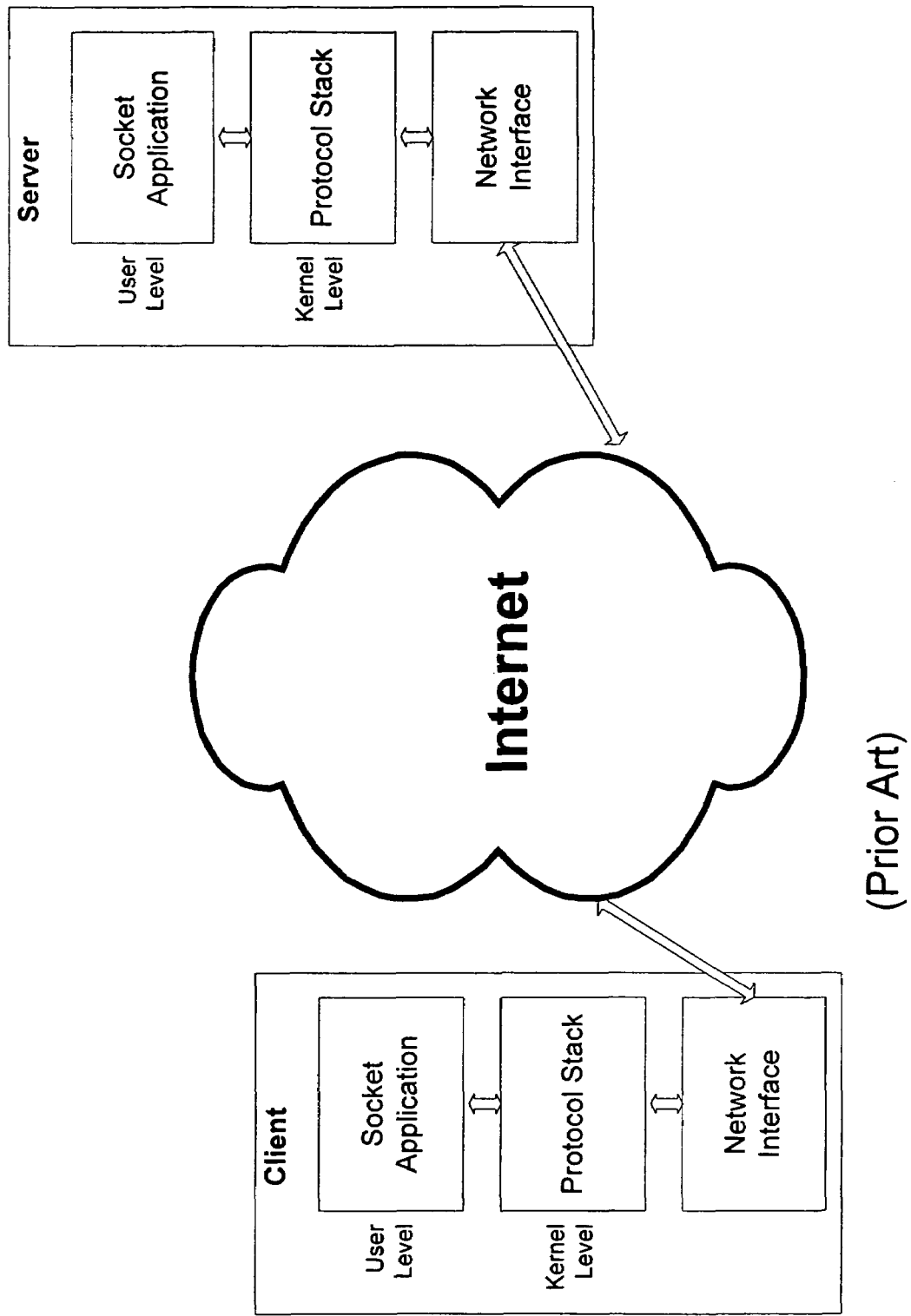
FIG. 1a is a block diagram of a conventional system for processing information with client and server computer systems that communicate with one another through an Internet Protocol ("IP") global computer network.

FIG. 1a is a block diagram of a conventional system for processing information with a client computer system ("client") and server computer system ("server") that communicate (e.g. receive and output information) with one another through an Internet Protocol ("IP") global computer network (e.g. the Internet or an intranet). For clarity, FIG. 1a shows only a single client and a single server, although multiple clients and multiple servers are connected to the IP network. In FIG. 1a, the client is a representative one of the multiple clients, and the server is a representative one of the multiple servers.

Conventionally, clients and servers communicate with one another through the IP network according to either the Transmission Control Protocol ("TCP") or User Datagram Protocol ("UDP"). In FIG. 1a, a server makes its socket application (or "socket-based application") available through the IP network and waits for a client to establish a connection with the server through a specified IP address and TCP port (e.g. through a listening socket). For example, a server executing a World Wide Web application has a listening socket associated with an assigned 32-bit IP address on the standard TCP port 80 for a World Wide Web server application.

After accepting a connection from a requesting client, the server creates (or "establishes" or "forms") a client specific socket. The socket (created by the server) represents the server's connection for the sending (and receiving) information to (and from) the specific client. Conventionally, in response to creation of a socket, the server (with its operating system ("OS") kernel) allocates (or "establishes" or "forms") a data structure (of the connection with the client) to store client-to-server protocol specific connection information. This data structure is referred to as a socket connection endpoint (or "connection endpoint").

Information within the connection endpoint varies according to the type of connection established (e.g. TCP or UDP). For UDP and TCP types of connections, the connection endpoint information includes the client's and server's respective 32-bit IP addresses, the client application's and server application's respective 16-bit TCP connection ports, a pointer reference to a socket structure, and IP options such as Time to Live ("TTL") and Type of Service ("TOS"). Additionally, for a TCP type of connection, the connection endpoint information includes a group of send and receive sequence numbers (including start, current, and acknowledgement sequence numbers of the server and client) and variables for timing individual sent packets. In various embodiments, the connection endpoint information includes additional suitable information.

The client performs similar operations. With a socket layer (which manages sockets), the client (with a client application) creates a connection endpoint of a specified type (e.g. UDP or TCP) and attempts a connection to a server's listening socket. For example, with a conventional web browser (e.g. Netscape Navigator or Microsoft Internet Explorer), the client opens a TCP type of connection endpoint and attempts connection through an IP network to a web server through the web server's advertised IP address on the standard web service TCP port 80. After establishing a successful connection, the client and server are operable to send (and receive) information to (and from) one another through the associated socket connection.

With read and write calls to the socket layer, the client and server are operable to send and receive information at the application level. The client and server communicate with one another through IP packets sent through the IP network. Accordingly, before sending information from an application through the IP network (in response to a suitable connection endpoint), the computer system (e.g. client or server) encapsulates such information according to the IP protocol. Also, in response to receiving information from a network interface, the computer system (in response to a suitable connection endpoint) directs such information to an associated application.

As shown in FIG. 1*a*, the client and server have respective protocol stacks, which process IP packets (sent and received) and manage connection endpoint information. With the protocol stack, the computer system (a) adds transport specific information before sending information to the network interface and (b) removes transport specific information before alerting an application of the receipt of information from the network interface. Conventionally, the protocol stack is part of the OS and executes in kernel mode.

The protocol stack includes a series of routines (e.g. software instructions) to process a packet in accordance with one or more network protocols such as HTTP, Ethernet, IP, TCP or UDP. In response to receiving a packet from the IP network, the network interface sends the packet through its associated device driver to the protocol stack's routines. For example, in response to receiving an IP packet, the computer system (with its protocol stack) verifies the IP packet according to the packet's checksum algorithm and then moves the packet up the protocol stack for additional processing in accordance with a network protocol.

At each level of the protocol stack processing, the computer system reads, processes and removes a header from the packet. At the end of protocol stack processing, the final result is information that the computer system stores in a destination socket queue. In response to information in the destination socket queue, the computer system (with its OS) initiates a software interrupt to the destination application, alerting the destination application that such information has been received.

For sending information through the network interface to the IP network, the computer system (with the socket application) outputs such information (which has been formed according to software instructions of the socket application) to the protocol stack along with a reference to a suitable connection endpoint. Then, the computer system (with the connection endpoint) moves the information down the protocol stack for additional processing in accordance with a network protocol. At various levels of the protocol stack processing, the computer system forms a packet by supplementing the information with TCP or UDP header information, IP header information, link layer header information (e.g. Ethernet), and calculation of packet checksums. After forming the packet, the computer system outputs the packet to a device driver output queue of the network interface.

Description of Conventional Flow Switch Architecture

Figure 1B:
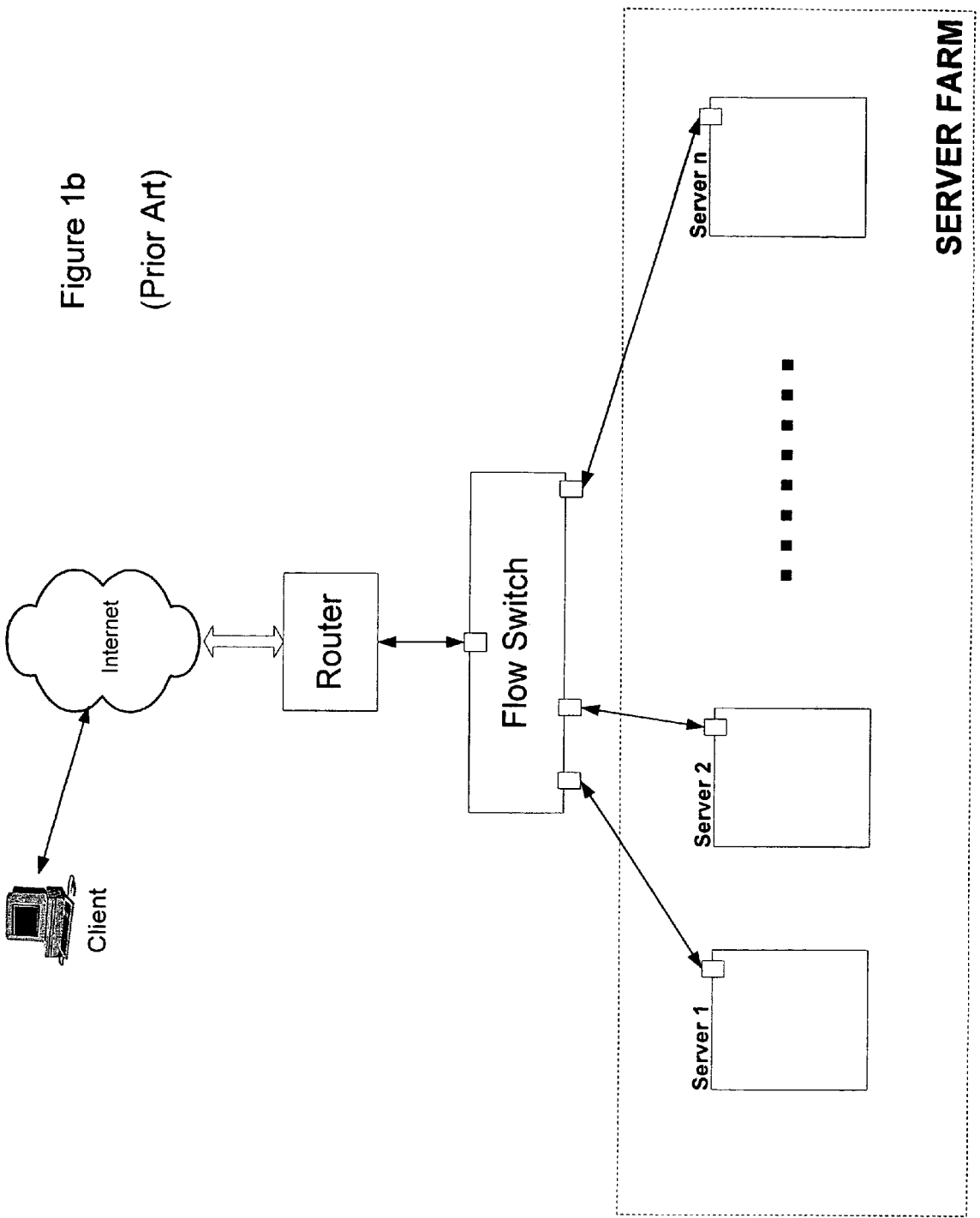
FIG. 1b is a block diagram of a conventional system for processing information with a server farm and a client computer system that communicate with one another through a global computer network with IP socket-based applications.

FIG. 1*b* is a block diagram of a conventional system for processing information with a group of servers ("server farm") and a client that communicate with one another through a global computer network with IP socket-based applications. In this example, a server farm (including n servers, where n is an integer number) stores the applications to be deployed. Server farms are useful for deploying software applications (e.g. web site application or Internet gaming site application) for use through a global computer network.

As shown in FIG. 1*b*, each of the n servers is connected to a flow switch at egress ports of the flow switch. At an ingress port of the flow switch, it is coupled through a router to the IP network.

In the example of FIG. 1*b*, a client connects to a server's application by connecting to the entire server farm through a single IP address. The IP address is associated with the ingress port of the flow switch. Typically, the client obtains the IP address by sending a Uniform Resource Locator ("URL") to a Domain Name System ("DNS"). DNS is a set of special servers deployed on the IP network, with responsibility for translating a URL into an associated IP address. Alternatively, if a client has already received the IP address, the client is able to connect to the server farm without relying on the DNS.

All communications between a server (of the server farm) and a client are directed through the flow switch. The flow switch helps to balance client request loads on servers within the server farm ("server farm load-balancing") by selecting a server to handle a particular client's connection. Accordingly, the flow switch (a) maps packets from the flow switch's ingress port to the selected server through a suitable one of the flow switch's egress ports, (b) maps packets from the selected server to the particular client, and (c) performs various administrative operations. In processing a packet that is communicated between a server and a client, the conventional flow switch performs a range of operations, which may include network address translation ("NAT"), checksum calculation, and TCP sequence number rewriting ("TCP splicing").

Description of Improved Architecture

Figure 2A:
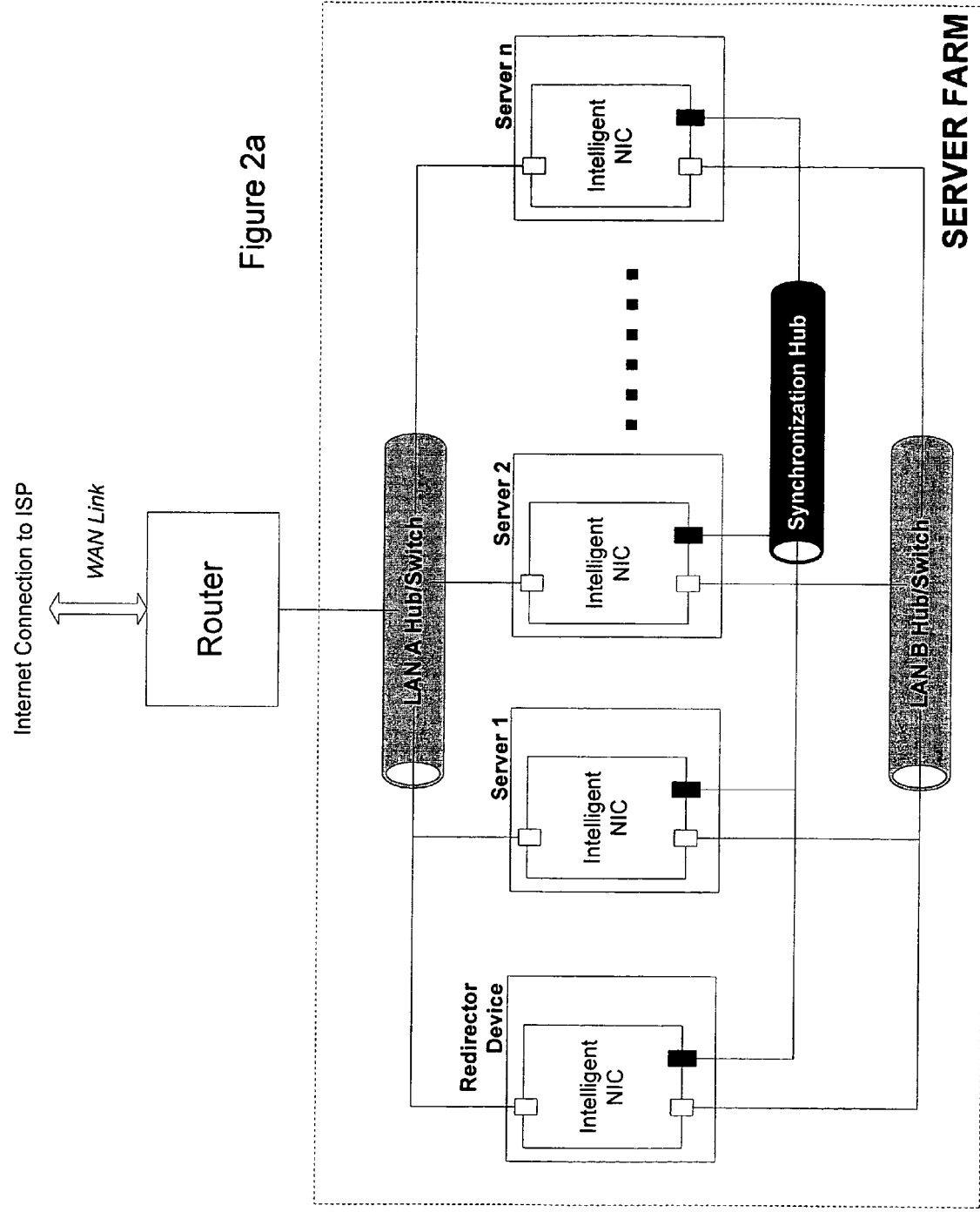
FIG. 2a is a block diagram of a system for processing information with a server farm, according to a first illustrative embodiment.

FIG. 2*a* is a block diagram of a system for processing information with a server farm, according to a first illustrative embodiment. As shown in FIG. 2*a*, the server farm includes a redirector device and n servers for deploying socket-based applications. In the example of FIG. 2*a*, the hardware configurations of the redirector device and servers are substantially identical to one another, so that at least one of the servers is configurable to perform the same types of operations as the redirector device.

The redirector device and the servers are coupled to one another through a LAN A hub/switch (e.g. conventional Layer 2/3 switch), a LAN B hub/switch, and a synchronization hub, which are part of the server farm. As shown in FIG. 2*a*, the LAN A hub/switch is coupled through a router and a suitable WAN to an IP network service provider ("ISP") for communication with the IP network. In an alternative embodiment, LAN A hub/switch is directly connected to the ISP, and other alternative embodiments are possible for connecting LAN A hub/switch to the IP network. Accordingly, each of the n servers and the redirector device is coupled to the IP network through the LAN A hub/switch and the router, without interposing a flow switch between the router and the servers (nor between the router and the redirector device). The router is coupled to the LAN A hub/switch through a suitable LAN or WAN link.

Each of the n servers and the redirector device includes intelligent network interface controller ("iNIC") circuitry, as shown in FIG. 2*a*. Within the server farm, each of the n servers and the redirector device (with its respective iNIC) has a respective IP address that is advertised to clients through the IP network. The redirector device and the servers communicate with one another through the iNICs, in order to operate together in a cooperative manner as a distributed system. A primary objective of such a cooperative distributed system is to achieve server farm load-balancing (e.g. of handling client connections), efficiently communicating packets from clients directly to socket applications, reducing packet manipulations, and increasing the effective use of server farm resources (e.g. by the load-balancing of server application processes and of associated software component objects).

Unlike the system of FIG. 1b, in the system of FIG. 2a, a client connects to a server farm application by obtaining and connecting to a server's IP address, instead of a flow switch's IP address. In the illustrative embodiments, the servers' respective IP addresses are advertised to clients in one of multiple possible ways. For example, according to a first technique, if multiple servers deploy a single application under a single URL, the DNS advertises IP addresses of those servers in a round-robin manner (e.g. one IP address at a time, alternating in a rotational manner). For example, if two servers deploy a web site application under a single URL (e.g. www.mysite.com), the DNS advertises the two servers' respective IP addresses (in association with the web site's URL) in round-robin manner.

According to a second technique, if multiple servers deploy a single application under a single URL, the DNS advertises the redirector device's LP address (in association with the web site's URL). In that manner, a client initially communicates with the redirector device. In response to the redirector device receiving a connection request from a client, the redirector device selects a server (in a round-robin manner among the servers that deploy the application) and outputs the selected server's IP address to the client.

As the network bandwidth of the IP network, local area networks ("LANs"), wide area networks ("WANs"), and IP network connections through ISPs increases at rate faster than the increase in computing capabilities of servers, the resulting disparity in performance effectively shifts the performance bottleneck from (a) the capacity of a network to carry information to (b) the capacity of server farms to process client application requests (e.g. IP packets). Accordingly, individual servers in the server farm experience a vast increase in the rate of packets received and sent. Under such conditions, with the network interface and protocol stack, each server's performance becomes increasingly tied to the processing of such packets.

Conventionally, as discussed hereinabove in connection with FIG. 1a, the protocol stack is part of the OS, and OS overhead is increased in response to processing of more packets, so that fewer CPU cycles remain available for user-level applications. In that situation, individual server efficiency is decreased in response to increases in CPU contention, bus traffic contention, and memory traffic. By comparison, in the illustrative embodiments, the protocol stack is part of the iNIC instead of the OS, so the server farm operates more efficiently in processing client application requests.

Figure 3:
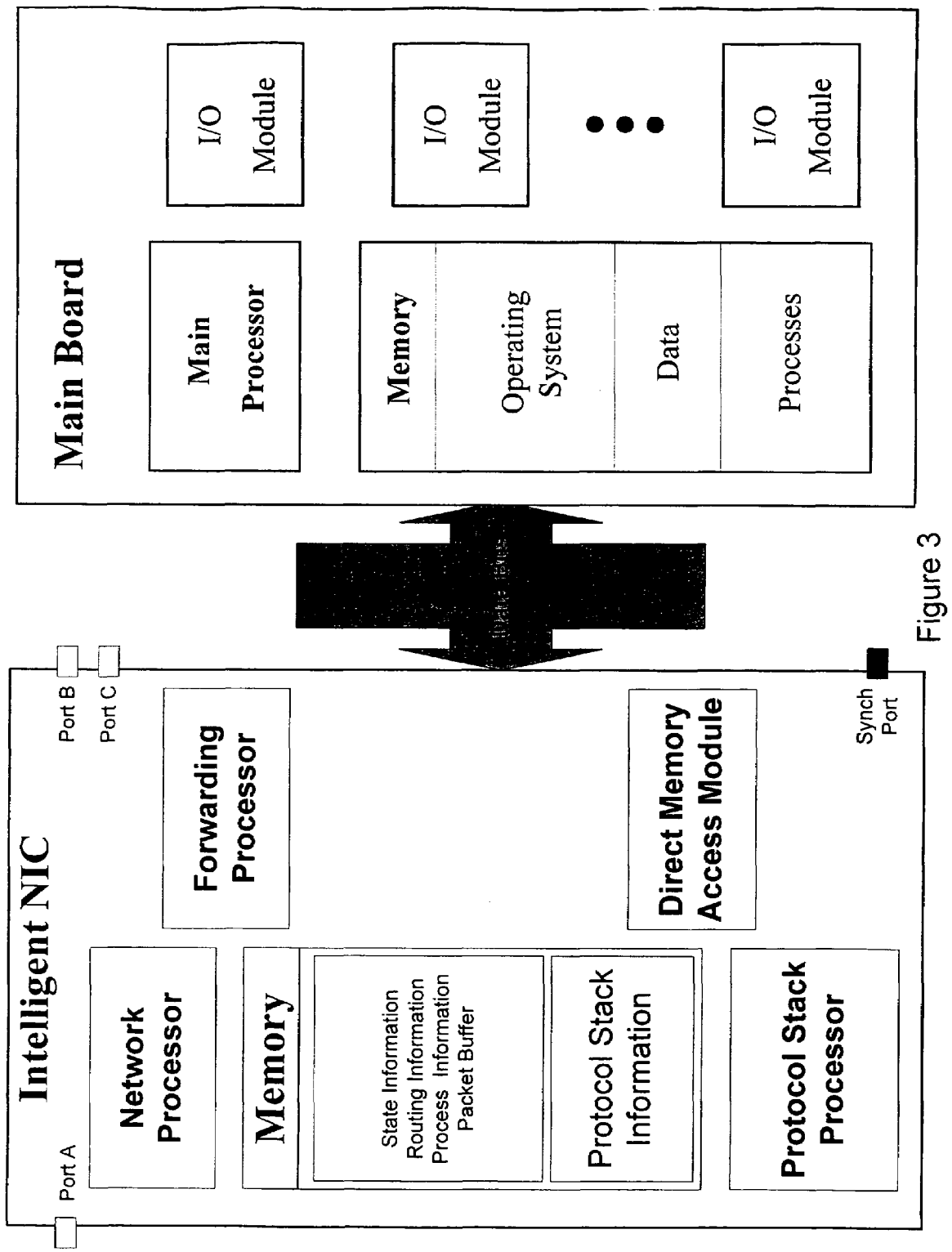
FIG. 3 is a block diagram of an intelligent network interface controller ("iNIC") circuitry and main board circuitry of a server of a server farm, according to the illustrative embodiments.

As shown in FIG. 2a and FIG. 3, each iNIC has a first port ("Port A") connected to LAN A (through LAN A hub/switch) for receiving (and sending) IP packets to (and from) clients through the IP network. Also, each iNIC has a second port ("Port B") connected to LAN B (through LAN B hub/switch) for receiving (and sending) IP packets to (and from) other iNICs in the server farm. Moreover, each iNIC has a third port ("Synch Port") connected to a synchronization hub (which operates as a local area network) for receiving (and sending) state information (e.g. number of TCP connections) to (and from) other iNICs in the server farm.

The architecture of FIG. 2a provides for scalability of bandwidth connections to the server farm. The scalability is achievable in various ways, as discussed for example in connection with FIGS. 2b, 2c and 2d. For example, in an alternative embodiment, each iNIC has a fourth port ("Port C") for receiving (and sending) IP packets to (and from) clients through the IP network.

Figure 2B:
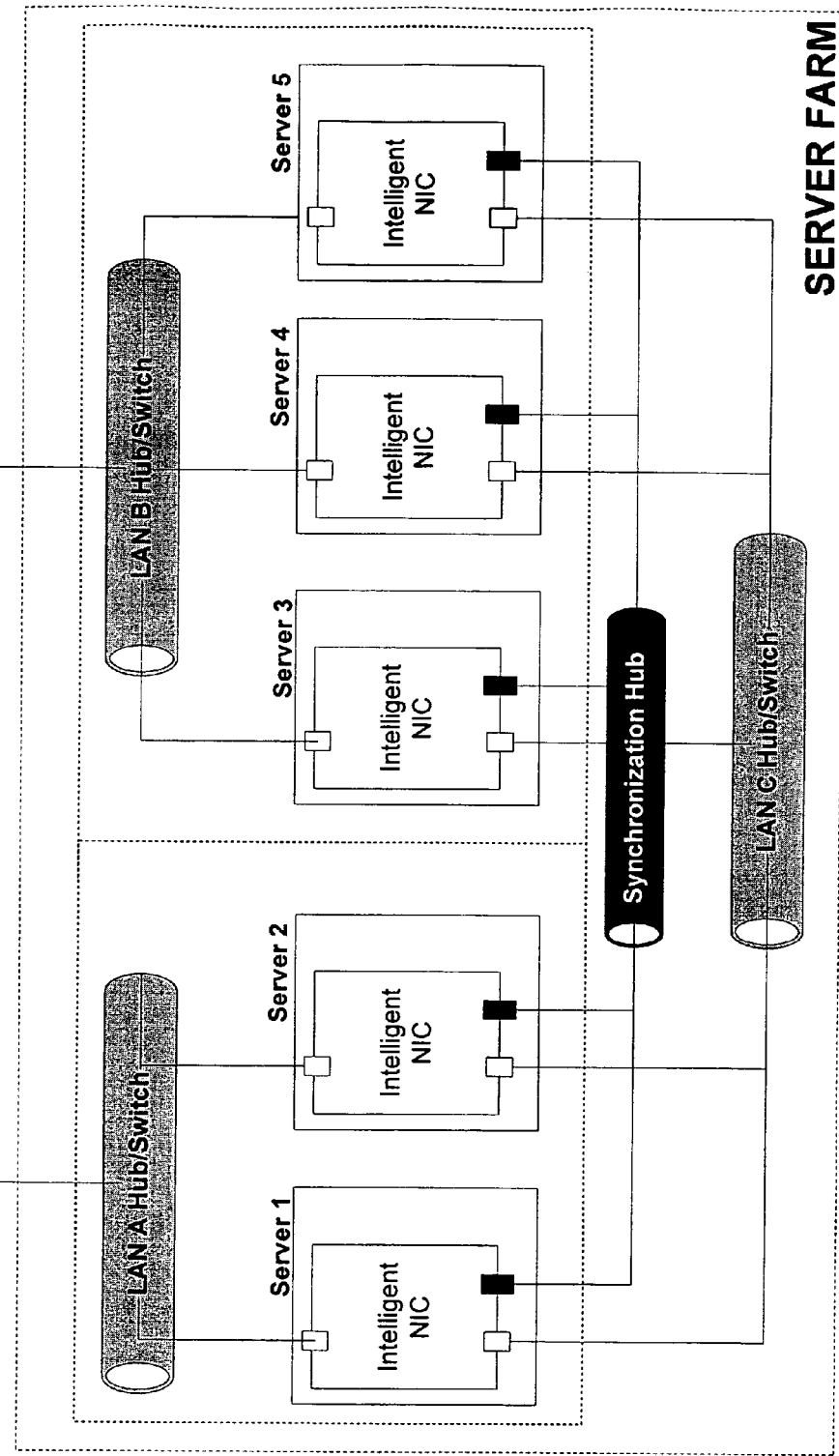
FIG. 2b is a block diagram of a system for processing information with a server farm, according to a second illustrative embodiment.

FIG. 2b is a block diagram of a system for processing information with a server farm, according to a second illustrative embodiment. FIG. 2b shows a situation where server farm bandwidth is increased by adding routers and LAN hub/switches. Similar to the system of FIG. 2a, in the system of FIG. 2b, each router is coupled through a suitable WAN link to an ISP for communication with the IP network, and each router is coupled to a respective LAN hub/switch through a suitable LAN or WAN link.

Accordingly, in FIG. 2b, router A is coupled to LAN A hub/switch, and router B is coupled to LAN B hub/switch. LAN A hub/switch is coupled to two servers (server 1 and server 2) in the server farm, and LAN B hub/switch is coupled to three servers (Server 3, Server 4 and Server 5) in the server farm. Similar to the system of FIG. 2a, in the system of FIG. 2b, all servers in the server farm are coupled to one another through a LAN C hub/switch and a synchronization hub, which are part of the server farm.

FIG. 2b shows scalability of the hardware architecture of the illustrative embodiments according to received network traffic (e.g. adding bandwidth with additional routers and LAN hub/switches to accommodate increases in IP packets received from clients through the IP network). Although FIG. 2b shows a situation where two routers are coupled through suitable WANs to one or more ISPs for communication with the IP network, additional routers and LAN hub/switches can be added to the system of FIG. 2b in a similar manner. Also, the system of FIG. 2b is expandable with additional servers in a variety of ways, such as by adding a server (in parallel with existing servers) to an existing LAN hub/switch (e.g. to LAN A hub/switch or LAN B hub/switch) or by adding a server to an additional LAN hub/switch (which is coupled to an additional router through a suitable LAN or WAN). Such additional servers would likewise be coupled to the other servers through LAN C hub/switch and the synchronization hub. In addition to achieving scalability according to received network traffic, the system of FIG. 2b likewise achieves scalability to accommodate increases in IP packets (e.g. application response packets) sent by servers to clients through the IP network.

Figure 2C:
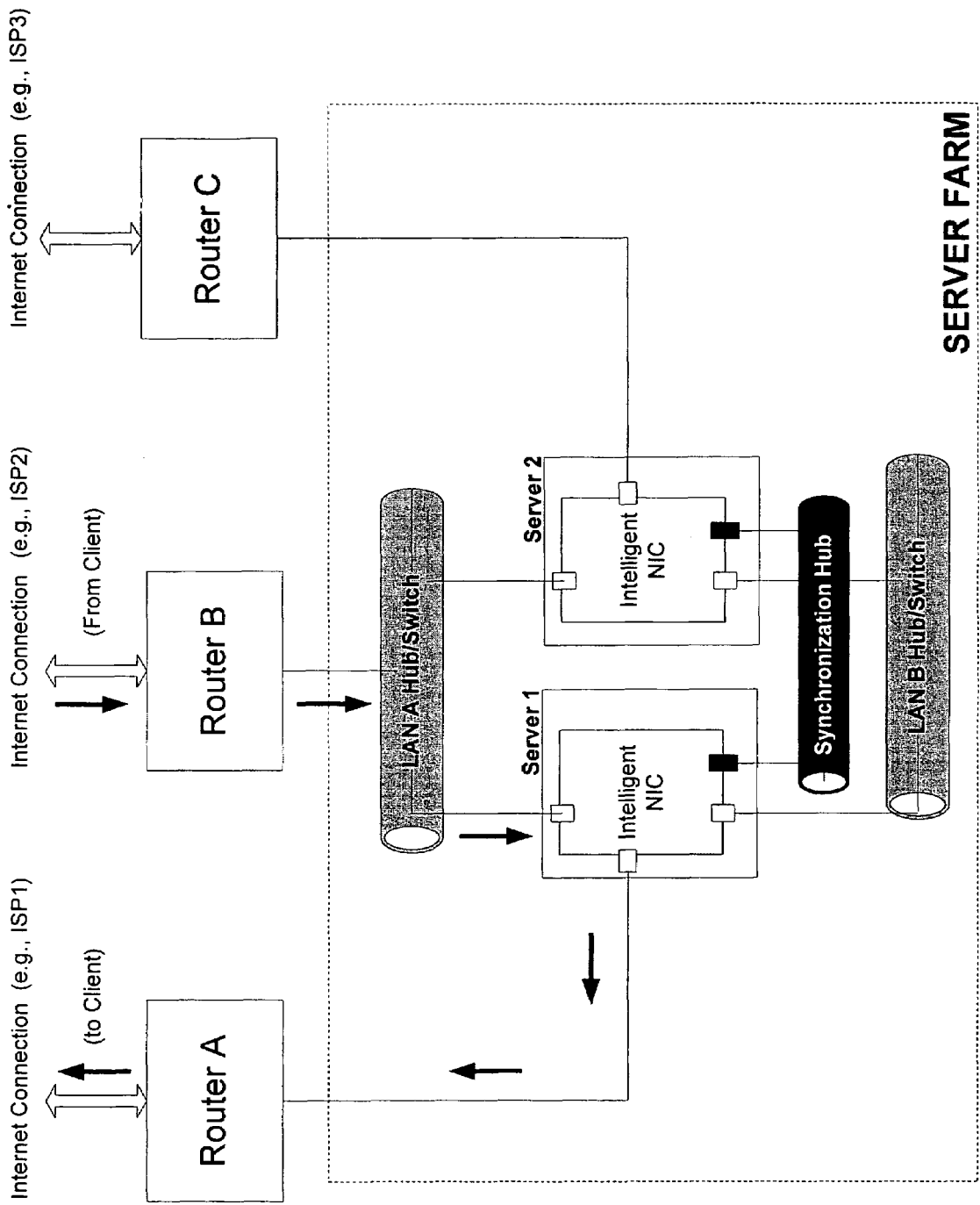
FIG. 2c is a block diagram of a system for processing information with a server farm, according to a third illustrative embodiment.

FIG. 2c is a block diagram of a system for processing information with a server farm, according to a third illustrative embodiment. FIG. 2c shows a situation where additional bandwidth is added for scalability of application response packets. In the system of FIG. 2c, router B receives packets from the IP network. These packets include requests from clients, such as a request for a large file according to HTTP protocol (HyperText Transport Protocol).

Router B forwards each received packet to a server (whose IP address is specified in the packet) in the server farm through LAN A hub/switch. In the illustrative embodiment of FIG. 2c (in which LAN A hub/switch is coupled through Router B to the global computer network), LAN A hub/switch is a Layer 2 switch. By comparison, in an alternative embodiment (in which LAN A hub/switch is coupled directly to the global computer network without an interposed router device), LAN A hub/switch is a Layer 3 switch. In the example of FIG. 2c, a server outputs response packets to clients through a router other than router B, so that the output response packets bypasses the network (e.g. LAN A in FIGS. 2a, 2c, 2d, 4a, 4b and 7) that is connected to Port A. Accordingly, as shown in FIG. 2c, server 1 outputs response packets to clients through router A which is dedicated to server 1 for such purpose, and server 2 outputs response packets to clients through router C which is dedicated to server 2 for such purpose.

Similar to router B, the additional router A and router C are coupled through a suitable WAN link to an ISP for communication with the IP network. The ISP may be the same or different for each of routers A, B and C. Router A is connected to a Port C (discussed further hereinbelow in connection with FIG. 3) of the iNIC of server 1. Likewise, router C is connected to a Port C of the iNIC of server 2.

In a similar manner, the server farm is expandable with additional servers, routers and IP network connections. In the illustrative embodiments, various combinations of scalability in incoming and outgoing bandwidth are possible. The system of FIG. 2c is particularly advantageous in a situation where server 1 and server 2 output a relatively high volume of response packets in response to a smaller volume of received packets.

Figure 2D:
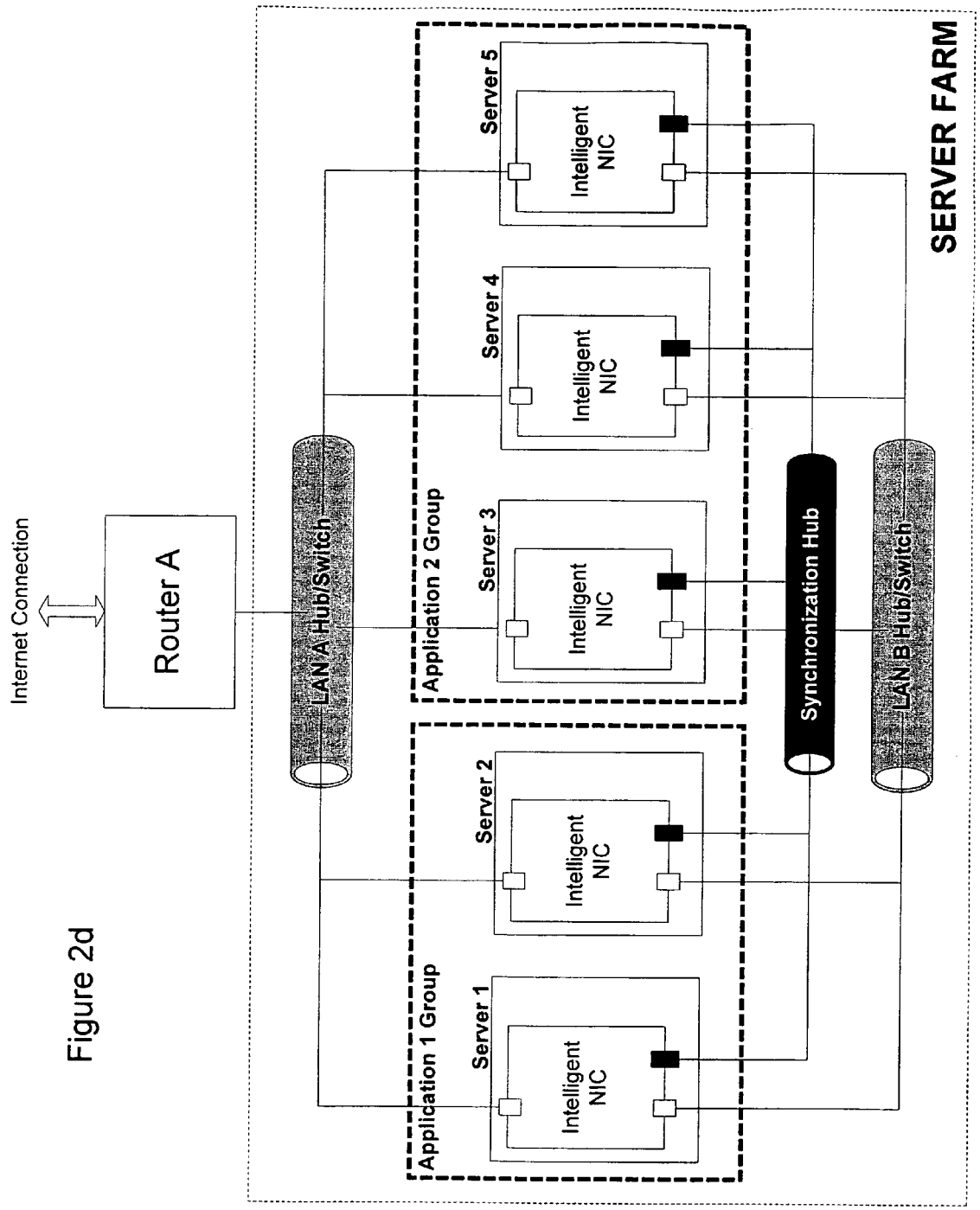
FIG. 2d is a block diagram of a system for processing information with a server farm, according to a fourth illustrative embodiment.

FIG. 2d is a block diagram of a system for processing information with a server farm, according to a fourth illustrative embodiment. In the example of FIG. 2d, two applications (namely, "application 1" and "application 2") are deployed by servers within the server farm. In other respects, the system of FIG. 2d is similar to the system of FIG. 2a. Accordingly, the distributed architecture (of the illustrative embodiments) provides for deployment of multiple applications with a single IP network connection.

As shown in FIG. 2d, servers 1 and 2 are grouped ("application 1 group") to deploy application 1, and servers 3, 4 and 5 ("application 2 group") are grouped to deploy application 2. For example, the server farm of FIG. 2d is configurable to host two web sites (e.g. www.firstsite.com and www.secondsite.com) with a single IP network connection. Client requests to a first URL (e.g. www.firstsite.com) are processed by application 1 group, and client requests to a second URL (e.g. www.secondsite.com) are processed by application 2 group.

For each web site, IP addresses are advertised by either the DNS round-robin approach or the redirector device round-robin approach, as discussed hereinabove in connection with FIG. 2a. For example, IP addresses of servers 1 and 2 are associated with the first URL (www.firstsite.com), and such IP addresses can be advertised in round-robin manner. Similarly, IP addresses of servers 3, 4 and 5 are associated with the second URL (www.secondsite.com), and such IP addresses can be advertised in round-robin manner.

Under the DNS round-robin approach: (a) for application 1 group in association with the first URL, the DNS advertises IP addresses of servers 1 and 2 in a round-robin manner; and (b) for application 2 group in association with the second URL, the DNS advertises IP addresses of servers 3, 4 and 5 in a round-robin manner.

Under a first version of the redirector device round-robin approach: (a) for application 1 group in association with the first URL, the DNS advertises a first redirector device's IP address; and (b) for application 2 group in association with the second URL, the DNS advertises a second redirector device's IP address. In that manner, a client initially communicates with the first redirector device (for application 1 group in association with the first URL) or the second redirector device (for application 2 group in association with the second URL). In an alternative embodiment, a single redirector device operates in association with both the first and second URLs for application 1 group and application 2 group, respectively.

In response to the first redirector device receiving a connection request from a client, the first redirector device selects a server (in a round-robin manner among servers 1 and 2) and outputs the selected server's IP address to the client (e.g. via HTTP redirect command). Likewise, in response to the second redirector device receiving a connection request from a client, the second redirector device selects a server (in a round-robin manner among servers 3, 4 and 5) and outputs the selected server's IP address to the client.

Description of Intelligent Network Interface Controller ("iNIC")

FIG. 3 is a block diagram of intelligent network interface controller ("iNIC") circuitry and conventional main board circuitry of a server of a server farm, according to the illustrative embodiments. FIG. 3 shows example components of the iNIC. For clarity, various interconnections between such components are discussed hereinbelow in connection with FIGS. 5a-c, 8 and 13-17, rather than FIG. 3. The iNIC of FIG. 3 is a representative one of the iNICs of the systems of FIGS. 2a-d, 4a-b, 7 and 13-17.

As shown in FIG. 3, each iNIC includes at least one network processor. The network processor includes programmable hardware and firmware for performing various operations, including packet classification, table lookups, packet manipulation, and packet routing. For example, the network processor includes a packet classification engine and a general-purpose processor core, as discussed hereinbelow in connection with FIGS. 5a-c and FIG. 8.

In the illustrative embodiments, the classification engine is an application specific integrated circuit ("ASIC") or a set of integrated programmable multi-threaded microengines. The classification engine is programmable and examines the headers and contents of packets at rates approaching wire speed. Other embodiments of the classification engine are possible.

The network processor classifies and manipulates packets that are examined by the classification engine. The classification engine executes a set of instructions that are collectively referred to as the "rules code." In the network processor, the processor core performs various management tasks. The processor core executes a set of instructions that is referred to as the "action code."

The classification engine examines packet information (e.g. header information), verifies checksums, and matches IP fields to records of previously stored tables of information. Various tables of the illustrative embodiments are shown in FIG. 12, which is discussed further hereinbelow. For example, the classification engine is operable to classify a packet according to whether the packet is a TCP/IP packet, and according to whether the packet's source IP address and source TCP port match an existing record in a table (e.g. with table keys being source IP address and source TCP port).

In response to such a match, the network processor is operable to perform an action on the packet (e.g. send the packet to the protocol stack) in response to software instructions stored in the iNIC's memory (e.g. SRAM/SDRAM). In the illustrative embodiments, the network processor is a commercially available processor, such as Intel's IXP1200 processor (available from www.intel.com) or Motorola's C-5 Digital Communications processor (available from www.motorola.com).

In the illustrative embodiments, the IP operations system ("ipOS") refers to methods, circuitry, and system architecture of the iNIC for classifying, manipulating and performing actions in response to packets. Accordingly, the ipOS includes the instructions executable by the network processor, the forwarding processor, and the protocol stack processor of FIG. 3. For example, the ipOS includes various instructions for performing operations of the iNIC within the server farm, such as client request load-balancing, packet routing, maintenance of connection endpoints, communications to and from particular applications, and control of application processes (and associated software component objects) deployed on the server farm.

The iNIC stores various tables of information in support of ipOS decisions about packets and control of server farm resources. As shown in FIG. 3, the tables include various information, such as state information, routing information, process information, and protocol stack information. Such tables are shown in FIG. 12, which is discussed further hereinbelow.

The protocol stack includes a series of routines for processing packets. Conventionally, the protocol stack has been part of the OS and has executed in kernel mode. By comparison, in the illustrative embodiments, the iNIC's protocol stack processor executes instructions to perform the protocol stack operations. Accordingly, such operations are offloaded from the OS.

Also, the iNIC includes circuitry for processing of forwarded packets, which are sent from one server's iNIC to another server's iNIC for processing. The forwarding processor operates to route forwarded packets at rates approaching wire speed. Possible embodiments of the forwarding processor include a field programmable gate array ("FPGA") or an ASIC.

FIG. 3 shows an example iNIC configuration that includes three IP packet ports (designated as Port A, Port B, and Port C) and a single synchronization port (designated as Synch Port). Each IP packet port is configurable to be full duplex and to accommodate a variety of port protocols (e.g. Ethernet, ATM and FDDI). The synchronization port is configurable in the same manner as an IP packet port or, in an alternative embodiment, is specially configured. The configuration of the synchronization port is selected according to a particular application deployed on the server farm. With suitable circuitry, extremely fast synchronization is achievable for a particular application.

Also, the iNIC includes a memory for storing various data structures to represent the connection endpoints for client-server socket-based application connections. Moreover, the iNIC includes Direct Memory Access ("DMA") circuitry for sending information (a) from the iNIC directly to the main board circuitry's memory and (b) from the main board circuitry's memory to the iNIC's memory. In an alternative embodiment, the iNIC includes additional circuitry and firmware (for clarity, not shown in FIG. 3) for performing specified encryption operations.

Description of Client Request Load-Balancing

The iNIC performs server farm load-balancing of socket application client requests. Round-robin approaches to advertise IP addresses (e.g. DNS round-robin approach or redirector device round-robin approach) have limited ability to effectively load-balance. For example, in selecting a server to process a client request, round-robin approaches substantially fail to account for the client request's specific details such as session management. Accordingly, in the illustrative embodiments, after a connection is established between the selected server and a client, the selected server is operable to selectively forward packets (received from a client) for processing by another server (within the server farm).

Figure 4A:
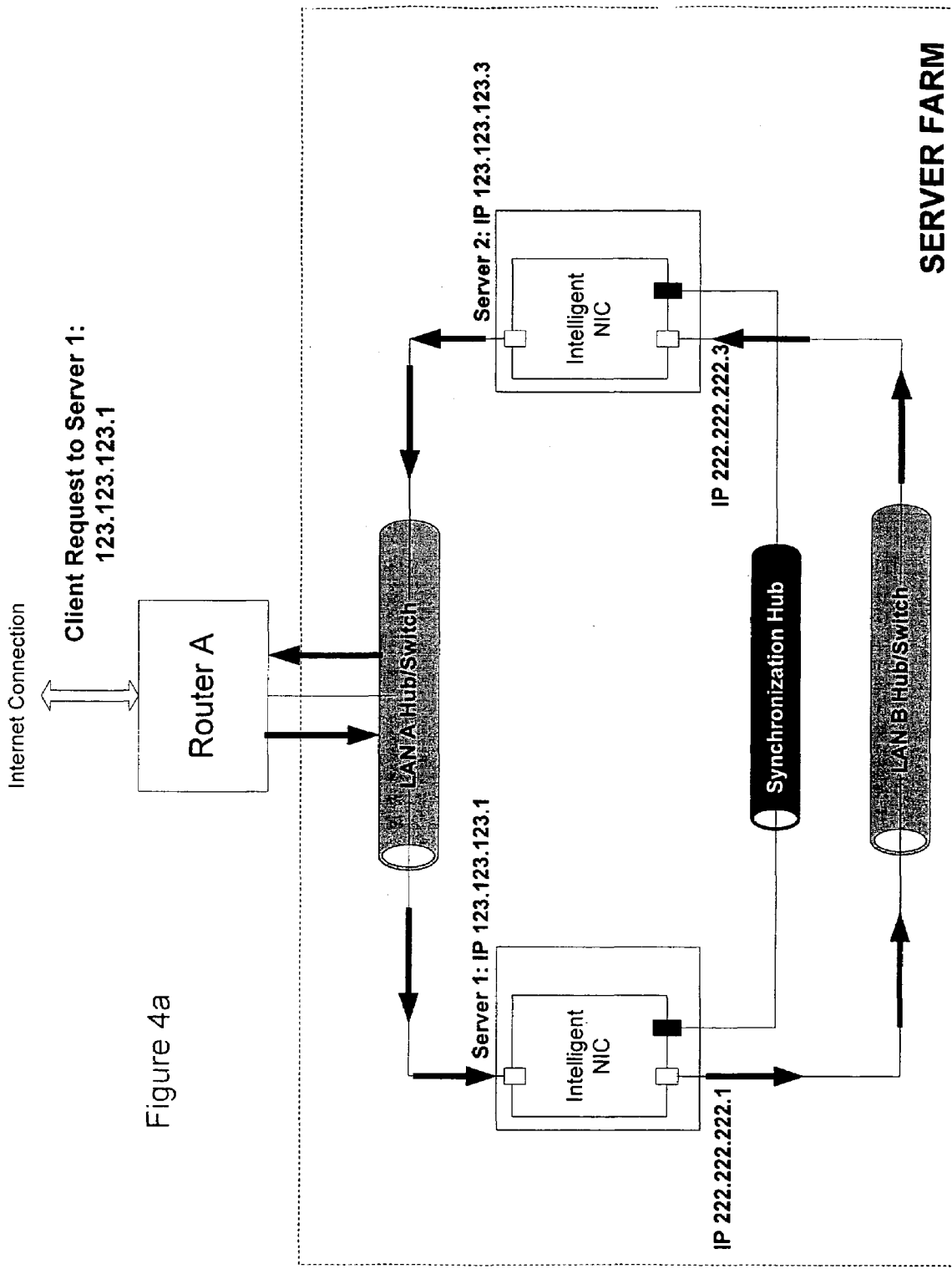
FIG. 4a is a block diagram of a system for processing information with a server farm, according to an illustrative embodiment in which a first server forwards packets for processing by a second server.

FIG. 4a is a block diagram of a system for processing information with a server farm, according to an illustrative embodiment in which server 1's iNIC forwards (or "outputs") packets for processing by server 2's iNIC (and, in some instances, by server 2's application layer), according to ipOS logic of server 1's iNIC. For clarity, the processing of response packets by server 2's application layer is not shown in FIG. 4a. In forwarding packets, server 1's iNIC operates substantially independently of server 1's application layer. Server 2's iNIC is substantially identical to server 1's iNIC, so the operation of server 1 is likewise representative of the operation of server 2.

In the example of FIG. 4a, arrows show the directions in which packets are communicated between router A, server 1 and server 2. For example, a client sends (or "outputs") a request to server 1 at IP 123.123.123.1. Router A receives the client request and outputs it to LAN A hub/switch for receipt by server 1.

Server 1's iNIC (in response to instructions of its ipOS) determines whether to forward packets associated with the client connection from server 1's iNIC to server 2's iNIC. If so, in response to receiving such a packet from the client, server 1's iNIC (in response to instructions of its ipOS) encapsulates the packet with additional information (as discussed hereinbelow) and forwards it to a physical port (IP 222.222.222.3) on server 2's iNIC. In response to receiving the encapsulated packet from server 1's iNIC, server 2's iNIC (in response to instructions of its ipOS) unpacks and processes the encapsulated packet.

Accordingly, in such a situation, server 2's iNIC (in response to instructions of its ipOS): (a) in response to such information received from server 1's iNIC, establishes a connection endpoint in the memory of server 2's iNIC for the particular client-server socket-based application connection; (b) if appropriate for the packet, processes and sends information from the packet to server 2's application layer; and (c) if appropriate for the packet, processes and sends response packets to the client through the IP network in response to information from server 2's application layer. The protocol stack processor of server 2's iNIC (in response to instructions of its ipOS) adds suitable header information to the response packet and sends it to the client through the IP network-connected port (IP 123.123.123.3) of server 2's iNIC. Although the response packet is sent to the client from server 2, the response packet appears (from the client's perspective) to be sent from server 1.

Figure 4B:
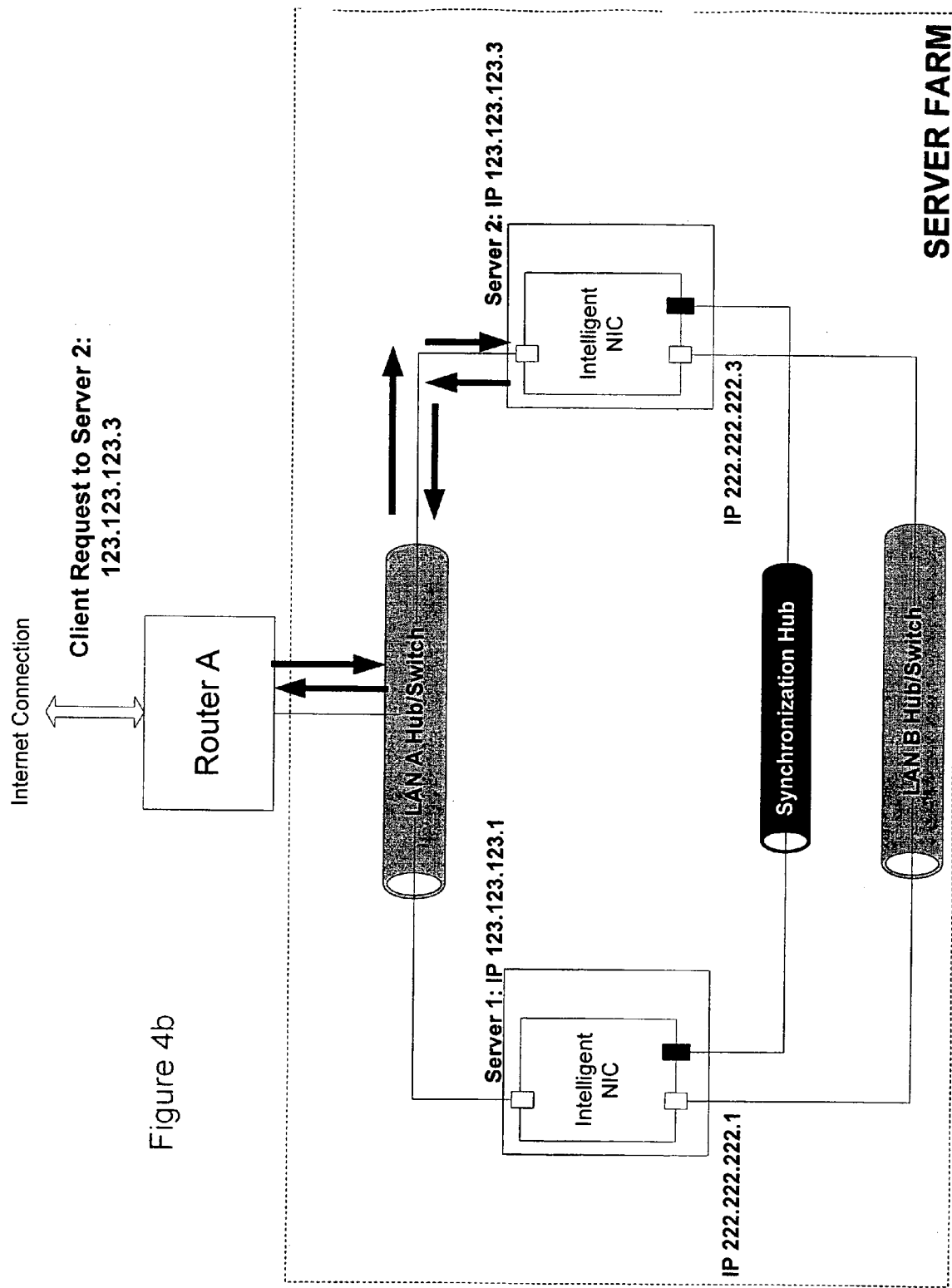
FIG. 4b is a block diagram of the system of FIG. 4a, according to an illustrative embodiment in which the second server processes packets without forwarding to the first server.

FIG. 4b is a block diagram of the system of FIG. 4a, according to an illustrative embodiment in which server 2 processes packets without forwarding to server 1. Server 1 is substantially identical to server 2, so the operation of server 2 is likewise representative of the operation of server 1. In the example of FIG. 4b, arrows show the directions in which packets are communicated between router A and server 2. For example, a client sends a request to server 2 at IP 123.123.123.3. Router A receives the client request and outputs it to LAN A hub/switch for receipt by server 2.

Server 2's iNIC determines (in response to instructions of its ipOS) whether to forward packets associated with the client request to server 2. If not, in response to receiving such a packet from the client, server 2's iNIC (in response to instructions of its ipOS) keeps the packet and processes it.

Accordingly, in such a situation, server 2's iNIC (in response to instructions of its ipOS): (a) establishes a connection endpoint in the memory of server 2's iNIC for the particular client-server socket-based application connection (b) if appropriate for the packet, processes and sends information from the packet to server 2's application layer; and (c) if appropriate for the packet, processes and sends response packets to the client through the IP network in response to information from server 2's application layer. The protocol stack processor of server 2's iNIC (in response to instructions of its ipOS) adds suitable header information to the response packet and sends it to the client through the IP network-connected port (IP 123.123.123.3) of server 2's iNIC. The response packet appears (from the client's perspective) to be sent from server 2.

Description of iNIC Packet Flow

Figure 5A:
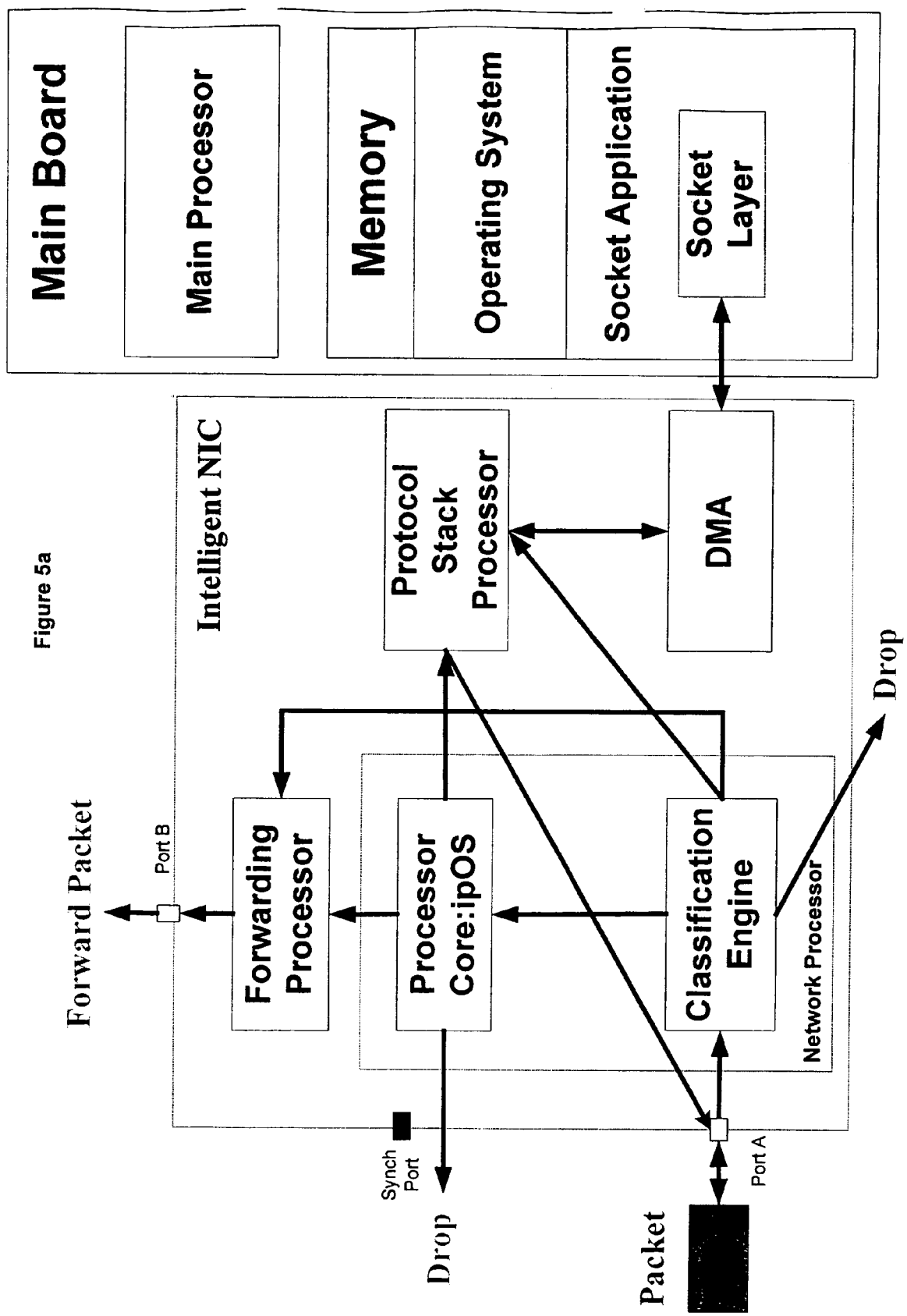
FIG. 5a is a block diagram of the iNIC and main board circuitry of FIG. 3, according to an illustrative embodiment in which the iNIC processes information received and output through a Port A.

FIG. 5*a* is a block diagram of the iNIC and main board circuitry of FIG. 3, according to an illustrative embodiment in which the iNIC processes information received and sent through a Port A. FIG. 5*a* shows pathways by which various packets (received from clients through Port A) are communicated through the iNIC. For clarity, in the example of FIG. 5*a*, the iNIC has two IP packet ports (Port A and Port B) and a single synchronization port (Synch Port).

At Port A, the iNIC receives a packet and classifies it with the network processor classification engine. The classification engine executes the rules code to determine whether a match exists for the packet. If the packet is not destined for the server, fails checksum verification, or fails to match other criteria, then the classification engine drops (or "discards") the packet. If the packet is not dropped, the classification engine sends the classified packet, along with possible table lookup results, to either (a) the processor core for execution of ipOS action code, (b) the forwarding processor for processing, or (c) the protocol stack processor for processing.

In the illustrative embodiments, the classification engine is operable to perform the packet classification by reviewing one or more tables in response to a packet's information. For example, in response to the rules code, the classification engine determines whether a match exists between (a) the packet's source IP and source TCP port and (b) an existing table of source IP addresses and source TCP ports (e.g. to determine whether the packet should be forwarded to another server).

If the classification engine sends a classified packet to the processor core, then the processor core receives the packet and processes it according to the ipOS action code. In response to the action code, the processor core determines whether to (a) drop the packet, (b) send the packet to the protocol stack processor, or (c) process the packet and send it to the forwarding processor. If the processor core drops the packet, the processor core erases the packet's information from the iNIC's memory.

If the processor core sends the packet to the protocol stack processor, it does so during the connection setup process which is discussed further hereinbelow. In such a situation, the packet either: (a) is part of the connection setup process (e.g. SYN packet); or (b) is a request packet (e.g. during the socket to connection endpoint setup process) that is being processed locally without forwarding to another server.

If the processor core sends the packet to the forwarding processor, the packet either (a) is part of a new connection (e.g. including a connection endpoint) that is being migrated to another server's iNIC, or (b) is part of an existing connection that has already been migrated to another server's iNIC. In sending the packet to the forwarding processor, the processor core also sends information to the forwarding processor for encapsulation of the packet, thereby enabling the forwarding processor to encapsulate the packet before forwarding the packet to another server. If a connection is migrated from a first server to a second server, the client request packet (see FIGS. 10*a-c*) and all subsequent packets of the migrated connection bypass the first server's protocol stack and, instead, are processed by the second server's protocol stack. The forwarding processor is operable to receive packets from either the classification engine or processor core (in response to the processor core's action code). If the forwarding processor receives a packet from the classification engine, the forwarding processor forwards the packet to another iNIC through Port B at rates approaching wire speed. Before forwarding the packet, the forwarding processor encapsulates it with header information.

The protocol stack processor is operable to receive packets from either the processor core or the classification engine. If the protocol stack processor receives a packet from the processor core (in response to the processor core's action code), the packet is part of the connection setup process (e.g. during delayed connection endpoint to application socket binding). In the connection setup process for a packet received at Port A, the first packet received by the protocol stack processor from the processor core is the SYN packet (the SYN packet initiates creation of a connection endpoint). In association with such connection, the next packet received by the protocol stack processor from the processor core indicates a decision to process the connection locally without forwarding to another server.

If the protocol stack processor receives a packet from the classification engine, the packet either: (a) is part of the connection setup process (e.g. SYN packet); or (b) is a packet associated with an already established connection that is being processed locally without forwarding to another server. In FIG. 5*a*, if a packet has moved down the protocol stack for destination to a client, the protocol stack processor sends the packet to the client through Port A (which is coupled to the IP network). If a packet has moved up the protocol stack for destination to the main board circuitry's memory, the protocol stack processor sends information from the packet to the DMA circuitry.

Also, in FIG. 5*a*, the DMA circuitry (a) sends information from the iNIC directly to the main board circuitry's memory and (b) receives information from the main board circuitry's memory to the iNIC's memory. Accordingly, through the DMA circuitry and main board circuitry's memory, the protocol stack processor outputs information (from a packet) and a connection endpoint reference to an application that is associated with the connection endpoint. Likewise, through the main board circuitry's memory and the DMA circuitry, the protocol stack processor receives information from an application that is associated with a connection endpoint and, in response thereto, the protocol stack processor assembles a packet for destination to a client.

Figure 5B:
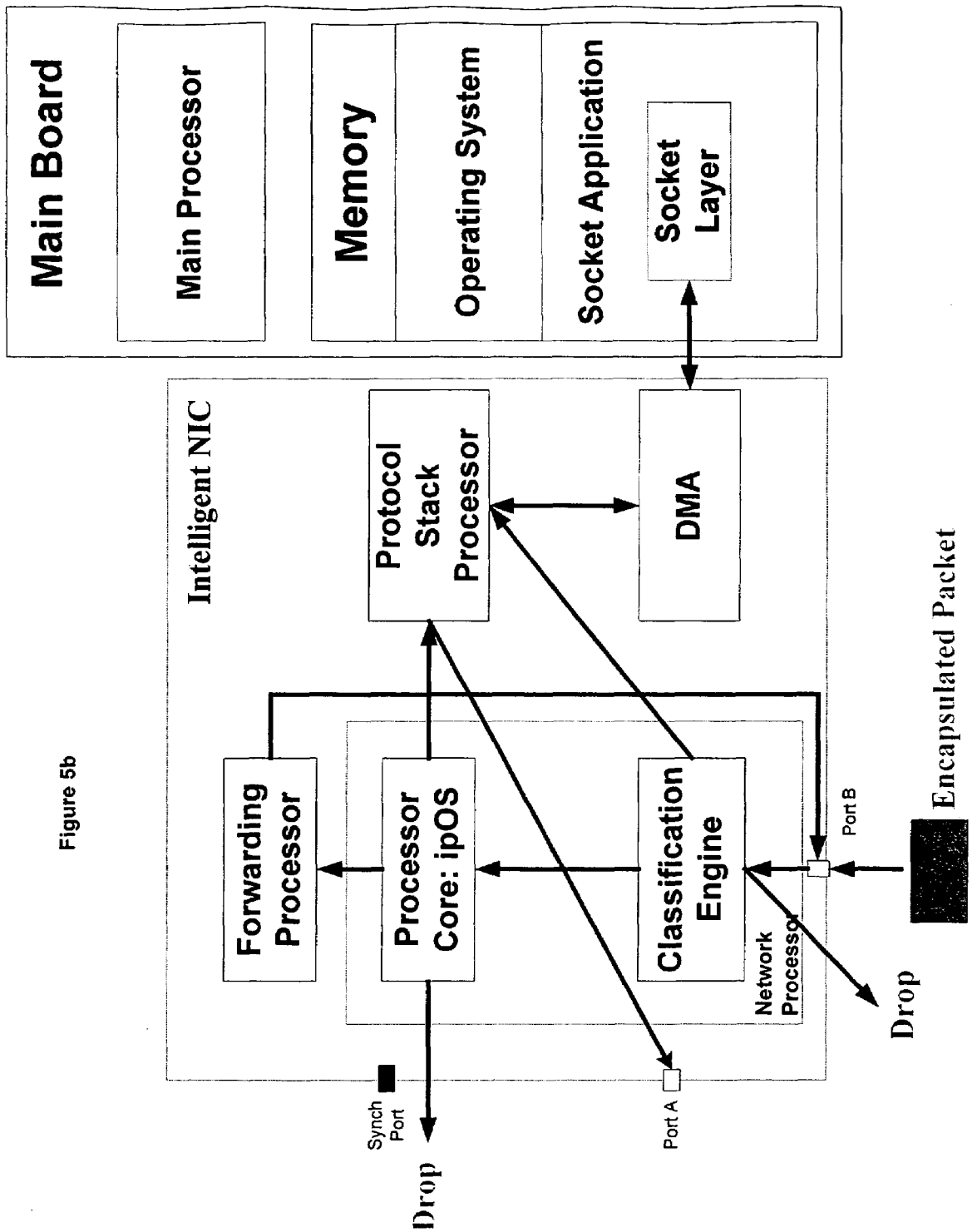
FIG. 5b is a block diagram of the iNIC and main board circuitry of FIG. 3, according to an illustrative embodiment in which the iNIC processes information received through a Port B.

FIG. 5*b* is a block diagram of the iNIC and main board circuitry of FIG. 3, according to an illustrative embodiment in which the iNIC processes information received through a Port B. FIG. 5*b* shows pathways by which various packets (received from other server iNICs within the server farm through Port B) are communicated through the iNIC. Such packets from other server iNICs are received as encapsulated packets at Port B and are classified by the classification engine, which executes the rules code to determine whether a match exists for the packet.

If the classification engine does not drop the packet, the packet is classified and either (a) is part of a new connection (e.g. including a connection endpoint) that is being migrated to the server's iNIC, or (b) is part of an existing connection that has already been migrated to the server's iNIC, or (c) is a verification that a connection was successfully migrated to another server's iNIC. If the packet is not dropped, the classification engine sends the classified packet to either (a) the processor core for execution of ipOS action code or (b) the protocol stack processor for processing.

If the encapsulated packet (received at Port B) is part of a new connection that is being migrated to the server's iNIC ("receiving server's iNIC"), the classification engine verifies the packet according to the packet's checksum algorithm. If the packet is verified, the classification engine sends information (e.g. the payload) of the packet to the processor core for establishing a connection endpoint that is associated with the new connection. After the processor core establishes the connection endpoint, (a) the processor core sends information to the protocol stack processor for binding (or "associating") the connection endpoint to an appropriate socket and its associated socket application, and (b) the processor core forms an encapsulated acknowledgement packet and sends it to the forwarding processor, which outputs such packet to another server's iNIC ("forwarding server's iNIC") through Port B as a verification that the connection endpoint was successfully migrated to the receiving server's iNIC.

If the encapsulated packet (received at Port B) is a verification that a connection endpoint was successfully migrated to the iNIC of another server ("receiving server"), the classification engine sends information of the packet (along with a reference to the connection endpoint) to the processor core. In response to such information and reference, the processor core (in response to instructions of its ipOS) erases the connection endpoint from the iNIC's memory and drops the packet. After such verification of the connection endpoint migration, the iNIC (in response to instructions of its ipOS) sends (through the forwarding processor) all packets associated with the connection to the receiving server.

The protocol stack processor is operable to receive packets from either the classification engine or the processor core. If the encapsulated packet (received at Port B) is part of an existing connection that has already been migrated to the server's iNIC, the protocol stack processor receives the packet from the classification engine. In response thereto, the protocol stack processor (a) verifies and removes the packet's header and (b) processes information (e.g. the IP packet payload) of the packet associated with an already established connection endpoint.

If the protocol stack processor receives a packet from the processor core, the packet is part of the connection setup process. In response to such a packet from the processor core, the protocol stack processor binds (or "associates") the packet's associated connection endpoint to an appropriate socket and its associated socket application. The socket application is executed by the main board circuitry.

Accordingly, in such a situation, through the DMA circuitry and main board circuitry's memory, the iNIC's protocol stack processor sends a request (along with a reference to the connection endpoint) to the main board circuitry. In response to such request, the main board circuitry stores the reference ("connection endpoint reference") within a socket. The socket is related to a suitable associated socket application for servicing the connection. In that manner, the socket application is related to (and associated with) the connection endpoint, as discussed further hereinbelow in connection with FIG. 13.

In FIG. 5b, if a packet has moved down the protocol stack for destination to a client, the protocol stack processor outputs the packet to the client through Port A (which is coupled to the IP network). If a packet has moved up the protocol stack for destination to the main board circuitry's memory, the protocol stack processor outputs information from the packet to the DMA circuitry.

Also, in FIG. 5b, the DMA circuitry sends information (a) from the iNIC directly to the main board circuitry's memory and (b) from the main board circuitry's memory to the iNIC's memory. Accordingly, through the DMA circuitry and main board circuitry's memory, the protocol stack processor outputs information (from a packet) and a connection endpoint reference to an application that is associated with the connection endpoint. Likewise, through the main board circuitry's memory and the DMA circuitry, the protocol stack processor receives information from an application that is associated with a connection endpoint and, in response thereto, the protocol stack processor assembles a packet for destination to a client.

Figure 5C:
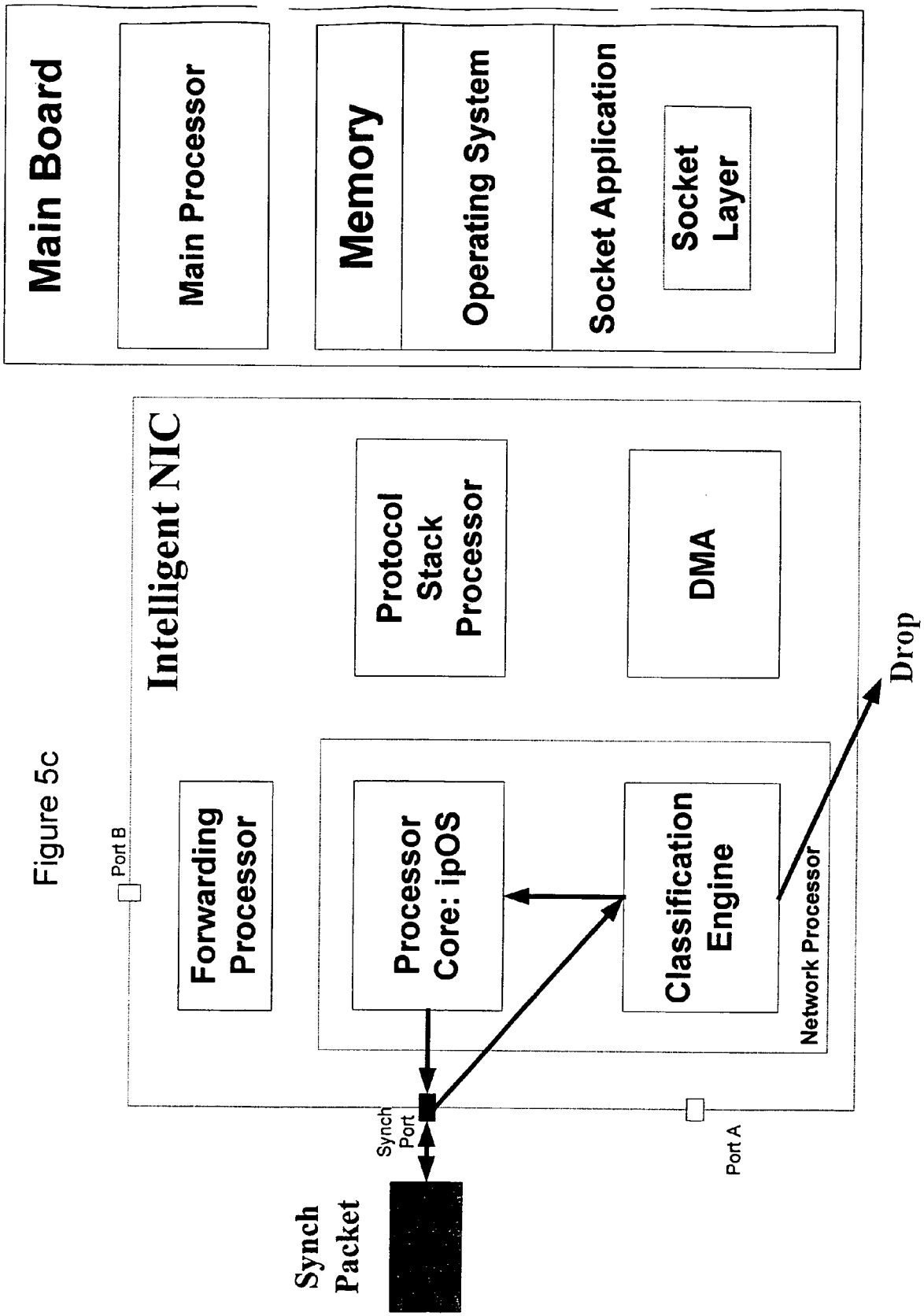
FIG. 5c is a block diagram of the iNIC and main board circuitry of FIG. 3, according to an illustrative embodiment in which the iNIC processes information received and output through a Synch Port.

FIG. 5c is a block diagram of the iNIC and main board circuitry of FIG. 3, according to an illustrative embodiment in which the iNIC processes information received and sent through a Synch Port. FIG. 5c shows pathways by which various packets (received from other servers within the server farm through the Synch Port) are communicated through the iNIC. At the Synch Port, the iNIC receives the packet and classifies it with the classification engine.

If the classification engine determines that the packet is a synchronization packet, the classification engine sends the packet to the processor core for processing according to the ipOS action code. In response thereto, the processor core reads synchronization information from the synchronization packet and writes such information into a suitable state table of the iNIC memory. After suitably processing the synchronization packet, the processor core drops it.

Also, through the Synch Port, the processor core is responsible for sending the server's state to others servers in the server farm. Accordingly, at specified synchronization intervals, the processor core assembles specified synchronization information into a packet. Then, the processor core outputs the assembled packet through the Synch Port for distribution to other servers in the server farm.

Description of Server Farm State Synchronization

Figure 6:
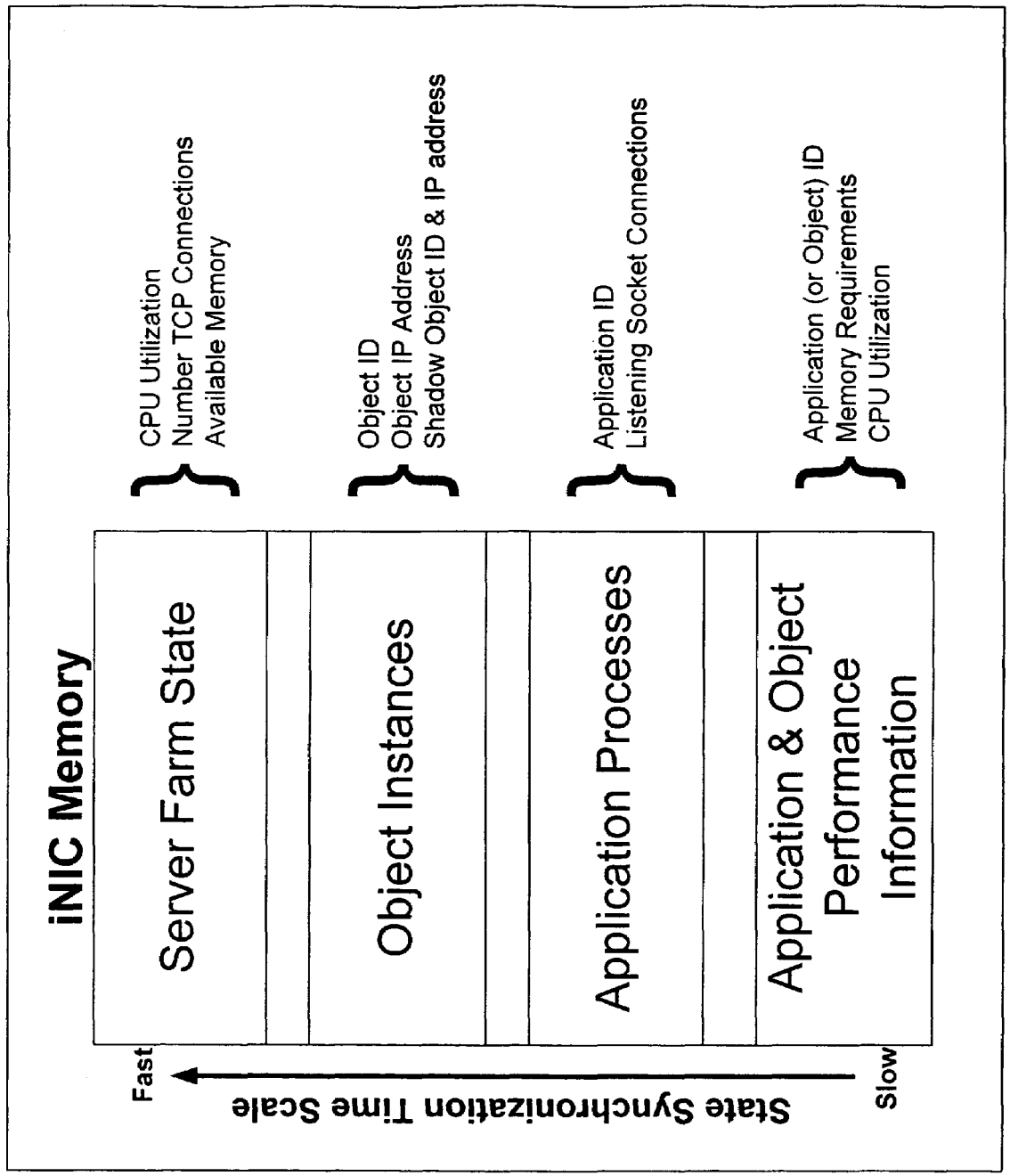
FIG. 6 is a conceptual illustration of information stored in a memory of the representative iNIC of FIG. 3.

FIG. 6 is a conceptual illustration of information stored in a memory of the representative iNIC of FIG. 3. In the illustrative embodiments, the servers in the server farm endeavor to synchronize state information with one another by sending and receiving the state information through the server farm's synchronization hub. FIG. 6 illustrates the types of information stored by the iNIC in the synchronization process.

Through the synchronization port of a server's iNIC, the server sends information to the other servers in the server farm. In the memory of the server's iNIC, the server stores information that represents the state of other servers in the server farm. Such information is accessible to the server's ipOS.

On a high priority basis (e.g. high frequency), the iNIC receives information that represents the state of other servers in the server farm. In an illustrative embodiment, such information ("server farm state information") includes the other servers' respective number of then-currently established TCP connections, CPU utilization, available main board circuitry memory, available server bandwidth, and/or other suitable information for high priority synchronization of the server farm's servers.

On a medium priority basis (e.g. medium frequency), the iNIC receives information about local and foreign object instances being executed by servers in the server farm ("object instances"). In an illustrative embodiment, for object instances, such information includes an object identification tag (along with its IP address) and a shadow object identification tag (if any, along with its IP address), and/or other suitable information for medium priority synchronization of the server farm's servers.

Also, on a medium priority basis, the iNIC receives information about local and foreign application processes being executed by servers in the server farm. In an illustrative embodiment, for application processes, such information includes an application process identification tag (along with its IP address), TCP port (e.g. listening socket connection information), and/or other suitable information for medium priority synchronization of the server farm's servers.

On a much lower priority basis (e.g. lower frequency), the iNIC receives application process (and component object) performance information. In an illustrative embodiment, such information includes an application process (or object) identification tag, application process (or object) memory size, average CPU utilization, information on application processes (and component objects) that are stored by particular servers for execution, and/or other suitable information for low priority synchronization of the server farm's servers. Referring also to FIGS. 3 and 12, the iNIC's application information table (included within the process information in iNIC memory) stores information for mapping a specified application process (or object) identification tag to the application process's (or object's) memory requirements and CPU utilization.

Within the server farm, on a periodic basis, each server advertises its state by outputting a UDP message through the synchronization port of the server's iNIC. Other servers (in the server farm) receive the message and store information from the message into their respective iNIC memories. Accordingly, in that manner within the server farm, such information is accessible to any server's ipOS, and the server farm's servers perform load-balancing and resource management operations in response to such information.

Description of Dynamic Load Balancing

In the illustrative embodiments, the iNIC (in response to instructions of its ipOS) executes a process for dynamic load-balancing of client requests across servers within the server farm. The load-balancing technique includes a process to select a suitable server for processing a client request. For efficiency, the technique favors selection of the server that initially receives the client request. With a set of n available servers that synchronize their state tables (e.g. by storing identical server farm state information), the server (which initially receives the client request) executes the load-balancing process to select a server (from among the n available servers in the server farm) for processing the client request.

For additional efficiency in the illustrative embodiments, in response to instructions of its ipOS, the iNIC of a server (which initially receives the client request) executes the load-balancing process only when the server reaches a predetermined threshold of activity. In the illustrative embodiments, the server calculates whether such threshold has been reached, in response to some or all of the state table information. Example thresholds are (a) a maximum number of TCP connections then-currently established by the server or (b) a maximum CPU utilization within the server.

A potential shortcoming of load-balancing techniques is that multiple simultaneous client requests may result in one particular server processing many (or all) of the simultaneous client requests, without forwarding a suitable number of the simultaneous client requests to another server in the server farm (e.g. the load-balancing process may select the same server for processing all of the simultaneous client requests). Such a result leads to a process called thrashing. In the illustrative embodiments, the load-balancing technique substantially avoids thrashing by selecting a server to process a request in response to a probability distribution.

According to such a probabilistic technique, the iNIC (in response to instructions of its ipOS) executes a process for dynamic load-balancing in response to a number of TCP connections then-currently established by each server. The probability of a server being selected is inversely proportional to the number of TCP connections then-currently established by the server. In the illustrative embodiments, this probability is calculated in accordance with Equations (1) and (2) below.

$$p_i = \frac{k}{CN_i} \quad \text{for } i = 1, 2, 3, \ldots, n \quad (1)$$

$$k = \frac{1}{\sum_{j=1}^{n} \frac{1}{CN_j}} \quad (2)$$

In Equation (1), (a) $p_i$ is the probability that the load-balancing technique will result in the client request being serviced by the $i^{th}$ server (among n servers in the server farm), (b) $CN_i$ is the number of TCP connections then-currently established by server i, and (c) k is a constant that is calculated in accordance with Equation (2). In Equation (2), (a) $CN_j$ is the number of TCP connections then-currently established by server j and (b) n is the number of servers in the server farm.

Figure 7:
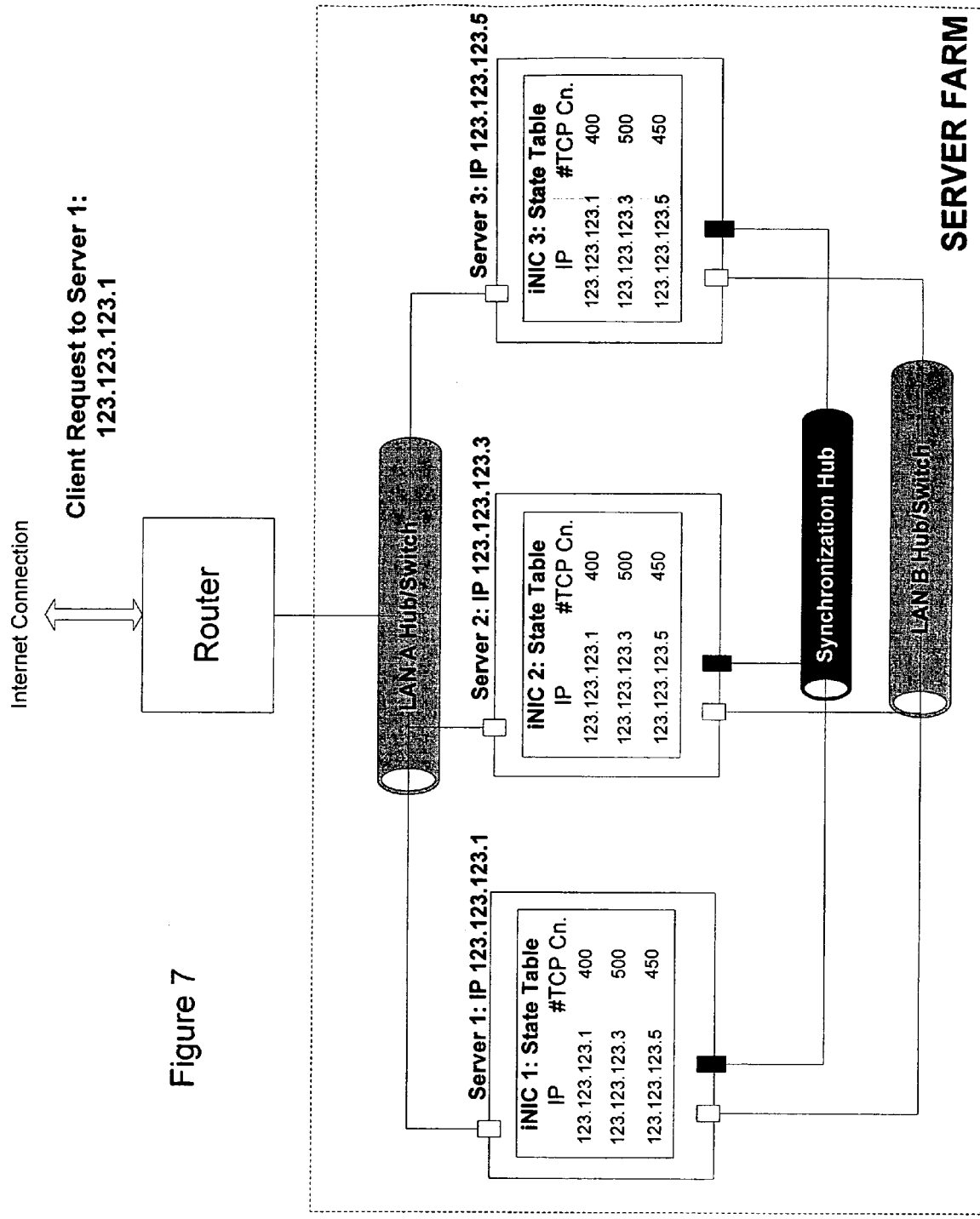
FIG. 7 is a block diagram of a system for processing information with a server farm, according to an illustrative embodiment in which three servers perform load-balancing of client requests.

FIG. 7 is a block diagram of a system for processing information with a server farm, according to an illustrative embodiment in which servers 1, 2 and 3 perform load-balancing of client requests. In the example of FIG. 7, servers 1, 2 and 3 have synchronized (e.g. servers 1, 2 and 3 have identical state tables in their respective iNIC memories). Moreover, in the example of FIG. 7, each of servers 1, 2 and 3 has exceeded a predefined threshold of activity (e.g. number of TCP connections greater than a threshold).

Accordingly, in the illustrative embodiments, received client requests are load-balanced within the server farm. In the example of FIG. 7, server 1 receives a client request, and the iNIC of server 1 (in response to instructions of its ipOS) executes the load-balancing process. The iNIC of server 1 (in response to instructions of its ipOS) calculates a probability that any one of servers 1, 2 or 3 will be selected to process the client request.

In response to the example state information of FIG. 7, the iNIC of server 1 (in response to instructions of its ipOS) calculates the following probabilities for servers 1, 2 or 3, respectively: $p_1$=0.37, $p_2$=0.33, and $p_3$=0.30. To determine which of servers 1, 2 or 3 actually be selected to process the client request, the iNIC of server 1, in response to instructions of its ipOS, (a) executes a pseudo random number generator for identifying a random number between 0 and 1 and (b) compares the random number to the calculated probabilities, in order to select one of servers 1, 2 or 3. For example, if the random number is less than 0.37, the iNIC of server 1 (in response to instructions of its ipOS) selects server 1. By comparison, if the random number is greater than 0.37 yet less than 0.7 (0.37+0.33), the iNIC of server 1 (in response to instructions of its ipOS) selects server 2. Otherwise, if the random number is greater than 0.7, the iNIC of server 1 (in response to instructions of its ipOS) selects server 3.

Description of ipOS Threads

Figure 8:
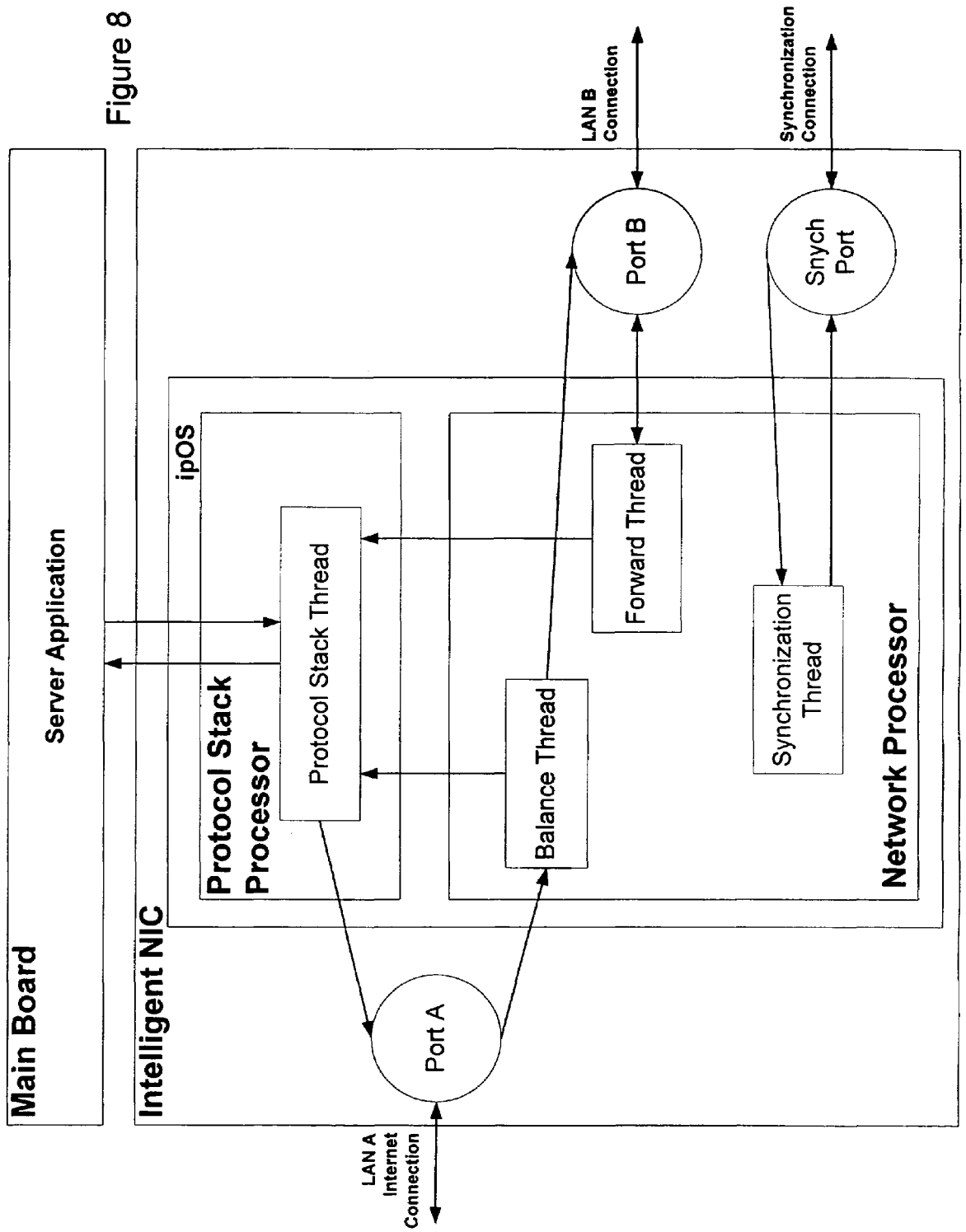
FIG. 8 is a data flow diagram of process threads executed by the representative iNIC of FIG. 3.

FIG. 8 is a data flow diagram of process threads executed by the representative iNIC of FIG. 3. FIG. 8 shows ipOS components, which include one or more threads of execution. In the example of FIG. 8, the ipOS components include four threads of execution. For clarity, FIG. 8 does not illustrate the packet processing performed by the forwarding processor (e.g. the splicing of an ipOS encapsulation header to a packet) for the creation and sending of encapsulated packets through Port B.

Each thread of execution includes a packet classification component and an action code component. For example, if applicable to a particular thread, the thread processes a packet by classifying the packet according to a set of classification rules. After classifying the packet, the thread processes the packet by performing operations associated with the classification.

As shown in FIG. 8, the ipOS components include a balance thread, a forward thread, and a synchronization thread. Each of those threads includes program code that is executable by the network processor for performing operations associated with the particular thread. Also, the ipOS components include a protocol stack thread. The protocol stack thread includes program code that is executable by the protocol stack processor for performing operations associated with the protocol stack thread.

Referring also to FIG. 3, the iNIC's memory stores routing information, which includes tables that are searchable in response to a thread's packet classification component or action code component. In response to a search key, the iNIC (in response to instructions of its ipOS) searches a table to locate a record of information associated with the search key. The iNIC (in response to instructions of its ipOS) is programmed to match the search key with specific fields of a packet.

As shown in FIG. 8, at Port A, the iNIC (a) receives a packet from a client through the IP network and (b) sends the packet to the balance thread. The balance thread processes the packet by classifying the packet according to a set of classification rules. In communicating the packet through the balance thread, the balance thread reads local, temporary, forward, and listening socket tables.

FIG. 12 is a conceptual illustration of tables stored by a server's iNIC memory, according to the illustrative embodiments. In particular, FIG. 12 shows the types of fields (and descriptions thereof) in each table. Also, FIG. 12 shows whether a particular field is used as a key for locating records in the table. Accordingly, for example, the local, forward-connect, and temporary tables have the same types of fields and keys.

The local, forward-connect, and temporary tables store information representative of connection endpoints in various states. Because these tables store information representative of connection endpoints, a packet's source IP address, source TCP port, destination IP address, and destination TCP port are used as keys for locating records in the tables. Each record is capable of storing additional information beyond the fields shown in FIG. 12, and the server's iNIC is capable of storing additional tables beyond the tables shown in FIG. 12.

The local table stores information representative of connection endpoints that are attached to a socket associated with a local application (i.e. an application executed by the server that stores the table). The forward-connect table stores information representative of connection endpoints that have been migrated to the server. The temporary table stores information representative of connection endpoints that are not yet attached to a socket associated with an application (e.g. the server is assessing the client request). Accordingly, in the temporary table, such connection endpoints have a state associated with a delayed connection endpoint to application socket bind (as discussed further hereinbelow).

The forward table stores information representative of connection endpoints that have been migrated to a different server. Accordingly, such connection endpoints are attached to a socket that is associated with a non-local application (i.e. an application executed by the different server). The listening sockets table stores information representative of an IP address and TCP port of a listening socket associated with an application.

Figure 9A:
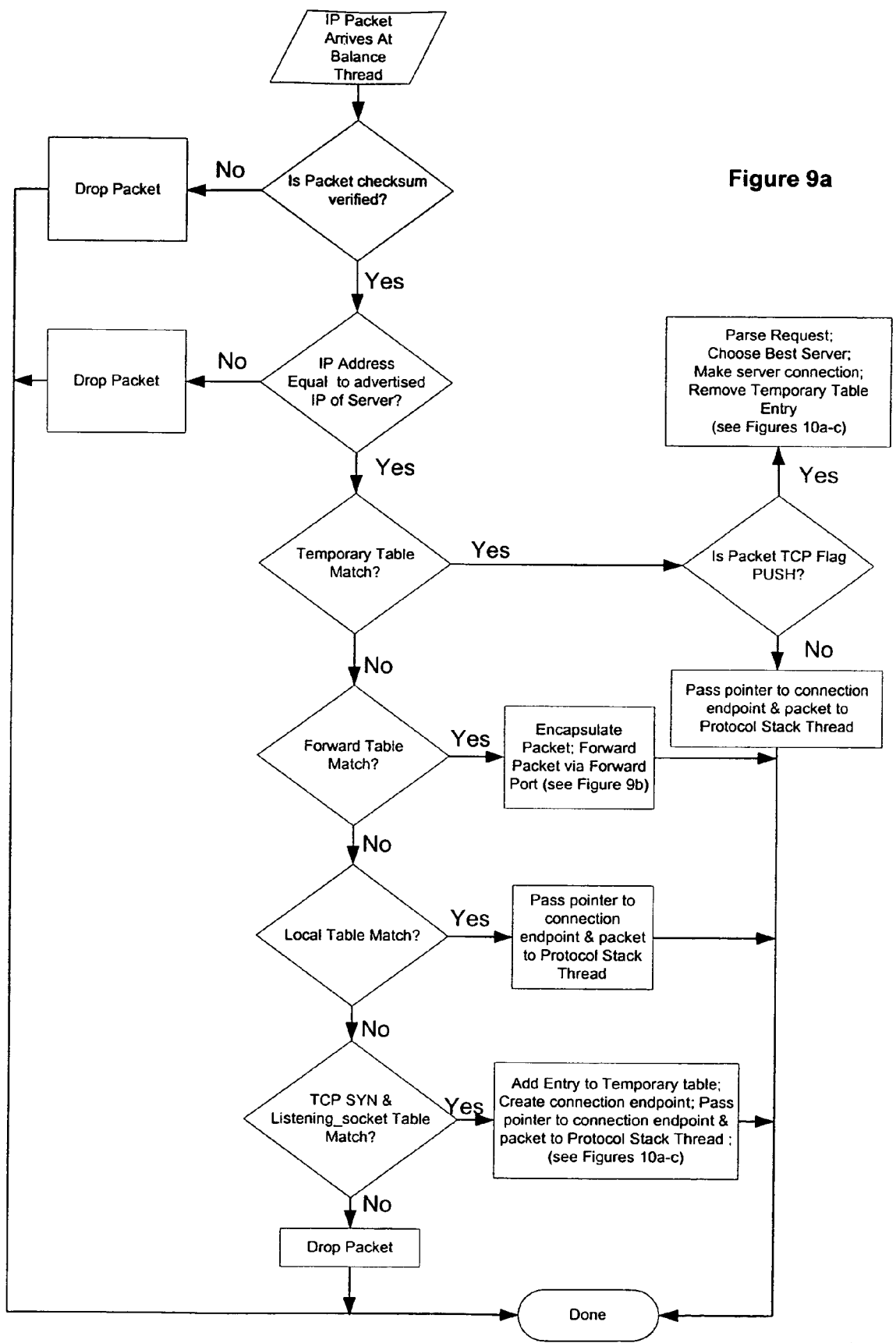
FIG. 9a is a flowchart of a balance thread of FIG. 8.

FIG. 9a is a flowchart of the balance thread of FIG. 8 for TCP/IP based applications. FIG. 9a shows a detailed communication of a packet through the balance thread, in which the packet is processed in a sequence of steps until the packet is either dropped or output from the balance thread. If the packet satisfies a particular rule, the iNIC (in response to instructions of its ipOS) performs a suitable operation in response to the packet.

As shown in FIG. 9a, an IP packet enters the balance thread from Port A. The iNIC (in response to instructions of its balance thread) verifies the packet according to its checksum algorithm (16-bit one's compliment sum). If the packet is corrupt (as evidenced by a failure to verify according to its checksum algorithm), then the packet is dropped.

After verifying the packet according to its checksum algorithm, the iNIC (in response to instructions of its balance thread) reads the packet's destination IP address to verify that the packet is addressed to the iNIC's server. If the packet is not addressed to the iNIC's server, then the packet is dropped.

After verifying that the packet's destination IP address matches the server's IP address, the iNIC (in response to instructions of its balance thread) determines whether the packet's source IP address and source TCP port match a record in the temporary table. If so, a client has initiated a connection, but the connection endpoint has not yet attached to a socket associated with an application. In such a situation, the iNIC (in response to instructions of its balance thread) reads the packet to determine whether it represents a client request (e.g. the first packet in which the TCP flag is set to PUSH).

If the packet is not a client request (e.g. TCP Flag set to ACK), the iNIC (in response to instructions of its balance thread) sends the packet and a reference to the connection endpoint (stored in the temporary table's matching record) to the protocol stack thread (which is executed by the iNIC's protocol stack processor). By comparison, if the packet is a client request (i.e. PUSH), the iNIC (in response to instructions of its balance thread) reviews the request and selects a server to process the request (e.g. according to the load-balancing technique). If the selected server is a different server (i.e. not the iNIC's server), the iNIC (in response to instructions of its balance thread) migrates the connection endpoint to the selected server.

If the packet's source IP address and source TCP port do not match a record in the temporary table, the iNIC (in response to instructions of its balance thread) determines whether the packet is part of an already established connection to a different server. Accordingly, the iNIC (in response to instructions of its balance thread) determines whether the packet's source IP address and source TCP port match a record in the forward table. If so, the iNIC (in response to instructions of its balance thread) (a) identifies the different server's iNIC as storing the connection endpoint, (b) encapsulates the packet with an ipOS encapsulation header (FIG. 11a), and (c) with the iNIC's forwarding processor, outputs the encapsulated packet through Port B to the different server's iNIC, so that the output encapsulated packet bypasses the network (e.g. LAN A in FIGS. 2a, 2c, 2d, 4a, 4b and 7) that is connected to Port A. In order to form the ipOS encapsulation header, the forward table stores the following information in association with the matching record: (a) the IP address of the different server's iNIC and (b) the TCP port of the server application which is executed by the different server.

By encapsulating the packet with an encapsulation header, the iNIC (in response to instructions of its balance thread) addresses the packet to the previously selected server and migrated connection endpoint. Advantageously, in the illustrative embodiments, the IP packet is not rewritten. Such encapsulation is discussed further hereinbelow in connection with FIGS. 11a-i.

If the packet's source IP address and source TCP port do not match a record in the forward table, the iNIC (in response to instructions of its balance thread) determines whether the packet's source IP address and source TCP port match a record in the local table. If so, the iNIC (in response to instructions of its balance thread) identifies the packet as having a connection endpoint that is attached to a socket associated with a local application. Accordingly, in such a situation, the iNIC identifies itself as storing the connection endpoint. In such a situation, the iNIC (in response to instructions of its balance thread) sends the packet and a reference to the connection endpoint (stored in the local table's matching record) to the protocol stack thread.

If the packet's source IP address and source TCP port do not match a record in the local table, the iNIC (in response to instructions of its balance thread) determines whether the IP packet's TCP SYN flag is set (e.g. determines whether a client is initiating a new connection) and whether the packet specifies an IP address and TCP port that match a record in the listening sockets table. If so, the iNIC sends the packet to the protocol stack processor for establishing a temporary connection. The protocol stack processor responds to the client with a SYN-ACK response packet as part of the TCP/IP initiation of a connection. Also, the iNIC creates a connection endpoint that has yet to be attached to a socket associated with an application. In the temporary table, the iNIC stores a record which includes a reference to such connection endpoint.

As shown in FIG. 9a, if the IP packet's TCP SYN flag is not set, or if the packet specifies an IP address and TCP port that do not match a record in the listening sockets table, then the packet is dropped.

Figure 9B:
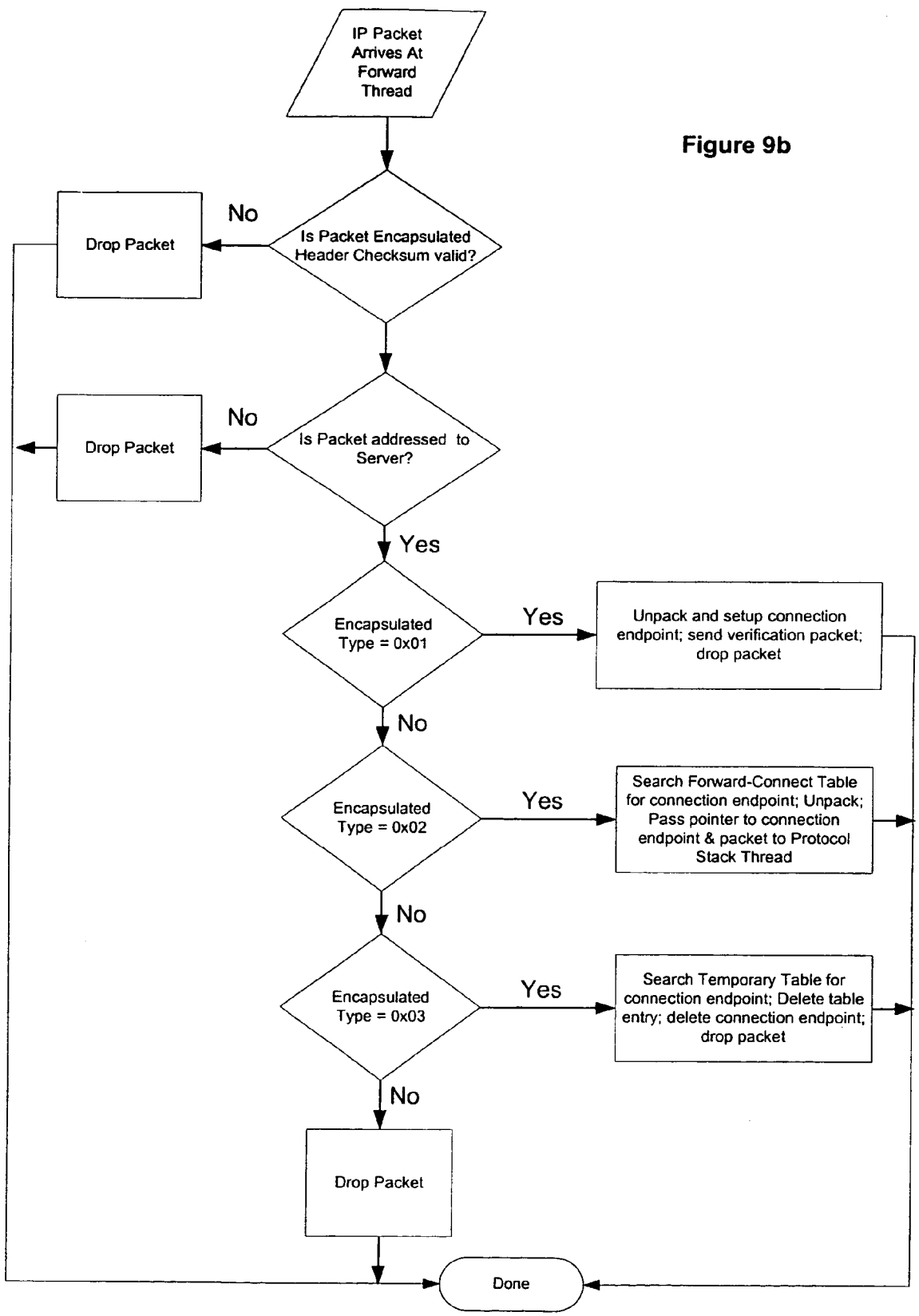
FIG. 9b is a flowchart of a forward thread of FIG. 8.

FIG. 9b is a flowchart of the forward thread of FIG. 8 for TCP/IP based applications. FIG. 9b shows a detailed communication of a packet through the forward thread. The packet enters the forward thread from Port B. Packets from Port B are encapsulated packets and are sent to the forward thread.

Accordingly, if the forward thread receives a packet from Port B, the packet either (a) is part of a new connection that is being migrated to the server's iNIC, or (b) is part of an existing connection that has already been migrated to the server's iNIC, or (c) is a verification that a connection was successfully migrated to another server's iNIC. In FIG. 12, the forward-connect table stores information representative of connection endpoints that have been migrated to the server. In response to such information, the forward thread determines a suitable operation to perform on the packet, using an IP address and TCP port as keys to locate records in the forward-connect table.

As shown in FIG. 9b, after receiving a packet from Port B, the iNIC (in response to instructions of its forward thread) verifies the packet's encapsulation header according to its checksum algorithm (16-bit one's compliment sum of the header). If the encapsulation header is corrupt (as evidenced by a failure to verify according to its checksum algorithm), then the packet is dropped.

After verifying the encapsulation header according to its checksum algorithm, the iNIC (in response to instructions of its forward thread) reads the encapsulation header's destination IP address to verify that the encapsulated packet is addressed to the iNIC's Port B. If the encapsulated packet is not addressed to the iNIC's Port B, then the packet is dropped.

After verifying that the encapsulated header's destination IP address matches the iNIC's Port B IP address, the iNIC (in response to instructions of its forward thread) determines whether the encapsulation header's type field is set to 0×01. If so, the packet is part of a new connection that is being migrated to the server's iNIC. In such a situation, the iNIC removes the encapsulation header and performs a one-time connection endpoint setup. As verification that the connection was successfully migrated, the iNIC (in response to instructions of its forward thread) sends a packet (with type field set to 0×03) through Port B to the originating iNIC (i.e. to the iNIC that requested the migration).

By comparison, if the encapsulation header's type field is set to 0×02, the packet (e.g. PUSH, ACK or FIN types of packets) is part of an existing connection that has already been migrated to the server's iNIC. In such a situation, the iNIC (in response to instructions of its forward thread) reads the client source IP address and source TCP port from the encapsulation header and, in response thereto, locates a matching connection endpoint record in the forward-connect table. Also, the iNIC (in response to instructions of its forward thread) removes the encapsulation header and sends the unencapsulated packet (which is an IP packet) and a reference to the connection endpoint (stored in the forward-connect table's matching record) to the protocol stack thread.

If the encapsulation header's type field is set to 0×03, then the packet is a verification that a connection was successfully migrated to another server's iNIC. In such a situation, the iNIC (in response to instructions of its forward thread) reads information from the encapsulation header and, in response thereto, locates a matching connection endpoint record in the temporary table. Then, the iNIC (in response to instructions of its forward thread): (a) moves such record from the temporary table to the forward table, (b) deletes such record in the temporary table, and (c) drops the packet.

If the encapsulation header's type field is set to neither 0×01, 0×02 nor 0×03, then the packet is dropped.

Figure 9C:
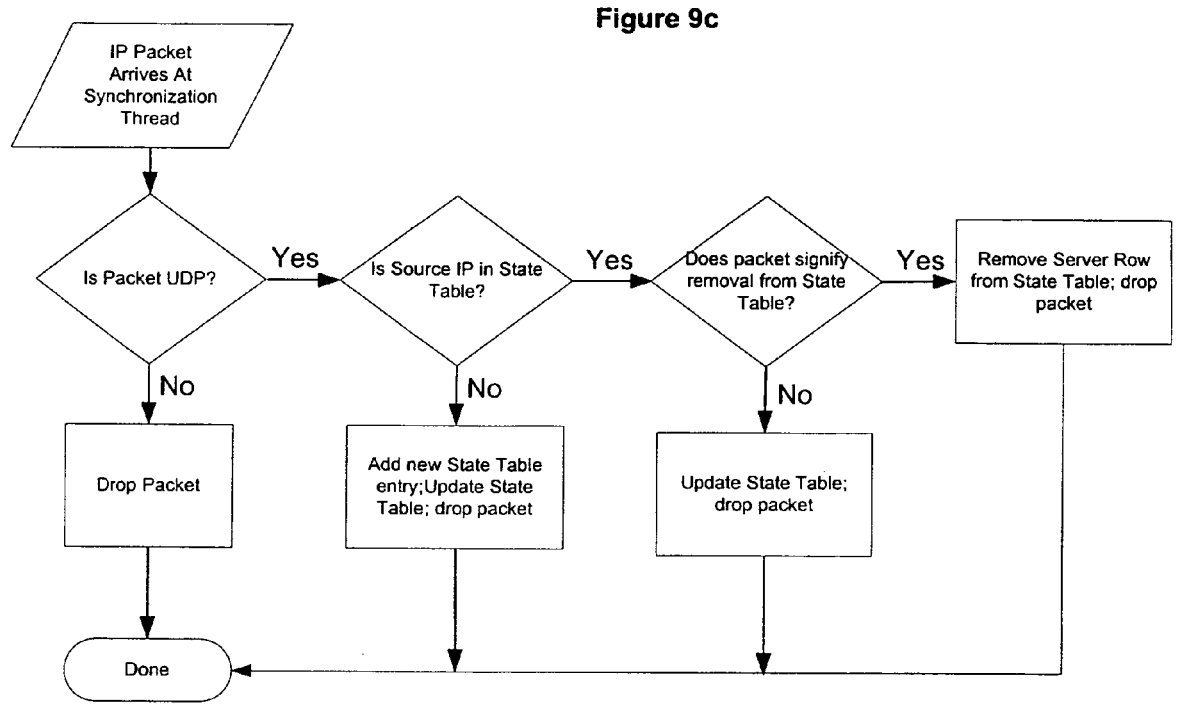
FIG. 9c is a flowchart of a synchronization thread of FIG. 8.

FIG. 9c is a flowchart of the synchronization thread of FIG. 8. FIG. 9c shows a detailed communication of a packet through the synchronization thread. The packet enters the synchronization thread from the Synch Port. Packets from the Synch Port are sent to the synchronization thread.

After receiving a packet from the Synch Port, the iNIC (in response to instructions of its synchronization thread) classifies the packet according to the synchronization thread's classification rules. Numerous embodiments of the synchronization thread and Synch Port are possible. As shown in FIG. 12, the iNIC includes a server state table for storing information representative of the current states of all servers in the server farm.

As shown in FIG. 9c, after receiving a packet from the Synch Port, the iNIC (in response to instructions of its synchronization thread) determines whether the packet is a UDP packet. If not, then the packet is dropped.

After determining that the packet is a UDP packet, the iNIC (in response to instructions of its synchronization thread) determines whether the packet's source IP address matches a record in the server state table. If so, the packet indicates either an update to a server's state information or a removal of a server from the server state table (e.g. a removal of the server from the server farm due to maintenance). If the packet indicates an update to a server's state information, the iNIC (in response to instructions of its synchronization thread) updates the matching record in the server to state table and drops the packet. By comparison, if the packet indicates a removal of a server from the server state table, the iNIC (in response to instructions of its synchronization thread) removes the matching record and drops the packet.

If the iNIC (in response to instructions of its synchronization thread) determines that the packet's source IP address does not match a record in the server state table, the iNIC (in response to instructions of its synchronization thread): (a) adds a new record in the server state table in association with the packet's source IP address, (b) updates the new record in response to other information from the packet, and (c) drops the packet.

Also, with the synchronization thread, the iNIC assembles state information of the iNIC's server into a packet for broadcast to other servers within the server farm. In the illustrative embodiments, the iNIC (in response to instructions of its synchronization thread) assembles such information into a UDP packet and outputs the UDP packet through the Synch Port.

Referring to FIG. 8, the protocol stack thread implements the IP, UDP and TCP protocols, including operations that are commonly referred to as the Network and Transport Layers. Some conventional techniques would perform the protocol stack operations in the OS of the server's main board circuitry. Accordingly, such conventional techniques would perform (a) network address translations in IP packets that are communicated between clients and specified servers in the server farm and (b) TCP splicing (e.g. rewriting of sequence numbers).

By comparison, in the illustrative embodiments, the protocol stack operations are performed advantageously by the protocol stack processor (in response to protocol stack instructions) of the server's iNIC. For example, in the illustrative embodiments, the protocol stack thread avoids the need to perform network address translations ("NATs") in IP packets that are communicated between clients and specified servers in the server farm. Moreover, in the illustrative embodiments, the protocol stack thread avoids the need to perform TCP splicing (e.g. rewriting of sequence numbers).

Figure 13:
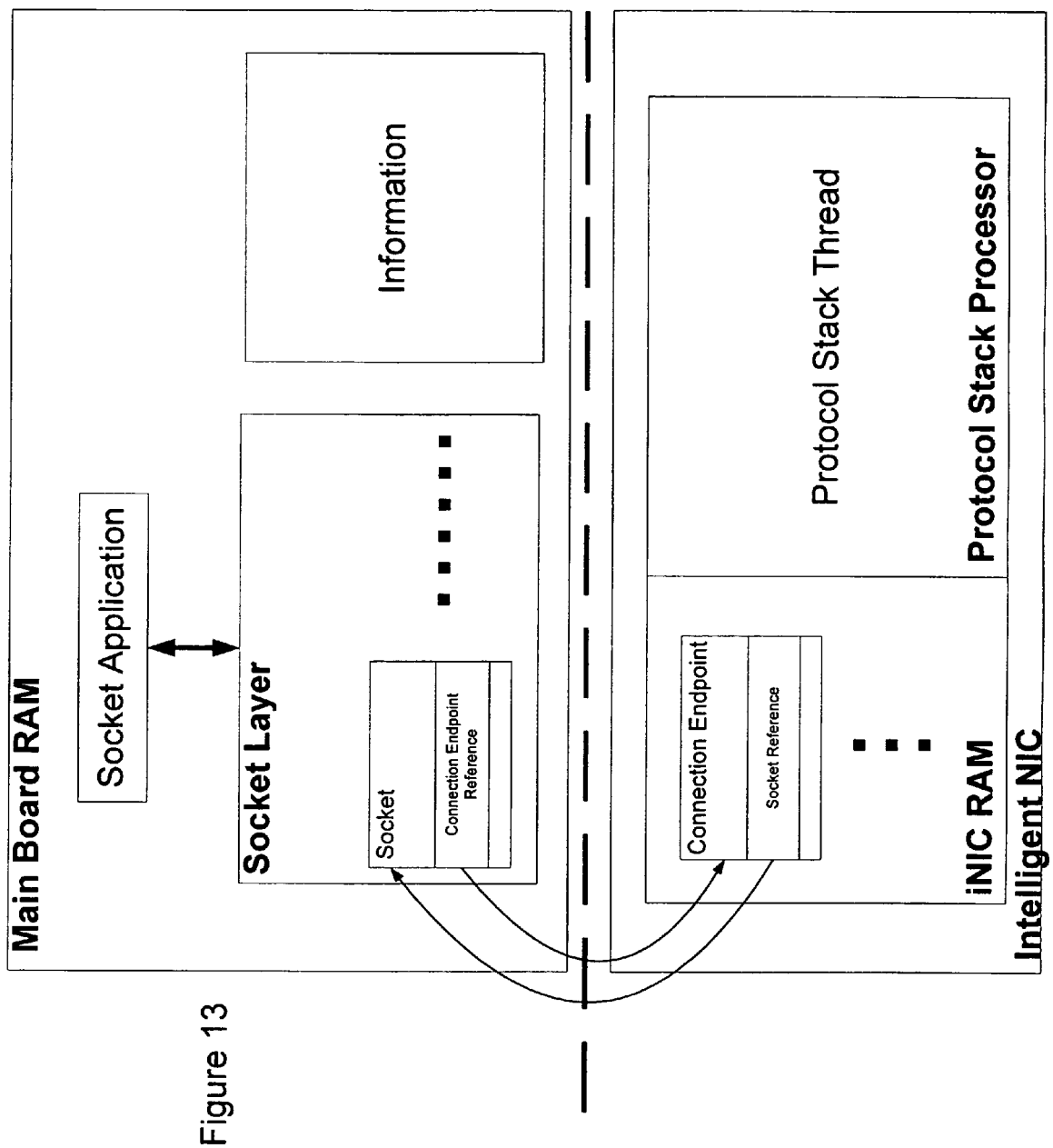
FIG. 13 is a block diagram of the iNIC and main board circuitry of FIG. 3, according to the illustrative embodiments in which a socket application is related to a socket and its associated connection endpoint.

FIG. 13 is a block diagram of the iNIC and main board circuitry of FIG. 3, according to the illustrative embodiments in which a socket application is related to a socket and its associated connection endpoint. In FIG. 13, a socket application includes instructions for initiating the formation of a socket by calling a system function (or by calling an application program interface ("API")) to form a socket of a specific type (e.g. UDP or TCP) within a socket layer. In response to instructions of the OS kernel, the main board circuitry manages the socket layer. In response to such a call, the OS kernel includes instructions for forming the socket and returning a file descriptor (which references the socket) to the application.

Although FIG. 13 shows a single socket, a socket application can be related to numerous sockets at any particular time. The socket layer includes instructions for sending one or more requests to the iNIC, in order to initiate the iNIC's formation of a new connection endpoint (of a specified type), and in order to initiate the iNIC's formation of a socket reference. Such request is associated with a socket, and the socket reference is a reference to that socket.

In response to such a request, the iNIC (a) forms the new connection endpoint, irrespective of whether a socket application is associated with the new connection endpoint, and (b) returns a reference (which references the connection endpoint) to the socket layer. As shown in FIG. 13, the socket includes a reference ("connection endpoint reference") for associating the socket with the connection endpoint. Likewise, the connection endpoint includes a reference ("socket reference") for associating the connection endpoint with the socket. The protocol stack thread (executed by the protocol stack processor) has access to the iNIC's memory, where connection endpoints are stored in various tables (as discussed further herein in connection with FIG. 12).

Also, the iNIC (in response to instructions of its protocol stack thread) is operable to associate an existing connection endpoint and a socket with one another. For such association, through the DMA circuitry and main board circuitry's memory, the iNIC's protocol stack processor sends a request (along with a reference to the connection endpoint) to the main board circuitry. In response to such request, the main board circuitry (a) forms a client specific socket (if a listening socket exists for the IP address and TCP Port), (b) stores the connection endpoint reference within the socket, and (c) returns a reference (which references the socket) to the iNIC. The iNIC completes the association by storing the socket reference within the connection endpoint.

The protocol stack thread of the illustrative embodiments is similar to a conventional standard protocol stack (e.g. BSD protocol stack), but the protocol stack thread of the illustrative embodiments is modified from the conventional standard protocol stack in various ways. Such modifications include (a) the addition of several fields to the connection endpoint data structure, (b) the revision of protocol stack code to use the modified connection endpoint, and (c) the revision of protocol stack code to selectively add special information within an IP packet's data portion (e.g. session management). Moreover, the protocol stack thread of the illustrative embodiments is modified to advantageously avoid several conventional protocol stack operations, including checksum calculations and connection endpoint searches, because such operations are performed by the classification engine (e.g. a packet sent to the protocol stack thread is accompanied by a reference to the packet's associated connection endpoint).

Referring again to FIG. 8, packets are sent to the protocol stack thread from the balance thread and the forward thread (en route to a server application). Such packets are moving up the protocol stack during a receive operation. After the protocol stack thread processes the packet, the protocol stack processor outputs the payload information (destined for the application) to the main board circuitry's memory through DMA circuitry (as discussed further hereinabove in connection with FIG. 3).

As discussed herein in connection with FIG. 13, the connection endpoint includes a socket reference. In response to receiving payload information from the protocol stack processor, the main board circuitry appends the payload information to a socket queue for the referenced socket. Also, the main board circuitry alerts the application about such appending.

Similarly, packets are sent to the protocol stack thread from an application (en route to Port A). Such packets are moving down the protocol stack during a send operation. As discussed herein in connection with FIG. 13, the socket includes a connection endpoint reference, so a packet sent to the protocol stack thread is accompanied by a reference to the packet's associated connection endpoint, and the protocol stack thread does not perform connection endpoint searching. Moreover, in processing such a packet, the protocol stack processor outputs the packet to a client through Port A without TCP splicing or packet rewriting.

In an illustrative embodiment, for any server application that services a client request, a server's protocol stack processor (in response to instructions of its protocol stack thread) is operable to selectively form and add special information (for causing the client to perform an operation) within an IP packet before sending it to the client through Port A. In response to the special information, the client (in response to instructions of its application) is operable to: (a) maintain a session, as discussed further hereinbelow, (b) selectively update state information (stored by the client) in a manner specified by the special information (e.g. for state maintenance, such as modifying state information); and/or (c) selectively perform another application specific operation in a manner specified by the special information.

For example, the server's protocol stack processor is operable to add the special information in response to the synchronized state information (which is discussed further hereinabove such as in connection with FIG. 6) of servers in the server farm. The protocol stack processor adds the special information within the IP packet's data portion (e.g. TCP payload), so that the special information is not contained in the IP packet's headers (e.g. IP, TCP or UDP header).

Advantegeously, unlike at least one conventional technique, the protocol stack processor (of such an illustrative embodiment) adds the special information (e.g. session maintenance information, state maintenance information) in a manner that is independent of the main board circuitry, and independent of whether the server application includes any instructions for such purpose. By comparison, in at least one conventional technique, the protocol stack instructions affect the IP packet's headers (not the IP packet's data portion), so that session maintenance information (in the IP packet's data portion) is added by the main board circuitry in response to instructions of a server application (rather than in response to protocol stack instructions).

A session (e.g. HTTP session) includes multiple connections. For example, in such an illustrative embodiment, after establishing a first connection of a session with a client (which executes an application, such as a web browser), the first server receives a request packet from the client. In response to the request packet, the first server's iNIC is operable to (a) select a server for maintaining the session with the client and (b) notify the client of the selection by outputting special information (e.g. HTTP session identifier, such as a cookie) in a response packet to the client. The special information is added to the response packet by the protocol stack processor of the first server's iNIC.

Accordingly, in response to the request packet from the client, the first server's iNIC is operable to either: (a) in response to the synchronized state information (which identifies servers in the server farm that have access to suitable resources for servicing the client request), select one of the identified servers for maintaining the session with the client; or (b) select the first server for maintaining the session with the client, irrespective of the synchronized state information.

In a first illustrative embodiment according to the HTTP protocol, the special information is an HTTP session identifier (which specifies a server for maintaining the session with the client). In the first illustrative embodiment, the client: (a) during the first connection, receives the response packet (which includes the HTTP session identifier) from the first server; (b) establishes a second connection of the session with the server farm; and (c) after establishing the second connection, adds the HTTP session identifier within a request packet (of the second connection) before sending it to the server farm. In response to the request packet (which includes the HTTP session identifier), the server farm is responsible for sending the request packet to the specified server.

For example, in the first illustrative embodiment, the client establishes the second connection of the session with a server ("connecting server") of the server farm, as discussed further hereinabove in connection with FIG. 2a. In response to the second connection's request packet, the connecting server either: (a) keeps the request packet and processes it, if the request packet's HTTP session identifier specifies the connecting server; or (b) forwards the request packet to a different server (within the server farm) for processing, if the request packet's HTTP session identifier specifies the different server (as discussed further hereinbelow in connection with FIG. 10a and the cookie map table of FIG. 12). Accordingly, in the first illustrative embodiment, the servers in the server farm endeavor to synchronize state information with one another by sending and receiving the state information (including information for the cookie map table) through the server farm's synchronization hub, as discussed further hereinabove in connection with FIGS. 5c and 6. By comparison, in a conventional technique, the client would establish the second connection of the session with a flow switch, which in turn would send the second connection's request packet to a server as specified by the request packet's HTTP session identifier.

In a second illustrative embodiment, the client (in response to instructions of its application): (a) during the first connection, receives the response packet (which includes the special information) from the first server; (b) if the special information specifies the first server, establishes the second connection of the session directly with the first server; and (c) if the special information specifies a second server (i.e. different than the first server), establishes the second connection of the session directly with the second server (instead of the first server). Also, in the second illustrative embodiment, the client (in response to instructions of its application) is operable to: (a) selectively update state information (stored by the client) in a manner specified by the special information (e.g. for state maintenance); and (b) selectively perform another application specific operation in a manner specified by the special information.

Accordingly, in the first and second illustrative embodiments, the first server's iNIC is operable to selectively migrate the session to a second server in response to the synchronized state information. Likewise, after such migration, the second server's iNIC is operable to either: (a) in response to the synchronized state information, select a suitable server for maintaining the session with the client; or (b) select the second server for maintaining the session with the client, irrespective of the synchronized state information. In that manner, a server's iNIC is operable to selectively migrate a session by outputting special information in a response packet to the client during any connection of the session, not merely during the first connection.

Figure 10A:
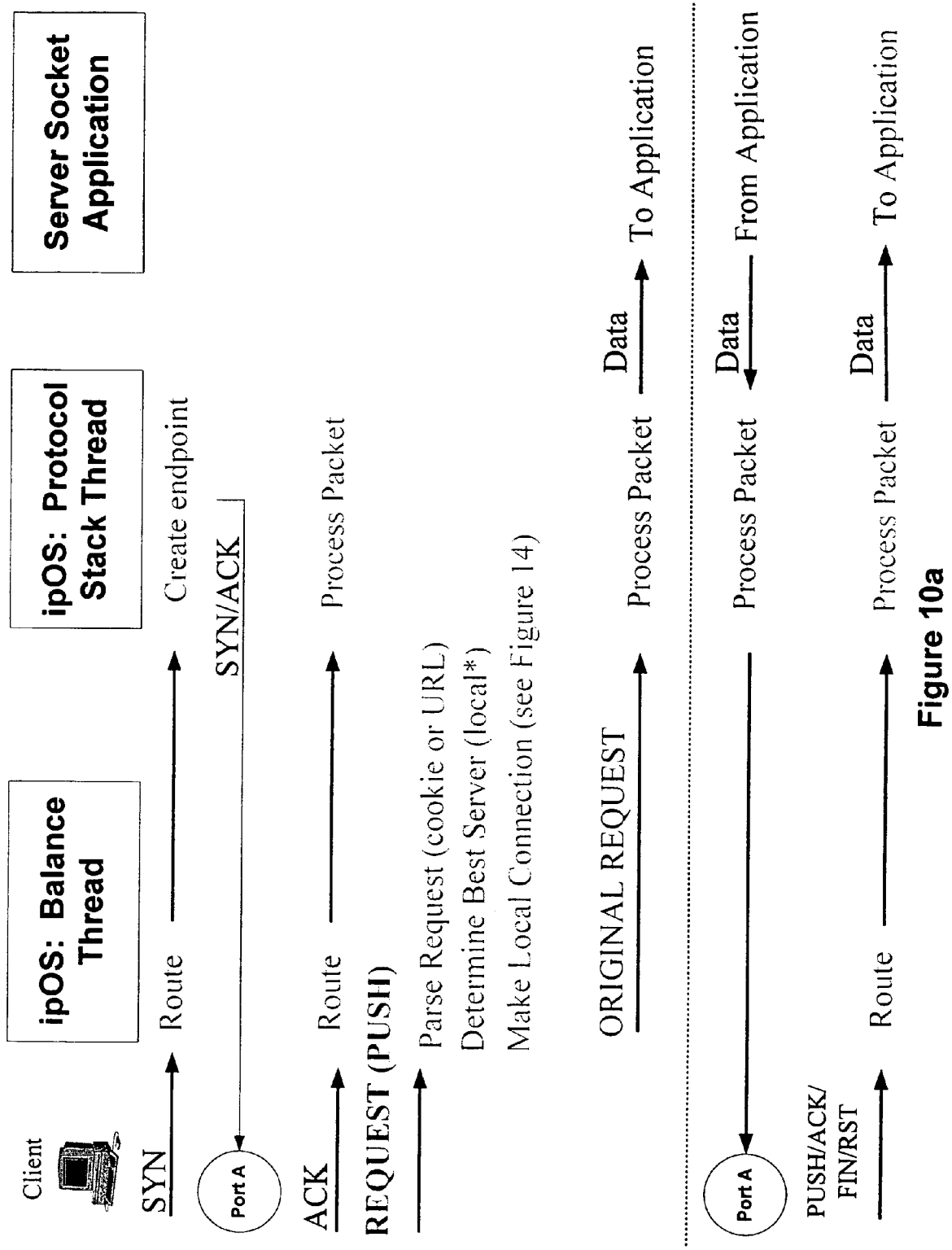
FIG. 10a is a sequence diagram of steps for establishing a local connection between a client and a server, according to the illustrative embodiments.

FIG. 10a is a sequence diagram of steps for establishing a local TCP/IP connection between a client and a server, according to the illustrative embodiments. Referring also to FIG. 9a, a client initiates a new connection to a server by sending an IP SYN packet to Port A of the server's iNIC. Accordingly, the IP SYN packet is an initialization packet originating from the client. The packet is addressed to a particular destination IP address and destination TCP port (e.g. a specific listening socket for an application). The iNIC classifies and processes the packet according to the balance thread's classification rules and action code.

If an application is listening for such a connection, the iNIC (in response to instructions of its balance thread) creates a connection endpoint and stores a record (in the temporary table of FIG. 12) which includes a reference to such connection endpoint. Also, the iNIC (in response to instructions of its balance thread) sends the SYN packet and a reference to the connection endpoint (stored in the temporary table's record) to the protocol stack thread. In response to the SYN packet, the protocol stack processor outputs a SYN-ACK response packet (as part of the standard TCP/IP socket connection setup process) to the client through Port A without modification. In response to the SYN-ACK response packet, the client sends an ACK packet to the server, thereby acknowledging receipt of the SYN-ACK response packet. Accordingly, the ACK packet originates from the client.

The ACK packet (and subsequent packets from the client) has a source IP address and source TCP port that match the record in the temporary table. Accordingly, the iNIC (in response to instructions of its balance thread) sends the ACK packet and a reference to the connection endpoint (stored in the temporary table's matching record) to the protocol stack thread. In response to such packet and reference, the protocol stack processor updates the connection endpoint in the iNIC's memory and drops the packet.

In an illustrative embodiment, the next packet sent from the client is a client request packet (e.g. the first packet in which the TCP flag is set to PUSH). Accordingly, the client request packet originates from the client. In an alternative embodiment, the client request packet is sent by the client at a later time. In this example, the client request packet includes the client request for resource (e.g. GET request using the HTTP protocol). In response to such client request for resource, the iNIC (in response to instructions of its balance thread) selects a server to process the request.

For example, in selecting a server to process the request, the iNIC examines the client request packet to determine whether the packet includes special information in the form of a cookie. With a cookie, the client is able to request connection to a specified server in the server farm. In a first illustrative embodiment according to the HTTP protocol, the client is able to insert a cookie in the packet for maintaining an HTTP session (e.g. a series of connections) between the client and the specified server. In a second illustrative embodiment according to a different protocol, the client is able to pass special information (within a packet to a server) according to the different protocol without a cookie.

Accordingly, if the packet includes a cookie (as represented by an identifier in the packet), the iNIC selects the cookie's specified server to service the request (including performing a suitable operation). In such a situation, if the cookie's specified server is the iNIC's server (i.e. the balance thread's server), the iNIC performs the suitable operation in response to the packet. By comparison, if the cookie's specified server is a different server (i.e. not the balance thread's server), the iNIC migrates the packet's associated connection endpoint to the cookie's specified server for performing the suitable operation in response to the packet. Referring also to FIGS. 3 and 12, the iNIC's cookie map table (included within the process information in iNIC memory) stores information for mapping a specified cookie identification tag to an associated server.

Similarly, in selecting a server to process the request, the iNIC examines the client request packet to determine whether information in the packet has been mapped (e.g. by an administrator of the server farm) to one or more associated servers in the server farm. For example, the iNIC examines the client request (e.g. HTTP request) to determine whether a specific URL has been mapped to one or more associated servers in the server farm (e.g. see discussion hereinabove in connection with FIG. 2d). Referring also to FIGS. 3 and 12, the iNIC's URL map table (included within the process information in iNIC memory) stores information for mapping a specified URL address of a server application to one or more associated servers within the server farm. Accordingly, if the URL map table indicates that the specified URL (as represented by an identifier in a request packet) is associated with a single server within the server farm, the iNIC selects the associated server to service the connection (including performing a suitable operation). If the associated server is the iNIC's server, the iNIC performs the suitable operation in response to the request packet. If the associated server is different than the iNIC's server, the iNIC outputs the request packet to the associated server's iNIC for performing the suitable operation in response to the request packet. If the URL map table indicates that the specified URL is associated with multiple servers within the server farm, the iNIC selects one of the multiple servers to service the connection (including performing the suitable operation), according to the load-balancing technique in response to the synchronized state information.

Similarly, the iNIC memory's process information includes an SSL (secure socket layer) map table for mapping a specified SSL connection (port 443) to one or more associated servers within the server farm. Accordingly, if the SSL map table indicates that the specified SSL connection (as represented by an identifier in a request packet) is associated with a single server within the server farm, the iNIC selects the associated server to service the SSL connection (including performing a suitable operation). If the associated server is the iNIC's server, the iNIC performs the suitable operation in response to the request packet. If the associated server is different than the iNIC's server, the iNIC outputs the request packet to the associated server's iNIC for performing the suitable operation in response to the request packet. If the SSL map table indicates that the specified SSL connection is associated with multiple servers within the server farm, the iNIC selects one of the multiple servers to service the SSL connection (including performing the suitable operation), according to the load-balancing technique in response to the synchronized state information.

If the client request packet does not contain special information for connection to a specified server (e.g. does not include a cookie) and does not specify information (e.g. a URL or SSL) that is mapped to one or more associated servers, then the iNIC selects a server (to process the request) according to the load-balancing technique in response to the synchronized state information.

In selecting a server to process the request, the connection is reclassified from being a temporary connection to being either a local connection or a forwarded connection. The connection is reclassified to being a local connection if the client request packet is processed by the server ("first server") without forwarding to a second server. By comparison, the connection is reclassified to being a forwarded connection if the client request packet is forwarded to a second server for processing (e.g. if the first server is too busy, or if the client request is part of a session maintained by the second server).

In the example of FIG. 10a, the connection is reclassified to being a local connection. In such a situation, the iNIC (in response to instructions of its balance thread) moves the associated connection endpoint record from the temporary table to the local table. Also, in such a situation, the protocol stack processor establishes the actual connection to the application through the socket layer by forming the socket reference in the connection endpoint and forming the connection endpoint reference in the socket.

Figure 14:
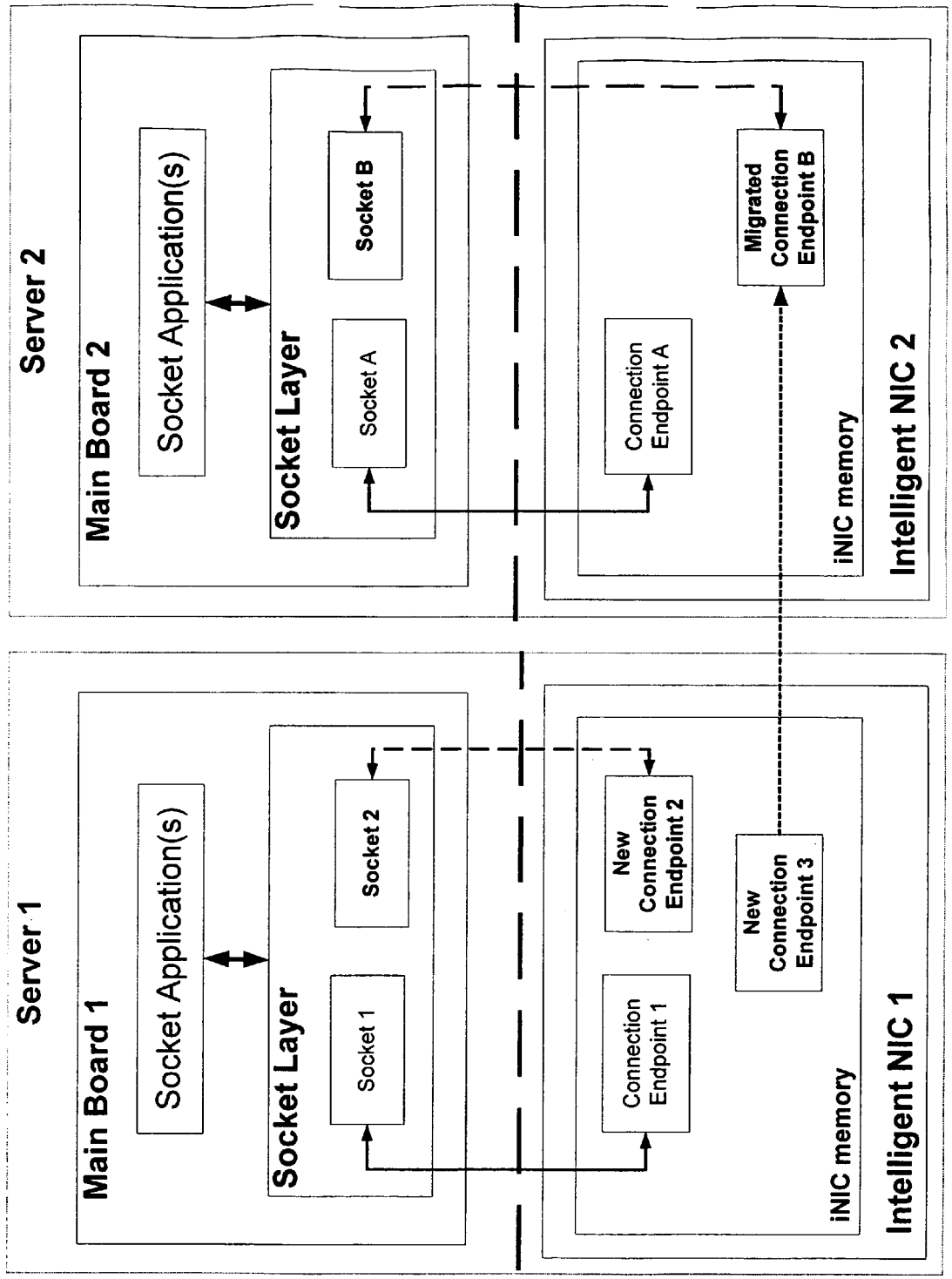
FIG. 14 is a block diagram of servers within a server farm, according to an illustrative embodiment in which the servers establish sockets and associated connection endpoints for a local connection and a forwarded connection.

FIG. 14 is a block diagram of servers within a server farm, according to an illustrative embodiment in which the servers establish sockets and associated connection endpoints for a local connection and a forwarded (or "migrated") connection. FIG. 14 shows servers 1 and 2 in the server farm. Server 1 includes main board circuitry 1 and iNIC 1. Server 2 includes main board circuitry 2 and iNIC 2.

In the example of FIG. 14, an application of server 1 has established a connection to a client through socket 1 and connection endpoint 1 to a client. Likewise, an application of server 2 has established a connection to a client through socket A and connection endpoint A. For clarity, FIG. 14 does not show (a) the complete association between a specific application and a specific socket(s) through a socket layer, which is discussed elsewhere herein in connection with the protocol stack thread, (b) other connections that have already been established, or (c) the association between connection endpoints (e.g. in a doubly linked list) within an iNIC memory.

In one example, a connection with a client is represented by connection endpoint 2 (which includes information for the connection) formed as part of the SYN, SYN-ACK, and ACK packet processing of FIG. 10*a*. For the connection, before iNIC 1 receives the client request packet from the client, connection endpoint 2 is not yet associated with a socket in the socket layer of main board circuitry 1, so an application has not yet been assigned to process the connection. As discussed hereinabove in connection with FIG. 10*a*, the connection is reclassified to being a local connection if the client request packet is processed by a first server (e.g. server 1 in FIG. 14) without forwarding to a second server (e.g. server 2 in FIG. 14). If the connection is reclassified to being a local connection, iNIC 1 sends a request to main board circuitry 1. In response to such request, main board circuitry 1 initiates the formation of socket 2 within the socket layer of main board circuitry 1. Socket 2 is associated with the application, connection endpoint 2, and the client.

Referring also to FIG. 10*a*, the protocol stack thread receives information from the application (along with a reference to its associated connection endpoint). In response to such information, the iNIC (in response to instructions of its protocol stack thread) forms a packet by adding suitable header information (including checksum calculations) and sends the packet to the client through Port A. Advantageously, the packet sent by the iNIC is received by the client without intervening network address translation ("NAT") or TCP splicing (e.g. without rewriting of sequence numbers), in contrast to the conventional flow switch architecture of FIG. 1*b*.

If the iNIC (in response to instructions of its balance thread) determines that a source IP address and source TCP port of a packet (originating from the client and received at Port A) match a record in the local table, the iNIC sends the packet and a reference to the connection endpoint (stored in the local table's matching record) to the protocol stack thread. After the protocol stack thread processes the packet, the protocol stack processor sends the payload information (destined for the connection endpoint's associated socket application) to the main board circuitry's memory through DMA circuitry (as discussed further hereinabove in connection with FIG. 3). The main board circuitry adds the payload information to a socket queue associated with the socket application. Advantageously, the protocol stack thread processes the packet without performing NAT or TCP splicing.

Figure 10B:
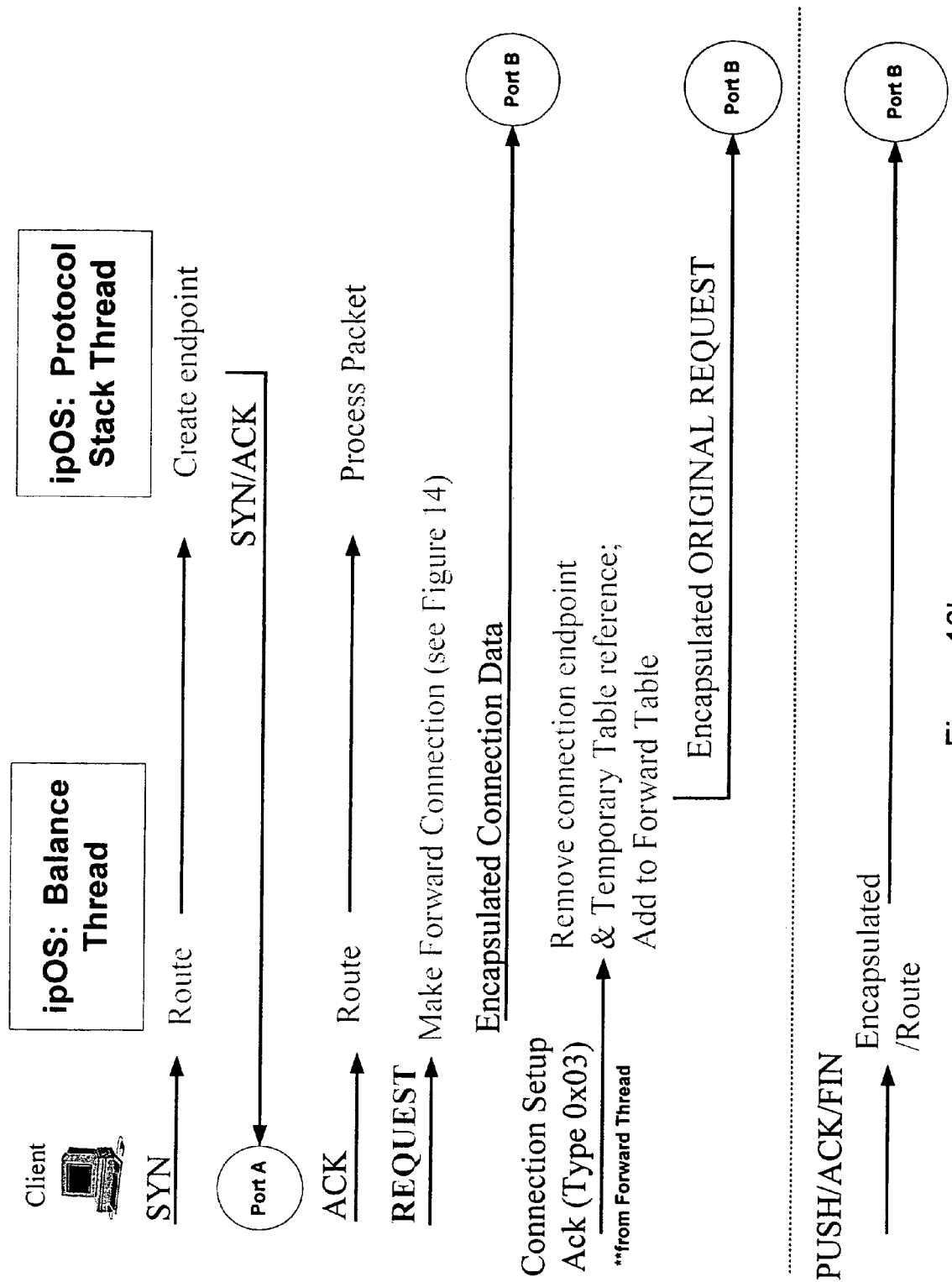
FIG. 10b is a sequence diagram of steps for establishing a forwarded connection between a client and a server, according to the illustrative embodiments.
Figure 10C:
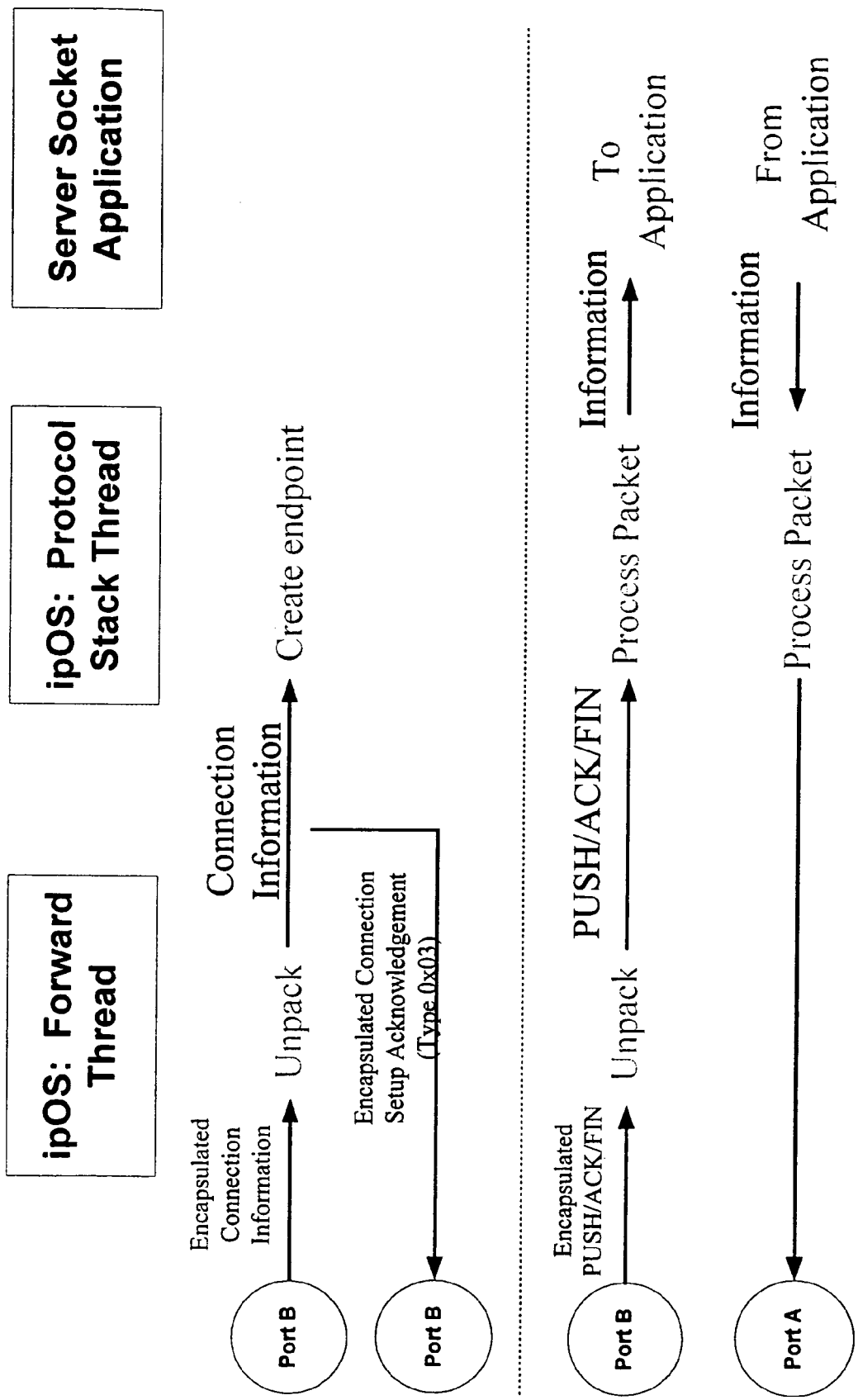
FIG. 10c is a sequence diagram of steps for processing a forwarded connection with a server, according to the illustrative embodiments.

FIG. 10*b* is a sequence diagram of steps for establishing a forwarded connection between a client and a server, according to the illustrative embodiments. FIG. 10*c* is a sequence diagram of steps for processing a forwarded connection with a server, according to the illustrative embodiments. In FIG. 10*b* (as in FIG. 10*a*), a client initiates a new connection to a server by sending an IP SYN packet to Port A of the server's iNIC.

If an application is listening for such a connection attempt, the iNIC (in response to instructions of its balance thread) creates a connection endpoint and stores a record (in the temporary table of FIG. 12) which includes a reference to such connection endpoint. Also, the iNIC (in response to instructions of its balance thread) sends the SYN packet and a reference to the connection endpoint (stored in the temporary table's record) to the protocol stack thread. In response to the SYN packet, the protocol stack processor sends a SYN-ACK response packet (as part of the standard TCP/IP socket connection setup process) to the client through Port A without modification.

In response to the SYN-ACK response packet, the client sends an ACK packet to the server, thereby acknowledging receipt of the SYN-ACK response packet. The ACK packet (and subsequent packets from the client) has a source IP address and source TCP port that match the record in the temporary table. Accordingly, the iNIC (in response to instructions of its balance thread) sends the ACK packet and a reference to the connection endpoint (stored in the temporary table's matching record) to the protocol stack thread. In response to such packet and reference, the protocol stack processor updates the connection endpoint in the iNIC's memory and drops the packet.

In this example, the next packet sent from the client is a client request packet. In response to the client request packet, the iNIC (in response to instructions of its balance thread) selects a server to process the request, in the same manner as discussed further hereinabove in connection with FIG. 10*a*. If the iNIC selects a different server (i.e. not the balance thread's server), the iNIC migrates the packet's associated connection endpoint to the different server, and the connection is reclassified to being a forwarded connection.

In the example of FIG. 10*b*, the connection is reclassified to being a forwarded connection. Referring also to FIG. 14, the connection is represented by connection endpoint 3 (which includes information for the connection) formed as part of the SYN, SYN-ACK, and ACK packet processing of FIG. 10*b*. For the connection, before iNIC 1 receives the client request packet from the client, connection endpoint 3 is not yet associated with a socket in the socket layer of main board circuitry 1, so an application has not yet been assigned to process the connection.

For example, if iNIC 1 selects server 2 to process the client request, iNIC 1 migrates connection endpoint 3 to iNIC 2 in reclassifying the connection to being a forwarded connection. For clarity, on iNIC 2, the migrated connection endpoint 3 is denoted as connection endpoint B in FIG. 14.

In migrating connection endpoint 3 from iNIC 1 to iNIC 2, iNIC 1 prepends connection endpoint 3 with an ipOS encapsulation header to form an ipOS encapsulated packet, which iNIC 1 outputs through its Port B to iNIC 2, as discussed further hereinbelow in connection with FIGS. 11*a-i*. Accordingly, connection endpoint B includes a copy of information from connection endpoint 3 and additional information such as server 1's IP address and the destination TCP port of the client request. Moreover, in such an ipOS encapsulated packet, the encapsulation header's type field is set to 0×01.

Referring to FIGS. 9*b* and 10*c*, in response to receiving such an ipOS encapsulated packet at Port B of iNIC 2, iNIC 2 (in response to rules code of its forward thread) (a) determines that such packet is a migration of a connection endpoint, (b) unpacks the packet, and (c) sends the connection endpoint to the protocol stack thread. Also, in such a situation, iNIC 2 (a) establishes connection endpoint B and (b) in response to instructions of its protocol stack thread, sends a request to main board circuitry 2. In response to such request, main board circuitry 2 initiates the formation of socket B within the socket layer of main board circuitry 2.

Socket B is associated with the application, connection endpoint B, and the client. In such a situation, the protocol stack processor of iNIC 2 establishes the actual connection to the application through the socket layer of main board circuitry 2 by storing the socket reference within connection endpoint B and storing the connection endpoint reference within socket B. Moreover, in the forward-connect table of iNIC 2, it stores a record which includes a reference to connection endpoint B.

After storing such record in its forward-connect table, iNIC 2 (in response to instructions of its forward thread) forms an encapsulated acknowledgement packet and outputs such packet to iNIC 1 through Port B as a verification that the connection endpoint was successfully migrated to iNIC 2. In such a packet, the encapsulation header's type field is set to 0x03. The encapsulated acknowledgement packet is received by iNIC 1 (at its Port B), which processes the packet as discussed further hereinabove in connection with FIG. 9b (including moving the associated connection endpoint record from the temporary table of iNIC 1 to the forward table of iNIC 1).

The client is unaware of the connection endpoint migration from iNIC 1 to iNIC 2. Accordingly, the client sends packets (of the connection) addressed to server 1 instead of server 2. Examples of such packets (originating from the client) include TCP/IP packets with PUSH, ACK or FIN flags set. Referring also to FIG. 9a, (a) such a packet's source IP address and source TCP port match a record in the forward table of iNIC 1, (b) in response to such match, iNIC 1 encapsulates such packet with an encapsulation header (whose type field is set to 0x02), as discussed further hereinbelow in connection with FIGS. 11a-i, and (c) the forwarding processor of iNIC 1 sends (through Port B) the encapsulated packet to iNIC 2, which processes (e.g. performs an operation in response to) such packet as discussed further hereinabove in connection with FIG. 9b. Advantageously, in the illustrative embodiments, the original IP packet is not rewritten (e.g. without NAT or TCP splicing).

Likewise, the client receives packets (of the connection) which appear to be sent from server 1 instead of server 2 (even though such packets bypass server 1 and, instead, are sent from server 2). Server 2 achieves such a result by specifying (in such packets) a source IP address of server 1 instead of server 2, plus the sequence numbers associated with the connection. By reading the associated connection endpoint (which includes the addresses of server 1 and the client, plus the sequence numbers associated with the connection), server 2's iNIC avoids NATs and TCP splicing, because server 2's iNIC forms a response packet according to the addresses of server 1 and the client and sequence numbers associated with the connection between the client and server 2.

For example, referring to FIG. 10c, in server 2, packets are sent to the protocol stack thread from an application (en route to Port A of iNIC 2). As discussed herein in connection with FIG. 13, the socket includes a connection endpoint reference, so a packet sent to the protocol stack thread is accompanied by a reference to the packet's associated connection endpoint, and the protocol stack thread does not perform connection endpoint searching. Moreover, in processing such a packet, the protocol stack processor sends the packet to a client through Port A without TCP splicing or packet rewriting. Advantageously, the packet is received by the client without intervening TCP splicing or NAT, in contrast to the conventional flow switch architecture of FIG. 1b.

For establishing a connection between a client and a server's socket application, the illustrative embodiments achieve various advantages over conventional techniques. According to one conventional technique, a content aware flow switch performs a "connection spoof" in which a connection is established between the client and the flow switch. Such a connection (between the client and the flow switch) is conventionally referred to as a delayed bind and operates to delay selection of a server in the server farm until the client request packet is received by the flow switch.

After the flow switch receives the client request packet, the flow switch selects a server to process the client request. After selecting a server, the flow switch establishes another connection between the flow switch and the selected server. Accordingly, for processing the client request, the flow switch maintains two connections, namely (a) a first connection between the client and the flow switch and (b) a second connection between the flow switch and the selected server.

With such a conventional technique, packets between the client and the selected server are passed through the flow switch. The client does not establish a direct connection with the selected server. In such a situation, the flow switch manipulates (e.g. rewrites) the packets in the course of performing "translation" operations such as TCP splicing, NATs, and checksum calculations.

By comparison, the illustrative embodiments do not perform such a "connection spoof." Instead, the illustrative embodiments perform a delayed connection endpoint to application socket bind. Advantageously, after performing such bind (or "association") between the connection endpoint and application socket, the illustrative embodiments send packets between the client and the selected server without TCP splicing or NATs.

Even after performing a connection endpoint to application socket bind in response to a first request packet (as discussed further hereinabove in connection with FIGS. 10a-c), a server's iNIC (in response to instructions of its ipOS) remains operable to selectively migrate the connection endpoint during the same connection (e.g. before closing the TCP or UDP connection). For example, even after performing a connection endpoint to application socket bind, a first server's iNIC (in response to instructions of its ipOS) remains operable to selectively migrate the connection endpoint to a second server's iNIC in response to (a) the request packet(s) received from the client, (b) the synchronized state information (which is discussed further hereinabove such as in connection with FIG. 6) of servers in the server farm, and/or (c) a command received at Port B of the first server's iNIC from a system administrator (e.g. in the course of performing server maintenance).

In a first example, during a connection, if a client (in response to instructions of its application, such as an Internet gaming application) sends first and second request packets to a first server, (a) in response to the first request packet, the first server's iNIC (in response to instructions of its ipOS) is operable to selectively classify the connection as a local connection and process it accordingly, as discussed further hereinabove in connection with FIGS. 10a and 14, and (b) in response to the second request packet, the first server's iNIC (in response to instructions of its ipOS) remains operable to selectively migrate the connection endpoint to a second server's iNIC.

After performing a connection endpoint to application socket bind, in migrating the connection endpoint from the first server's iNIC to the second server's iNIC, the first server's iNIC: (a) removes the association between (or "disassociates") the connection endpoint and the first server's application socket; and (b) through Port B, migrates the connection endpoint to the second server's iNIC, as discussed further herein in connection with FIGS. 10b-c, 13 and 14.

In a second example, during a connection, in response to a request packet of the connection, a first server's iNIC (in response to instructions of its ipOS) is operable to selectively migrate the connection endpoint to a second server's iNIC. In such a situation, the second server's iNIC performs a connection endpoint to application socket bind at the second server. Subsequently, during the connection, the second server's iNIC is operable to selectively: (a) maintain the connection endpoint to application socket bind at the second server; or (b) in response to a request from the first server's iNIC (via its Port B) to the second server's iNIC (via its Port B), or vice versa, migrate the connection endpoint back to the first server's iNIC; or (c) in response to a request from the first server's iNIC (via its Port B) to the second server's iNIC (via its Port B), or vice versa, migrate the connection endpoint to a third server's iNIC.

In migrating the connection endpoint from the second server's iNIC back to the first server's iNIC, the second server's iNIC: (a) removes the association between the connection endpoint and the second server's application socket; (b) removes the matching connection endpoint record in the forward-connect table of the second server's iNIC; and (c) through Port B, migrates the connection endpoint to the first server's iNIC, similar to the manner discussed further herein in connection with FIGS. 10b-c, 13 and 14. However, in such migration, the first server's iNIC stores the matching connection endpoint record in its local table instead of its forward-connect table. Moreover, the first server's iNIC removes the matching record in the forward table of the first server's iNIC.

In migrating the connection endpoint from the second server's iNIC to a third server's iNIC, the second server's iNIC: (a) removes the association between the connection endpoint and the second server's application socket; (b) removes the matching connection endpoint record in the forward-connect table of the second server's iNIC; (c) modifies the connection endpoint to specify the IP address and TCP port of the third server's iNIC instead of the second server's iNIC and (d) through Port B, migrates the connection endpoint to the third server's iNIC, similar to the manner discussed further herein in connection with FIGS. 10b-c, 13 and 14. Moreover, the first server's iNIC (a) modifies the matching record in the forward table of the first server's iNIC to specify the IP address and TCP port of the third server's iNIC instead of the second server's iNIC and (b) modifies the connection endpoint to specify the IP address and TCP port of the third server's iNIC instead of the second server's iNIC.

Description of ipOS Encapsulation Protocol

FIG. 11a is a conceptual illustration of a conventional Ethernet encapsulation header. As shown in FIG. 11a, the header includes 14 bytes of information. The first field (6 bytes) specifies a 48-bit destination address, the second field (6 bytes) specifies a 48-bit source address, and the last field (2 bytes) specifies a type of information within the packet (i.e. the packet to which the header is appended). Although the header of FIG. 11a is conventional, it has an unconventional aspect in which a type of 0×007 indicates that the packet includes ipOS encapsulation information.

In the illustrative embodiments, the ipOS encapsulation protocol is advantageous for sending packets through Port B from a first server in the server farm to a second server in the server farm. The first server (with its iNIC's forwarding processor) splices encapsulation headers to packets that are sent through its iNIC's Port B to the second server's iNIC. For example, as discussed further hereinabove in connection with FIGS. 10b and 14, in migrating a connection endpoint from a first iNIC (of a first server) to a second iNIC (of a second server), the first iNIC (with its forwarding processor) prepends the connection endpoint with an ipOS encapsulation header to form an ipOS encapsulated packet, which the first iNIC sends through its Port B to the second iNIC.

In the illustrative embodiments, iNICs communicate packets to one another through Port B according to the Ethernet protocol. Accordingly, a packet encapsulated according to the ipOS encapsulation protocol ("ipOS encapsulated packet") is further encapsulated by an Ethernet encapsulation header that specifies a type of 0×007. Additional elements of the ipOS encapsulation protocol are discussed hereinbelow in connection with FIGS. 11b-i.

FIG. 11b is a conceptual illustration of an ipOS encapsulation header, according to the illustrative embodiments. As shown in FIG. 11b, the header includes 16 bytes of information. Such a header is useful for migrating a connection endpoint from a first iNIC (of a first server) to a second iNIC (of a second server).

In the header of FIG. 11b, the first field (4 bytes) specifies a source IP address of a client, and the second field (2 bytes) specifies a source port (which is a TCP or UDP port) of the client application which is executed by the client. The third field (4 bytes) specifies a destination IP address of the second server, and the fourth field (2 bytes) specifies a destination port (which is a TCP or UDP port) of the server application which is executed by the second server. The fifth field (1 byte) specifies a type of information within the packet (i.e. the packet to which the header is appended).

For example, a type of 0×01 indicates that the packet includes connection endpoint information (e.g. see FIGS. 11c, 11d, 11e and 11f) that is being migrated to the second server. By comparison, a type of 0×02 indicates that the packet includes an IP packet (e.g. see FIGS. 11g and 11h). A type of 0×03 indicates that the packet includes a verification that a connection endpoint was successfully migrated to the first server's iNIC (e.g. see FIG. 11i).

Also, in the header of FIG. 11b, the sixth field (1 byte) specifies a type of protocol for communicating information between a client and a server. For example, a protocol of 0×01 indicates that the IP packet includes a TCP payload. By comparison, a protocol of 0×02 indicates that the IP packet includes a UDP payload.

Finally, in the header of FIG. 11b, the last field (2 bytes) specifies a checksum for verifying the packet header.

If a connection endpoint is migrated from a first iNIC (of a first server) to a second iNIC (of a second server), the connection endpoint specifies the (a) IP address of the client, (b) port (which is a TCP or UDP port) of the client application which is executed by the client, (c) IP address of the first server, (d) port (which is a TCP or UDP port) of the associated server application ("first server application") that is executed by the first server ("first server application's port"), (e) IP address of the second server, and (f) port (which is a TCP or UDP port) of the associated server application ("second server application") that is executed by the second server ("second server application's port"). The first server application is not necessarily identical to the second server application, and the first server application's port is not necessarily identical to the second server application's port. The connection endpoint is identifiable in response to the (a) IP address of the client, (b) port (which is a TCP or UDP port) of the client application which is executed by the client, (c) IP address of the second server, and (d) port (which is a TCP or UDP port) of the server application which is executed by the second server.

Accordingly, the forward table (FIG. 12) includes sufficient information for identifying the connection endpoint associated with the packet. In that manner, such information operates as a reference to the connection endpoint. Likewise, sufficient information (for operating as a reference to the connection endpoint associated with the packet) is included within the single ipOS encapsulation header of FIG. 11b, so that the second iNIC identifies the connection endpoint in response to the single ipOS encapsulation header. In that manner, the second iNIC (with its protocol stack processor in response to instructions of its protocol stack thread) processes the packet more efficiently in accordance with the packet's associated connection endpoint. Moreover, by sending packets from the first iNIC's Port B to the second iNIC's Port B, the second iNIC more readily and efficiently distinguishes between packets that are received from the first iNIC (through Port B) versus packets that are received from a client (through Port A).

The ipOS encapsulation header of FIG. 11b is superior to IP-IP encapsulation. For example, with IP-IP encapsulation, the second iNIC would execute additional protocol stack instructions to identify the connection endpoint. By comparison, with the ipOS encapsulation header of FIG. 11b, the network processor (discussed further hereinabove, such as in connection with FIGS. 5a-c, 8 and 9a-c) identifies the connection endpoint associated with the packet. Accordingly, the network processor sends the packet and a reference to the connection endpoint to the protocol stack processor (which executes the protocol stack thread), as discussed further hereinabove. In that manner, the protocol stack processor's efficiency is enhanced.

FIG. 11c is a conceptual illustration of ipOS connection information for migration of a UDP connection endpoint, according to the illustrative embodiments. As shown in FIG. 11c, the information includes 6 bytes. The first field (4 bytes) specifies a source IP address of a first server, and the second field (2 bytes) specifies a source UDP port of the first server, which received the SYN packet from the client. The ipOS encapsulation header, together with the UDP ipOS connection information of FIG. 11c, is sufficient information for a second server (receiving such information) to establish a UDP connection endpoint.

FIG. 11d is a conceptual illustration of ipOS connection information for migration of a TCP connection endpoint, according to the illustrative embodiments. As shown in FIG. 11d, the information includes 146 bytes. The first field (4 bytes) specifies a source IP address of a first server, and the second field (2 bytes) specifies a source TCP port of the first server, which received the SYN packet from the client. The last field (140 bytes) specifies additional information for the TCP connection endpoint, such as information for output sequence variables, receive sequence variables, transmit timing variables, out-of-bound variables, and other suitable information. The ipOS encapsulation header, together with the TCP ipOS connection information of FIG. 11d, is sufficient information for a second server (receiving such information) to establish a TCP connection endpoint.

FIG. 11e is a conceptual illustration of an ipOS TCP connection endpoint packet, according to the illustrative embodiments. As shown in FIG. 11e, the packet includes 176 bytes. The first field (14 bytes) specifies an Ethernet encapsulation header (that specifies a type of 0x007) according to FIG. 11a, and the second field (16 bytes) specifies an ipOS encapsulation header according to FIG. 11b. The last field (146 bytes) specifies TCP ipOS connection information according to FIG. 11d. In the packet of FIG. 11e, the ipOS encapsulation header specifies a type of 0x01 and a protocol of 0x01.

FIG. 11f is a conceptual illustration of an ipOS UDP connection endpoint packet, according to the illustrative embodiments. As shown in FIG. 11f, the packet includes 36 bytes. The first field (14 bytes) specifies an Ethernet encapsulation header (that specifies a type of 0x007) according to FIG. 11a, and the second field (16 bytes) specifies an ipOS encapsulation header according to FIG. 11b. The last field (6 bytes) specifies UDP ipOS connection information according to FIG. 11c. In the packet of FIG. 11f, the ipOS encapsulation header specifies a type of 0x01 and a protocol of 0x02.

FIG. 11g is a conceptual illustration of a packet having an IP/TCP payload, according to the illustrative embodiments. As shown in FIG. 11g, the packet includes 70 bytes, plus the number of bytes of information in the TCP payload. The number of bytes of information in the TCP payload varies according to the type and protocol that are specified by the ipOS encapsulation header. In the packet of FIG. 11g, the first field (14 bytes) specifies an Ethernet encapsulation header (that specifies a type of 0x007) according to FIG. 11a, and the second field (16 bytes) specifies an ipOS encapsulation header according to FIG. 11b. Also, in the packet of FIG. 11g, the ipOS encapsulation header specifies a type of 0x02 and a protocol of 0x01.

FIG. 11h is a conceptual illustration of a packet having an IP/UDP payload, according to the illustrative embodiments. As shown in FIG. 11h, the packet includes 58 bytes, plus the number of bytes of information in the UDP payload. The number of bytes of information in the UDP payload varies according to the type and protocol that are specified by the ipOS encapsulation header. In the packet of FIG. 11h, the first field (14 bytes) specifies an Ethernet encapsulation header (that specifies a type of 0x007) according to FIG. 11a, and the second field (16 bytes) specifies an ipOS encapsulation header according to FIG. 11b. Also, in the packet of FIG. 11h, the ipOS encapsulation header specifies a type of 0x02 and a protocol of 0x02.

FIG. 11i is a conceptual illustration of a connection endpoint migration acknowledgement packet, which is a verification that a connection endpoint was successfully migrated to the iNIC of the server which sent the connection endpoint migration acknowledgement packet, according to the illustrative embodiments. As shown in FIG. 11i, the packet includes 30 bytes. In the packet of FIG. 11i, the first field (14 bytes) specifies an Ethernet encapsulation header (that specifies a type of 0x007) according to FIG. 11a, and the second field (16 bytes) specifies an ipOS encapsulation header according to FIG. 11b. Also, in the packet of FIG. 11i, the ipOS encapsulation header specifies a type of 0x03.

Description of Server Farm Resource Usage Enhancements

Figure 15:
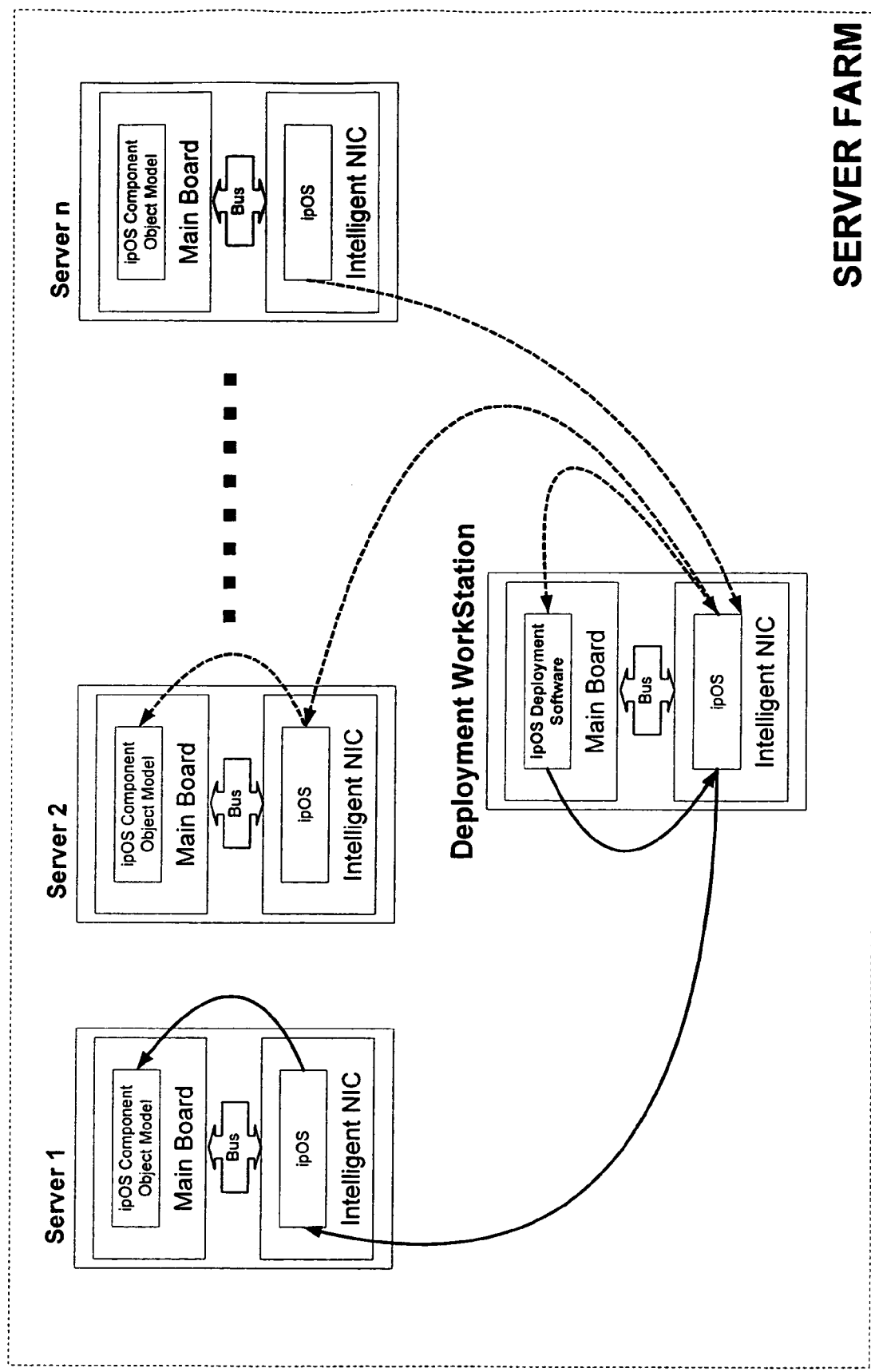
FIG. 15 is a block diagram of a server farm including a deployment workstation for deploying application processes and associated software component objects to servers within the server farm, according to the illustrative embodiments.

FIG. 15 is a block diagram of a server farm including a deployment workstation for deploying application processes and associated software component objects to servers within the server farm, according to the illustrative embodiments. The illustrative embodiments achieve an improved overall use of the server farm's resources for applications. Advantageously, such an improved overall use of the server farm's resources is optional for other portions of the illustrative embodiments (e.g. client request load-balancing).

The server farm architecture of the illustrative embodiments (e.g. FIG. 2a) enables an application-aware server farm. Such an application-aware server farm includes a distributed system of iNICs (executing the ipOS) that are aware of the state of applications executing on servers within the server farm, as discussed further hereinabove in connection with the Synch Port. The iNICs execute the ipOS as a distributed system ("ipOS distributed operations system") in coordination with one another to improve overall use of the server farm's resources.

In the illustrative embodiments, the ipOS distributed operations system achieves two primary objectives in deploying and executing applications within the server farm. First, the ipOS distributed operations system achieves an improved dynamic deployment of socket application processes on the server farm. Accordingly, the ipOS distributed operations system selects a server for executing a particular application process, along with the timing of such execution.

Second, with the ipOS distributed operations system, application developers have a platform to deploy and execute software component objects in support of socket applications. With the ipOS distributed operations system, the processor of an individual server's main board circuitry and associated resources operate efficiently in relation to the entire server farm. Accordingly, the ipOS distributed operations system architecture achieves load-balancing of application process resources (and their associated software component objects) within the server farm.

Advantageously, the illustrative embodiments are compatible with conventional techniques in development of applications (and associated software component objects) deployed within a server farm for IP networks. A conventional development cycle involves the development of an application with reusable software objects (or component objects) that are deployed in a middleware component model, such as the development of an application process that calls service objects deployed in a middleware component model. Commercially available embodiments of middleware component models include Microsoft's Transaction Server (available from www.microsoft.com) and BEA's WebLogic Server (available from www.BEA.com).

As shown in FIG. 15 for an illustrative embodiment, the server farm includes an additional workstation, denoted as a deployment workstation. Nevertheless, the addition of the deployment workstation is optional in a situation where a server in the server farm performs the same or similar operation of the deployment workstation. The deployment workstation operates as a central location (or repository) for deploying application processes and associated software component objects within the server farm.

In the deployment workstation, ipOS deployment software includes the repository of application process executables (i.e. software instructions that are executable by a processor) and associated software component object executables. In response to instructions of the ipOS deployment software, the deployment workstation (a) selectively groups various application process executables and associated component object executables with one another into application packages and (b) makes the application packages available for deployment to servers in the server farm. The deployment workstation deploys an executable to a server in response to a request from either a user (e.g. network administrator), the server's iNIC (in response to instructions of its ipOS), or another server's iNIC (in response to instructions of its ipOS). For example, the deployment workstation deploys applications to servers within the server farm in accordance with FIG. 2d and its associated discussion.

In FIG. 15, servers 1 through n in the server farm are configurable as shown in FIGS. 2a-c, but actual connections are not shown in FIG. 15 for clarity. In the example of FIG. 15, the deployment workstation is coupled to servers 1 through n through the deployment workstation's iNIC. Moreover, through servers 1 through n, the deployment workstation is connected to an IP network.

The processor of the deployment workstation's main board circuitry executes the ipOS deployment software, which is written with conventional programming techniques. The ipOS deployment software includes software for managing application process executables and associated software component object executables (e.g. application packages) to improve overall use of the server farm's resources. For example, in response to instructions of the ipOS deployment software, the deployment workstation deploys the application process executables and component object executables (e.g. an application package) to servers in the server farm.

In performing its operations, the deployment workstation (in response to instructions of the ipOS deployment software) communicates indirectly with an ipOS component object model which is executed by the processor of a server's main board circuitry. In response to instructions of either (a) the ipOS deployment software or (b) the ipOS of a server's iNIC, the server receives and stores copies of application process executables and component object executables (e.g. application packages) from the deployment workstation. FIG. 15 shows two examples of an application package being sent from the deployment workstation to an ipOS component object model.

As shown by solid arrows in FIG. 15, in response to instructions of the ipOS deployment software, the deployment workstation's main board circuitry sends a first request (e.g. for sending an application package) to the deployment workstation's iNIC (e.g. triggered in response to a request from a network administrator). In response to the first request, the deployment workstation's iNIC (in response to instructions of its ipOS) sends an associated second request to server 1's iNIC. In response to the second request, server 1's iNIC (in response to instructions of its ipOS) sends an associated third request to the ipOS component object model of the main board circuitry of server 1.

After the third request is processed by the ipOS component object model of the main board circuitry of server 1, the deployment workstation (in response to instructions of the ipOS deployment software) sends the application package to the ipOS component object model of server 1 through the respective iNICs of the deployment workstation and server 1. The iNIC of server 1 stores a record of the availability of the executables (e.g. one or more application processes and/or component objects). Similarly, the deployment workstation (in response to instructions of the ipOS deployment software) sends process performance information to notify iNICs about application processes and component objects that are stored by particular servers for execution.

The deployment workstation sends such process performance information to the iNICs of servers within the server farm, in addition to the process instances that are output during synchronization (which is discussed further hereinabove such as in connection with FIG. 6). For example, the process instances represent a current state of processes that are already being executed by servers in the server farm. During synchronization, the process instances and process performance information are advertised by iNICs (of servers in the server farm) to one another, as discussed further hereinabove such as in connection with FIG. 6.

As shown by dashed arrows in FIG. 15, the iNIC of server n (in response to instructions of its ipOS) sends a first request (e.g. for sending an application package) to the deployment workstation's iNIC (e.g. triggered in response to an application load-balancing process of the ipOS of server n's iNIC).

In response to the first request, the deployment workstation's iNIC (in response to instructions of its ipOS) sends an associated second request to the deployment workstation's main board circuitry. In response to the second request and instructions of the ipOS deployment software, the deployment workstation's main board circuitry sends an associated third request (e.g. for sending the application package) to the deployment workstation's iNIC.

In response to the third request, the deployment workstation's iNIC (in response to instructions of its ipOS) sends an associated fourth request to server 2's iNIC. In response to the fourth request, server 2's iNIC (in response to instructions of its ipOS) sends an associated fifth request to the ipOS component object model of the main board circuitry of server 2.

After the fifth request is processed by the ipOS component object model of the main board circuitry of server 2, the deployment workstation (in response to instructions of the ipOS deployment software) sends the application package to the ipOS component object model of server 2 through the respective iNICs of the deployment workstation and server 2. The iNIC of server 2 stores a record of the availability of the executables (e.g. one or more application processes and/or component objects). Similarly, the deployment workstation (in response to instructions of the ipOS deployment software) sends process performance information to notify iNICs about application processes and component objects that are stored by particular servers for execution.

Figure 16:
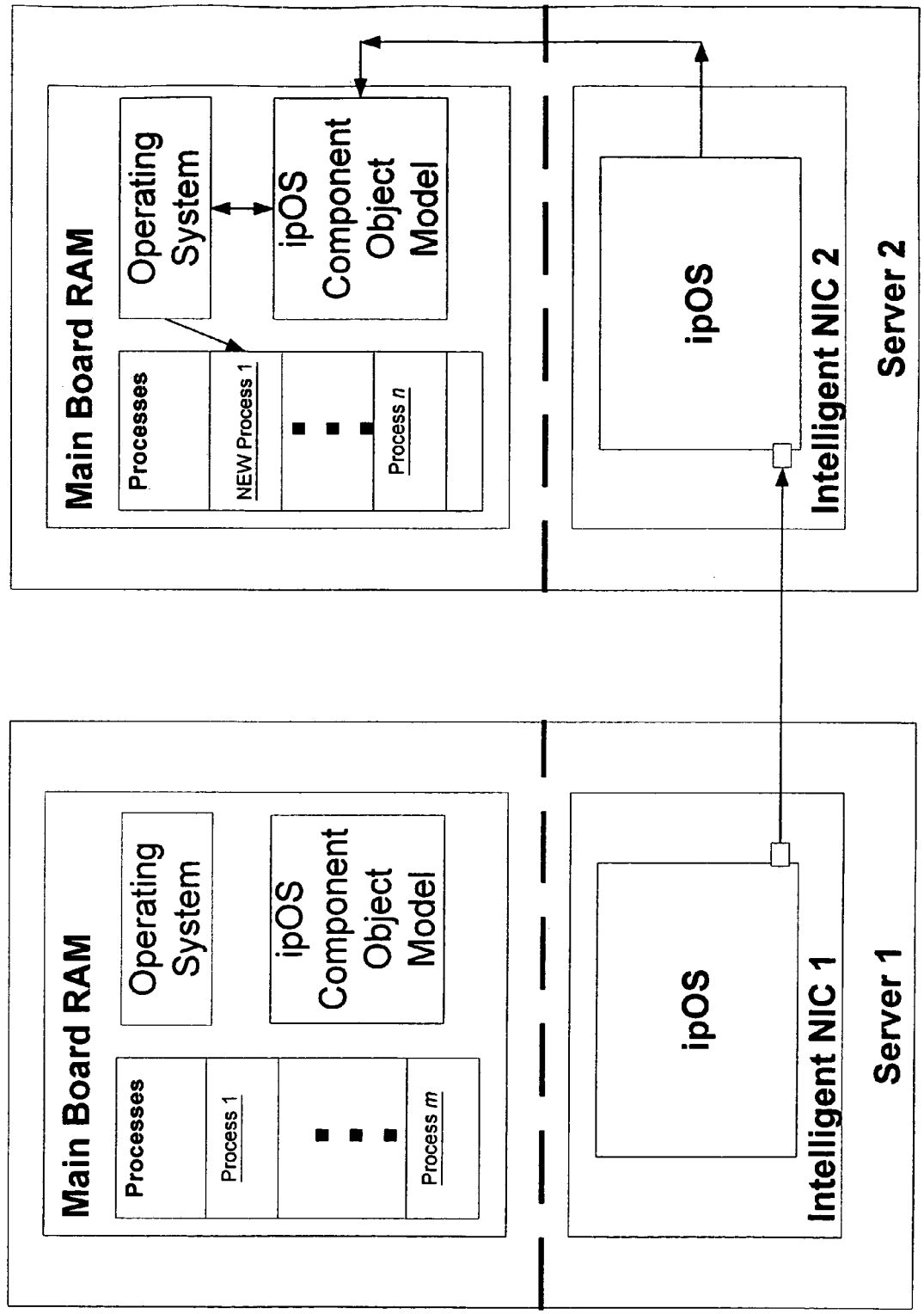
FIG. 16 is a block diagram of servers within a server farm, according to an illustrative embodiment in which a first server selectively spawns an application process that is stored by a second server.
Figure 17:
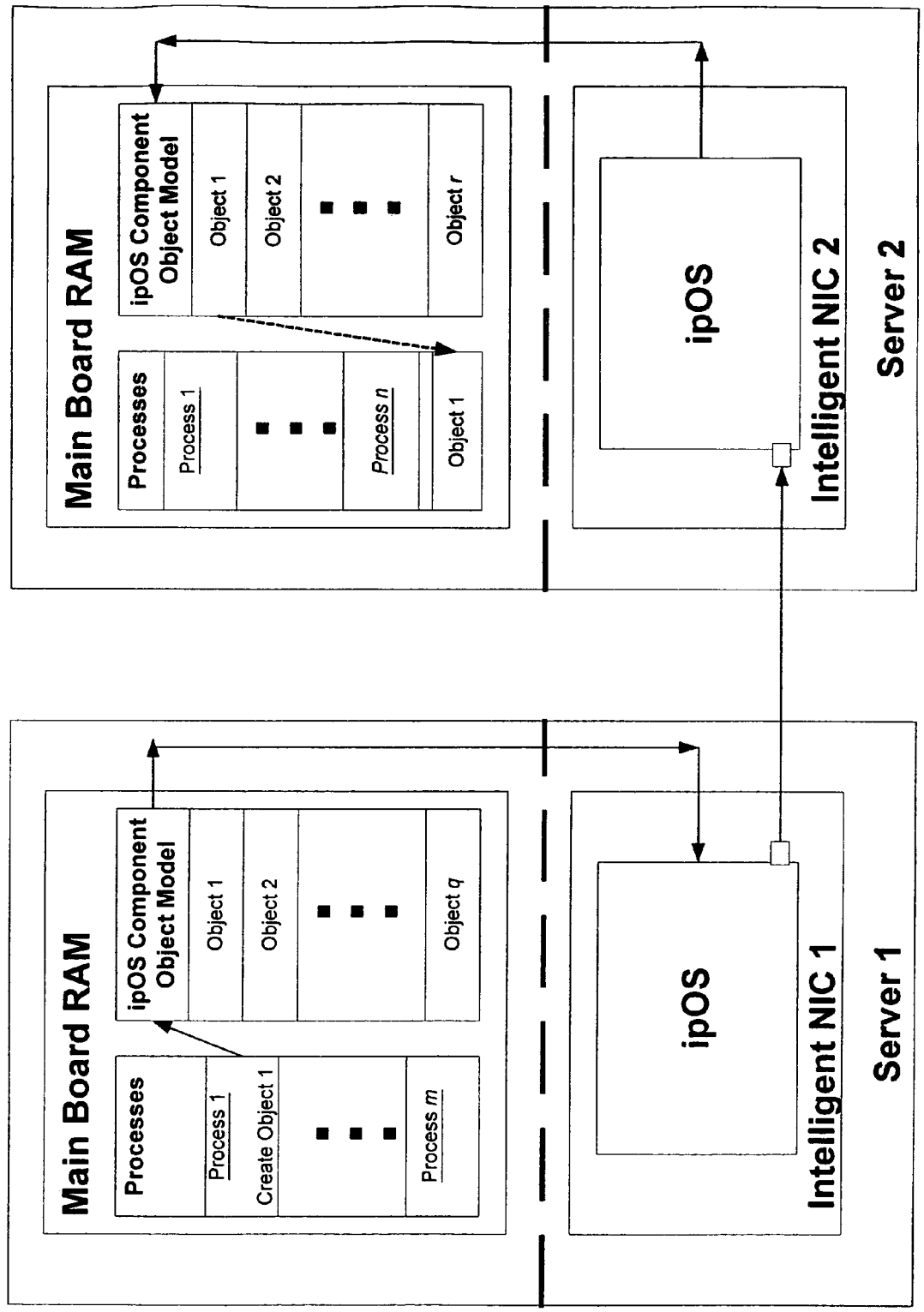
FIG. 17 is a block diagram of servers within a server farm, according to an illustrative embodiment in which a first server selectively spawns an object that is stored by a second server.

FIG. 16 is a block diagram of servers within a server farm, according to an illustrative embodiment in which a server 1 selectively initiates execution of (or "spawns") an application process that is stored by a server 2. FIG. 17 is a block diagram of servers within a server farm, according to an illustrative embodiment in which a server 1 selectively spawns an object that is stored by a server 2. In such illustrative embodiments, the ipOS distributed operations system performs operations for improving overall use of the server farm's resources for application processes and objects.

In FIG. 16, server 1 executes m application processes (where m is an integer number). The main board circuitry's processor (in response to instructions of its OS) manages the state of such application processes.

In the example of FIG. 16, the iNIC of server 1 (in response to instructions of its ipOS) determines whether to spawn an application process (e.g. process 1) on another server (e.g. server 2), as for example to support additional resources for process 1 executing on server 1. The iNIC of server 1 (in response to instructions of its ipOS) makes such determination in response to information stored within its server state table (see FIG. 12). In response to such information, the iNIC (in response to instructions of its ipOS) performs load-balancing of application processes within the server farm in response to the synchronized state information.

As shown in FIG. 16, in support of additional resources, the iNIC of server 1 sends a request to the iNIC of server 2 to spawn process 1 on server 2. In response to the request, the iNIC of server 2 (in response to instructions of its ipOS) sends the request to the ipOS component object model of server 2 to spawn process 1. Accordingly, the ipOS component object model sends the request to the OS which is executing on the main board circuitry of server 2, and the OS spawns process 1 (e.g. loads the executable of process 1 into the main board circuitry's memory for execution) on server 2 (which executes n application processes, where n is an integer number).

Conventional application processes are built upon service objects. In the example of FIG. 17, the ipOS component object model of server 1 stores information for execution of q objects, where q is an integer number. As shown in FIG. 17, process 1 of server 1 sends a request to the ipOS component object model of server 1 for execution of an object 1. For example, object 1 may perform a database operation.

In the example of FIG. 17, the ipOS component object model of server 1 determines whether to spawn object 1 on server 1 or another server (e.g. server 2). For making such determination, the iNIC (in response to instructions of its ipOS) sends information to the ipOS component object model, such as (a) the state of other servers in the server farm and (b) whether particular servers store particular objects. In response to such information, the ipOS component object model performs load-balancing of objects within the server farm in response to the synchronized state information.

If the ipOS component object model of server 1 determines to spawn object 1 on server 2, it sends a request to the iNIC of server 1. Accordingly, the iNIC of server 1 (in response to instructions of its ipOS) sends the request to the iNIC of server 2. In response to the request, the iNIC of server 2 (in response to instructions of its ipOS) sends the request to the ipOS component object model of server 2 (which stores information for execution of r objects, where r is an integer number), and the ipOS component object model of server 2 spawns object 1 (e.g. loads the executable of object 1 into the main board circuitry's memory for execution) on server 2 (on behalf of process 1 of server 1), independent of a type of application that is associated with the object.

The respective iNICs of server 1 and server 2 coordinate the communication of information between process 1 of server 1 and object 1 executing on server 2. Accordingly, information from process 1 to object 1 is sent from process 1 to object 1 through the iNIC of server 1 and the iNIC of server 2, and vice versa.

With the architecture of the ipOS distributed operations system, redundant service objects (e.g. shadow objects) are executable by one or more servers (within the server farm). A shadow object is a duplicate of a primary service object that is spawned by an application process. During execution, the shadow object maintains the same state as the primary service object.

With a shadow object, a server failure is more easily recoverable. For example, if execution of a primary service object fails (e.g. due to a fault in the primary service object's server), the shadow object is available to replace the primary service object in continuing such execution. This feature is especially advantageous for service objects that maintain state during an extended period of time (e.g. multi-player game objects).

Referring to FIG. 15, the deployment workstation (in response to instructions of the ipOS deployment software) sends a request to a server for deploying a shadow object. In response to such request, the server deploys the shadow object with the server's ipOS component object model. For example, referring to FIG. 17, even if the ipOS component object model of server 1 determines to spawn a primary service object 1 on server 1, the ipOS component object model of server 1 is operable to spawn a shadow object 1 on server 2, thereby achieving a level of fault tolerance.

During execution, an application process requesting a service object is unaware that a shadow object has been spawned (and likewise is unaware of where the shadow object has been spawned). On behalf of the application process, the ipOS component object model is responsible for spawning and maintaining primary service objects and shadow objects. For the ipOS component object model's determination of when and where to spawn a shadow object, the iNIC (in response to instructions of its ipOS) sends information to the ipOS component object model, such as (a) the state of other servers in the server farm and (b) whether particular servers store particular objects.

Description of Computer System

Each computer system of the illustrative embodiments includes (a) optionally, input devices for receiving information from a human user, (b) optionally, a display device (e.g. a conventional electronic cathode ray tube ("CRT") device) for displaying information to the user, (c) a computing device (e.g. iNIC) for executing and otherwise processing instructions, (d) optionally, a nonvolatile storage device (e.g. a hard disk drive or other computer-readable medium (or apparatus), as discussed further hereinbelow) for storing information, and (e) various other electronic circuitry for performing other operations of the computer system.

For example, the computing device includes a memory device (e.g. random access memory ("RAM") device and read only memory ("ROM") device) for storing information (e.g. instructions executed by the computing device and data operated on by the computing device in response to such instructions). Optionally, the computing device is connected to the input devices, the display device, and the computer-readable medium. The illustrative embodiments are independent of current computer architectures and methods of connecting devices (e.g. PCI bus). Moreover, the illustrative embodiments are compatible with emerging techniques for connecting computing devices (e.g. Infiniband).

If the computing device is connected to the display device, the display device displays visual images in response to signals from the computing device, and the user views such visual images. If the computing device is connected to the input devices, the user operates the input devices in order to output information to the computing device, and the computing device receives such information from the input devices.

The input devices include, for example, a conventional electronic keyboard or keypad and a pointing device such as a conventional electronic "mouse," rollerball, or light pen. The user operates the keyboard or keypad to output alphanumeric text information from the keyboard. If the computing device is connected to the pointing device, the user operates the pointing device to output cursor-control information to the computing device, and the computing device receives such cursor-control information from the pointing device.

If the computing device is connected to (or includes) a computer-readable medium, the computing device and computer-readable medium are structurally and functionally interrelated with one another as discussed further hereinbelow. The computer-readable medium stores (or encodes, or records, or embodies) functional descriptive material (e.g. including but not limited to software (also referred to as computer programs or applications) and data structures). Such functional descriptive material imparts functionality when encoded on the computer-readable medium. Also, such functional descriptive material is structurally and functionally interrelated to the computer-readable medium.

Within such functional descriptive material, data structures define structural and functional interrelationships between such data structures and the computer-readable medium (and other aspects of the computing device and the computer system). Such interrelationships permit the data structures' functionality to be realized. Also, within such functional descriptive material, computer programs define structural and functional interrelationships between such computer programs and the computer-readable medium (and other aspects of the computing device and the computer system). Such interrelationships permit the computer programs' functionality to be realized.

For example, the computing device reads (or accesses, or copies) such functional descriptive material from the computer-readable medium into the memory device of the computing device, and the computing device performs its operations (as discussed elsewhere herein) in response to such material which is stored in the memory device of the computing device. More particularly, the computing device performs the operation of processing a computer application (that is stored, encoded, recorded or embodied on a computer-readable medium) for causing the computing device to perform additional operations (as discussed elsewhere herein). Accordingly, such functional descriptive material exhibits a functional interrelationship with the way in which the computing device executes its processes and performs its operations.

Further, the computer-readable medium is an apparatus from which the computer application is accessible by the computing device, and the computer application is processable by the computing device for causing the computing device to perform such additional operations. In addition to reading such functional descriptive material from the computer-readable medium, the computing device is capable of reading such functional descriptive material from (or through) a network which is also a computer-readable medium (or apparatus). Moreover, the memory device of the computing device is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information processing system, comprising:
   a first computing device configured to:
      receive, from a second computing device via a first local-area network connecting at least the first computing device and the second computing device, a first information packet, the second computing device configured to transmit the first information packet in response to receiving a request packet from a client, the request packet received by the second computing device via a global computer network, a first router, and a second local-area network; and
      output a second information packet to the client via the global computer network and the second local-area network, such that the second information packet bypasses the second computing device but appears to the client to have originated from the second computing device;
   wherein the second local-area network is configured to:
      bypass the first local-area network;
      connect at least the first router to the second computing device; and
      connect the first computing device to the global computer network, and
   wherein the first information packet includes at least the request packet and a reference to a data structure representative of a connection with the client, the data structure including at least an address of the first computing device, an address of the second computing device, and an address of the client.

2. The system of claim 1 wherein the first computing device is further configured to receive a third information packet via the global computer network and the second local-area network.

3. The system of claim 1 wherein the first computing device comprises a network interface card.

4. The system of claim 1 wherein the second computing device is configured to be coupled to the client via at least the first router device and the global computer network.

5. The system of claim 1 wherein the first computing device is configured to output the second information packet to the global computer network via the second local-area network and a second router.

6. The system of claim 1 wherein the first computing device is configured to output the second information packet to the global computer network via the second local-area network and the first router.

7. A method performed by a first computing device of an information processing system, the method comprising:
  receiving, from a second computing device via a first local-area network connecting at least the first computing device and the second computing device, a first information packet, the second computing device configured to transmit the first information packet in response to receiving a request packet from a client, the second computing device configured to receive the request packet via a global computer network, a first router, and a second local-area network; and
  outputting a second information packet to the client via the global computer network and the second local area network such that the second information packet appears to the client to have originated from the second computing device;
  wherein the second local-area network is configured to:
    bypass the first local-area network;
    connect at least the first router to the second computing device; and
    connect the first computing device to the global computer network; and
  wherein the first information packet includes at least the request packet and a reference to a data structure representative of a connection with the client, the data structure including at least an address of the first computing device, an address of the second computing device, and an address of the client.

8. The method of claim 7 further comprising:
  the first computing device receiving a third information packet via the global computer network and the second local-area network.

9. The method of claim 7 wherein the first computing device comprises a network interface card.

10. The method of claim 7 wherein the second computing device is coupled to the client via at least the first router device and the global computer network.

11. The method of claim 7 wherein the first computing device outputs the second information packet to the global information network via at least the second local-area network and a second router.

12. The method of claim 7 wherein the first computing device outputs the second information packet to the global information network via at least the second local-area network and the first router.

13. The method of claim 7 wherein the second computing device comprises a network interface card.

14. A method performed by a first computing device of an information processing system, the method comprising:
  receiving, from a second computing device via a first local-area network connecting at least the first computing device and the second computing device, a first information packet, the second computing device configured to transmit the first information packet in response to receiving a request packet from a client, the second computing device configured to receive the request packet via a global computer network, a first router, and a second local-area network; and
  outputting a second information packet to the client via the global computer network and a third local area network that bypasses the second computing device, such that the second information packet bypasses the second computing device but appears to the client to have originated from the second computing device;
  wherein the second local-area network is configured to:
    bypass the first local-area network;
    connect at least the first router to the second computing device; and
    connect the first computing device to the global computer network; and
  wherein the first information packet includes at least the request packet and a reference to a data structure representative of a connection with the client, the data structure including at least an address of the first computing device, an address of the second computing device, and an address of the client.

15. An information processing system, comprising:
  a first computing device configured to:
  receive, from a second computing device via a first local-area network connecting at least the first computing device and the second computing device, a first information packet, the second computing device configured to transmit the first information packet in response to receiving a request packet from a client, the second computing device configured to receive the request packet via a global computer network, a first router, and a second local-area network; and
  output a second information packet to the client via the global computer network and the second local-area network, such that the second information packet appears to the client to have originated from the second computing device;
  wherein the second computing device comprises an intelligent network interface card;
  wherein the second local-area network is configured to:
    bypass the first local-area network;
    connect at least the first router to the second computing device; and
    connect the first computing device to the global computer network, and
  wherein the first information packet includes at least the request packet and a reference to a data structure representative of a connection with the client, the data structure including at least an address of the first computing device, an address of the second computing device, and an address of the client.

16. An information processing system, comprising:
  a first computing device configured to:
  receive, from a second computing device via a first local-area network connecting at least the first computing device and the second computing device, a first information packet, the second computing device configured to transmit the first information packet in response to receiving a request packet from a client, the second computing device configured to receive the request packet via a global computer network, a first router, and a second local-area network; and output a second information packet to the client via the global computer network and a third local-area network that connects at least the first computing device and the global computer network, such that the second information packet bypasses the second computing device but appears to have originated from the second computing device;

wherein the second local-area network is configured to:
bypass the first local-area network;
connect at least the first router to the second computing device; and
connect the first computing device to the global computer network, and wherein the first information packet includes at least the request packet and a reference to a data structure representative of a connection with the client, the data structure including at least an address of the first computing device, an address of the second computing device, and an address of the client.

17. An information processing system, comprising:
a first computing device configured to:
receive, from a second computing device via a first local-area network connecting at least the first computing device and the second computing device, a first information packet, the second computing device configured to transmit the first information packet in response to receiving a request packet from a client, the second computing device configured to receive the request packet via a global computer network, a first router, and a second local-area network; and output a second information packet to the client directly via the global computer network, such that the second information packet bypasses the second computing device but contains information indicative that the second information packet originated from the second computing device;

wherein the second local-area network is configured to:
bypass the first local-area network; and
connect at least the first router to the second computing device, and wherein the first information packet includes at least the request packet and a reference to a data structure representative of a connection with the client, the data structure including at least an address of the first computing device, an address of the second computing device, and an address of the client.

18. A server farm, comprising:
a first device; and
a second device;
wherein the first device is configured to be connected to the second device via a network;
wherein the first device is configured to receive a client information packet from a global computer network via a first local-area network, and to forward the client information packet along with a reference to a data structure representative of a connection with the client, the data structure including at least an address of the first device, an address of the second device, and an address of the client, to the second device via a second local-area network, and
wherein the second device is configured to bypass the first device when outputting a second information packet to the global computer network via the first local area network, and wherein the second information packet appears to have originated from the first device.

19. A server farm, comprising:
a first device; and
a second device;
wherein the first device is configured to be connected to the second device via a network;
wherein the first device is configured to receive a client information packet from a global computer network via a first local-area network, and to forward the client information packet along with a reference to a data structure representative of a connection with the client, the data structure including at least an address of the first device, an address of the second device, and an address of the client, to the second device via a second local-area network, and
wherein the second device is configured to bypass the first device when outputting a second information packet to the global computer network via a third local area network, and wherein the second information packet contains information indicative that the second information packet originated from the first device.

* * * * *

UNITED STATES PATENT AND TRADEMARK OFFICE
CERTIFICATE OF CORRECTION

PATENT NO. : 7,640,298 B2  
APPLICATION NO. : 11/265558  
DATED : December 29, 2009  
INVENTOR(S) : Mitchell T. Berg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Ninth Day of November, 2010

David J. Kappos  
*Director of the United States Patent and Trademark Office*